United States Patent
Cole et al.

(10) Patent No.: US 9,894,350 B2
(45) Date of Patent: Feb. 13, 2018

(54) METHODS AND APPARATUS RELATED TO CAPTURING AND/OR RENDERING IMAGES

(71) Applicant: NextVR Inc., Laguna Beach, CA (US)

(72) Inventors: David Cole, Laguna Beach, CA (US); Alan McKay Moss, Laguna Beach, CA (US); Hector M. Medina, Laguna Beach, CA (US)

(73) Assignee: NextVR Inc., Newport Beach, CA (US)

( * ) Notice: Subject to any disclaimer, the term of this patent is extended or adjusted under 35 U.S.C. 154(b) by 0 days.

(21) Appl. No.: 15/255,135

(22) Filed: Sep. 1, 2016

(65) Prior Publication Data
US 2016/0373734 A1 Dec. 22, 2016

Related U.S. Application Data

(63) Continuation-in-part of application No. 15/051,550, filed on Feb. 23, 2016.
(Continued)

(51) Int. Cl.
*H04N 17/00* (2006.01)
*H04N 17/02* (2006.01)
(Continued)

(52) U.S. Cl.
CPC ....... *H04N 17/002* (2013.01); *G02B 27/0172* (2013.01); *G06T 7/85* (2017.01);
(Continued)

(58) Field of Classification Search
CPC ............. H04N 17/002; H04N 5/23238; H04N 13/0232; H04N 13/0246; H04N 13/0275;
(Continued)

(56) References Cited

U.S. PATENT DOCUMENTS

| 5,446,833 A | 8/1995 | Miller et al. |
| 2002/0190987 A1 | 12/2002 | Travers et al. |

(Continued)

FOREIGN PATENT DOCUMENTS

WO 2009068942 A1 6/2009

OTHER PUBLICATIONS

International Search Report from PCT/US2016/019200 dated Jul. 6, 2016, pp. 1-4.
(Continued)

*Primary Examiner* — Michael Lee
(74) *Attorney, Agent, or Firm* — Straub & Straub; Michael P. Straub; Stephen T. Straub

(57) ABSTRACT

Camera and/or lens calibration information is generated as part of a calibration process in video systems including 3-dimensional (3D) immersive content systems. The calibration information can be used to correct for distortions associated with the source camera and/or lens. A calibration profile can include information sufficient to allow the system to correct for camera and/or lens distortion/variation. This can be accomplished by capturing a calibration image of a physical 3D object corresponding to the simulated 3D environment, and creating the calibration profile by processing the calibration image. The calibration profile can then be used to project the source content directly into the 3D viewing space while also accounting for distortion/variation, and without first translating into an intermediate space (e.g., a rectilinear space) to account for lens distortion.

18 Claims, 24 Drawing Sheets

Related U.S. Application Data

(60) Provisional application No. 62/382,251, filed on Aug. 31, 2016, provisional application No. 62/120,311, filed on Feb. 24, 2015.

(51) Int. Cl.

| | |
|---|---|
| *H04N 13/02* | (2006.01) |
| *H04N 5/232* | (2006.01) |
| *G06T 11/00* | (2006.01) |
| *G06T 15/04* | (2011.01) |
| *G06T 7/80* | (2017.01) |
| *H04N 21/414* | (2011.01) |
| *H04N 21/4402* | (2011.01) |
| *H04N 21/485* | (2011.01) |
| *H04N 21/81* | (2011.01) |
| *G02B 27/01* | (2006.01) |

(52) U.S. Cl.
 CPC ............ *G06T 11/001* (2013.01); *G06T 15/04* (2013.01); *H04N 5/23238* (2013.01); *H04N 13/0232* (2013.01); *H04N 13/0246* (2013.01); *H04N 13/0275* (2013.01); *G02B 2027/014* (2013.01); *G02B 2027/0138* (2013.01); *G06T 2207/10021* (2013.01); *H04N 21/41407* (2013.01); *H04N 21/4402* (2013.01); *H04N 21/4854* (2013.01); *H04N 21/816* (2013.01)

(58) Field of Classification Search
 CPC ......... H04N 21/42407; H04N 21/4402; H04N 21/4854; H04N 21/816; G06T 7/85; G06T 27/0172; G06T 11/001; G06T 15/04; G06T 19/003; G06T 19/006; G02B 2027/0138; G02B 2207/10021; G02B 2027/014
 USPC ........................................................ 348/187
 See application file for complete search history.

(56) References Cited

U.S. PATENT DOCUMENTS

| | | | |
|---|---|---|---|
| 2013/0265571 A1 | 10/2013 | Bassi et al. | |
| 2015/0288956 A1* | 10/2015 | Mallet | H04N 17/002 |
| | | | 348/188 |
| 2016/0073101 A1* | 3/2016 | Keaffaber | G06T 7/80 |
| | | | 348/187 |
| 2016/0182903 A1* | 6/2016 | Grundhofer | G06T 7/80 |
| | | | 348/187 |

OTHER PUBLICATIONS

Written Opinion of the International Searching Authority from PCT/US2016/019200 dated Jul. 6, 2016, pp. 1-6.

Ellen Schwalbe, Geometric Modelling and Calibration of Fisheye Lens Camera Systems, Institute of Photogrammetry and Remote Sensing, Dresden University of Technology, Helmholzstr.10, D-01062 Dresden, Germany, pp. 1-6, (2005).

* cited by examiner

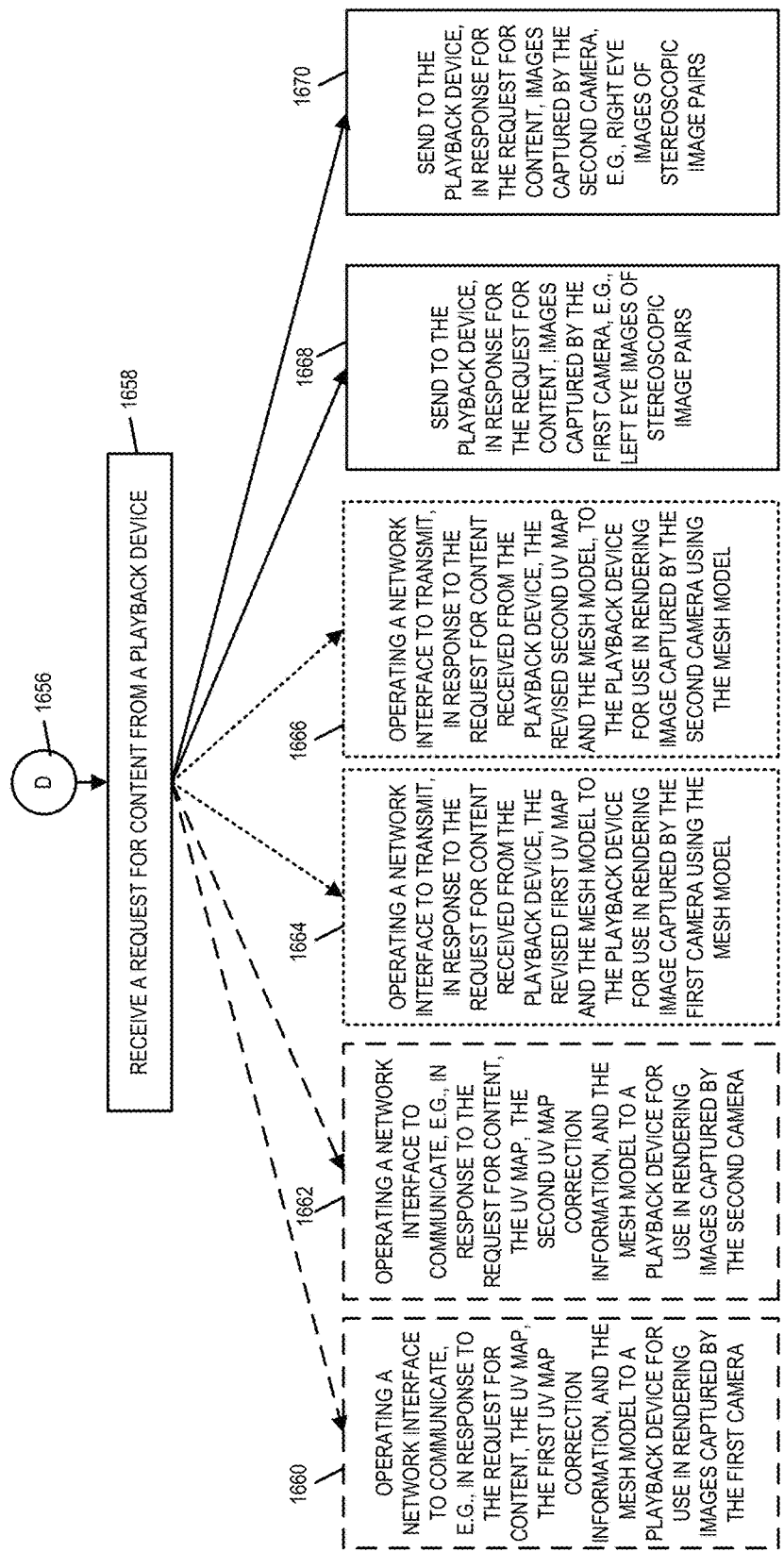

METHODS AND APPARATUS RELATED TO CAPTURING AND/OR RENDERING IMAGES

RELATED APPLICATIONS

The present application expressly incorporates, in its entirety, U.S. patent application Ser. No. 15/051,550, filed Feb. 23, 2016 which claims benefit of U.S. provisional patent application Ser. No. 62/120,311, filed Feb. 24, 2015 which is also hereby expressly incorporated by reference in its entirety.

FIELD

The present application relates to methods and apparatus for calibrating camera devices and/or lenses and for using calibration information to render images of an environment simulated using a model, e.g., a mesh model, and one or more images that maybe applied as textures to all or portions of the mesh model.

BACKGROUND

Systems for capturing, streaming, and/or playing back immersive content, such as to simulate an immersive virtual reality environment, e.g., a three-dimensional (3D) environment, are growing in importance as the hardware for such systems becomes more readily available and the cost of such hardware has been diminishing.

Head mounted devices for displaying immersive content can allow a user to turn his or her head and experience a corresponding change in the displayed scene. Such devices can allow users to adjust head position to view greater than about 180 degrees of a captured scene in at least one dimension, and can provide up to about 360 degree viewing in at least one dimension.

While some display devices allow for 360 degree viewing, at any given time human eyes are capable of perceiving a limited field of view corresponding to only a portion of the entire available viewing area. This field of view can be less than about 180 degrees in a horizontal dimension. Thus as the user turns their head, the playback device can adjust the displayed content to present the portion of the viewing scene corresponding to where the user is looking. For example, when the user is looking forward the display device presents a user with a sector of the scene centered about a forward direction, which can correspond to an angle of 0 degrees in a horizontal plane that is approximately parallel to the ground. When the user turns around to face backward, the display device presents the user with the sector of the scene centered about a backward direction, which can correspond to an angle of 180 degrees in the horizontal plane.

Some immersive systems capable of generating 360 degree viewing scenes typically combine content captured using multiple cameras. The cameras can capture stereoscopic content including image content corresponding to left and right eye views to allow for a stereoscopic 3D viewing effect. However, immersive experiences are possible without the use of stereoscopic content, e.g., with a user seeing the same image in both eyes and still obtaining a panoramic experience but without the sense of depth made possible by presenting different images to a user's left and right eyes.

In order to provide a wide field of view, cameras in immersive content capture systems can be fitted with wide angle lenses. These can include fisheye lenses or other ultra wide angle lenses that do not produce a rectilinear image. Fisheye lenses can produce strong visual distortion including significant barrel distortion, and create a wide panoramic or hemispherical image, which can make them well-suited for use in immersive content systems.

Spatial distortion, chromatic distortion, and/or other optical properties may vary from lens to lens and/or from camera to camera due factors including lens imperfections and differences between positioning of the lens relative to the sensor in the camera. This can make it difficult to reliably use images captured by cameras with fisheye lenses and to seam images together that are captured by adjacent cameras/lenses.

In the case of stereoscopic images, for example, where separate left and right eye images are captured and then presented during playback to produce a 3D effect to the viewer, distortions and differences between the cameras, including camera lenses, used to capture the left and right eye images may be particularly problematic and/or degrade the stereoscopic image quality if left unaddressed since the left and right eyes maybe presented with images suffering different distortions. Thus, while image distortion is a problem for panoramic implementations it is particularly problematic for stereoscopic systems where images captured by different cameras are displayed to different eyes.

In view of the above it should be appreciated that there is a need for detecting or measuring distortions introduced by cameras and camera lenses particularly in the case of wide angle, e.g., fish eye, lenses. There is also a need for need for methods and/or apparatus which could use distortion information to improve playback, e.g., when images captured by a camera are played back or used as a texture on a surface, e.g, of an environmental model. Methods and/or apparatus which can be used to address one or more of the above problems would be desirable.

SUMMARY

In various embodiments, camera and/or lens calibration information is generated as part of a calibration process in which a camera, including a lens, captures one or more images of a 3D environment having a known shape. The distortions introduced by the camera are detected and calibration information is generated which can be used to compensate for some or all of the distortions introduced by the camera and lens.

The calibration information can be used to correct for distortions associated with the source camera and/or lens basis. Calibration information on a per camera basis is preferred in some, but not all embodiments, since the lens and camera body/sensor pairing may result in some of the distortions. Accordingly, it is useful in many cases to generate calibration information for a camera taking into consideration the particular lens included as part of the camera which also includes a sensor and camera body in which the sensor is mounted.

Thus calibration information may be generated on a per camera and/or per lens basis. In some embodiments each camera has a fisheye or other wide or ultra-wide lens attached thereto. In this manner, distortions for individual cameras and/or lenses may be detected and accounted for during playback using custom calibration information, regardless of whether they are introduced by the lens or some other factor such as the sensor-to-lens positioning. In the case of a pair of cameras used to capture stereoscopic information, separate calibration information is generated for each camera in the camera pair even though the cameras maybe of the same type and use the same type of lens and sensor.

In various embodiments the calibration apparatus includes a target assembly with a known 3D shape and grid pattern. In some embodiments the target assembly has a curved shape, e.g., a spherical shape with the inside of a half sphere or other portion serving as the target having a known shape and grid pattern.

The larger the size of the target, the easier it is to detect distortions since some distortions will be more noticeable in an image if the distance from the camera lens to the target is larger rather than smaller. Small targets, e.g., with distances from a camera lens of a foot or less, make it difficult to detect some distortions introduced into a lens.

Manufacturing of a large target assembly having a highly accurate 3D shape can be difficult particularly in the case of curved shapes. Since the shape of the target is assumed to be accurate in determining distortions introduced into images captured by a camera, precision and a high degree of accuracy in the shape of the target assembly and grid can be important to proper camera calibration. Unfortunately, while 3D printers can print relatively small curved targets to a high degree of accuracy; large curved targets are difficult to have printed using generally available 3D printers due to maximum size constraints of such printers. Manufacturing of large curved targets to a high degree of accuracy is also difficult due to changes in shape associated with temperature changes, distortions which maybe created when metal components of the target are welded together etc.

While in some embodiments curved target assemblies are used for calibration purposes, in other embodiments target assemblies with multiple flat sides are used. Large flat surfaces with grid targets printed or applied to them are relatively easy to create. Furthermore they can be easily combined into rectangular or other shapes with a 3D geometry which can be very accurate. Distances to sidewalls and/or corners can be easily detected using visual techniques allowing for predictable centering of a camera at a position between the walls of a target assembly, e.g., half cube or partial box with grids on the inside walls.

The images captured using a rectangular assembly are used for camera calibration purposes. Distortions introduced into captured images of the known target patterns arranged in the know 3D geometry of the target by the camera device capturing the images are detected and calibration information is generated for the individual camera device being calibrated. While the 3D calibration target assembly, and target grid(s) included in the assembly, may have a different shape from the shape of the final surface onto which post-calibration images are to be applied as a texture, the distortions introduced by the camera device including the lens, housing and mounted sensor, can be and are determined from images captured during the calibration process. Calibration information, e.g., distortion information, is then stored. In some embodiments the calibration information is used to adjust a texture map used to map a captured image onto a surface, e.g., a surface of a model of an environment. While the environmental model used by the playback device may have a shape which the same or similar to the shape of the calibration assembly, e.g., a spherical shape, in some embodiments the shape of the environmental model is different from that of the calibration assembly.

The system can package the calibration information into a calibration profile. This system communicates the calibration information to a playback device in some embodiments, and the playback device can use the calibration profile to correct and/or compensate for distortions introduced by an individual camera.

The calibration profile can also advantageously be used by the system to map, or modify a map used to map, the captured image content into a 3D space to simulate the viewing environment.

For example, the captured viewing environment can be approximated as having a characteristic shape corresponding to a 3D surface or object for the purposes of simulating the viewing environment during playback. It can be useful to approximate the viewing environment as being a spherical 3D space, for example, wherein portions of the viewing space map to a surface on the interior surface of the sphere or partial sphere. Alternatively, captured images maybe mapped to surfaces of a model of a different shape.

Because source image content is not captured in a spherical or other simulated 3D viewing space, the system according to certain aspects is therefore configured to map the acquired content into the simulated 3D viewing space prior to playback in order to simulate a real world viewing experience. This maybe and sometimes is done using captured images as textures which are applied to a surface of a model as part of image rendering.

The system can project the source image content into the 3D simulated viewing space using a calibration profile particular to the content acquisition device, or a map modified based on the information included in the calibration profile. For instance, the calibration profile can correspond to a particular camera, lens, type of camera, type of lens, or any combination thereof and may indicate how to modify a UV map which assumes a perfect lens/camera assembly to compensate for distortions introduced by the actual calibrated camera used to capture the images to be applied as textures.

Some existing techniques for calibrating ultra wide angle lenses involve converting the distorted image into a rectilinear image. However, immersive display systems according to certain aspects do not display rectilinear image content.

Where fisheye or other ultra wide angle lenses are used to capture source content, one calibration approach could be to first process the images to map or bend the distorted content into rectilinear space and then process the rectilinear images to map or project into the simulated 3D viewing space. However, this can result in significant losses and is computationally intensive.

To address these and other challenges, the calibration profile according to certain aspects includes information sufficient to allow the system to correct for camera and/or lens distortion/variation as a result or by product of, or as a part of performing the mapping to the simulated 3D viewing environment. This can be accomplished by capturing a calibration image of a physical 3D object, and creating the calibration profile by processing the calibration image. The calibration profile can then be used to project the source content directly into the 3D viewing space while also accounting for distortion/variation, and without first translating into an intermediate space, e.g., without first translating to a rectilinear space to account for lens distortion, thereby significantly reducing losses and computational complexity.

The physical calibration object, e.g., calibration assembly, maybe an object with a grid target or targets on one or more surfaces. The object can be a portion of a sphere with the grid target on the inside surface or another shape such as a half box or rectangular enclosure with grid targets on one or more surfaces.

For instance, the calibration object can form at least a partial sphere, and can be a hemisphere or some other shape having a curved surface or other profile that approximates or otherwise corresponds to the 3D viewing space. The object can include a plurality of grid intersection points or other markers distributed across the object, e.g., across one or more surfaces of the object. However, in other embodiments the calibration target takes the form of half a box with the inside surface forming a 3D viewing space of known size and shape and with easily detectable grid patterns on one or more surfaces.

The source camera/lens to be calibrated can be positioned at a pre-determined position/orientation with respect to the calibration object, and then used to capture the calibration image.

According to certain aspects, the system process the captured image of the calibration object to identify the markers, e.g., the intersection of grid lines, within the image. The system uses this information to generate a mapping usable to project the acquired images into the simulated 3D viewing space.

In some embodiments a digital representation of the physical 3D environment to be simulates as well as a UV texture map corresponding to the digital representation.

The system can locate the markers in the calibration image and determine how the image differs from the expected captured image assuming that the lens and camera operate without defects. Based on the difference between the captured image and the expected location of the markers in the captured image, it is possible to determine what distortions were introduced by the camera device. This information can then be used to adjust a UV map corresponding to a simulated environmental model to compensate for distortions introduced by the camera device and thereby cause the intended portions of a captured image to be applied to the corresponding portions of the mesh model despite the distortions in the actual captured image.

Data representing the correlation can be stored in a calibration profile associated with the source lens and/or camera, and the playback device can use the mapping and digital representation of the 3D object to project the source image content 3D space. For example, a 3D renderer executing on the playback device can paint the image content onto a 3D rendering of the surface of the calibration object using the texture map which has been corrected based on the calibration information.

The low computational complexity of the calibration techniques described herein allows for application of lens/camera calibration profiles dynamically, at the playback device and/or at or near the time of playback, e.g., with a standard UV map assuming ideal camera performance being modified for each of the left and right camera devices used to capture left and right images based on the calibration information corresponding to the individual camera. In contrast, other techniques, including those involving an intermediate mapping to rectilinear space are more computationally complex, which can make it impractical to dynamically apply the calibration in real time. Rather, such systems may need to apply the calibration to all of the source content up front and store the calibrated content for later viewing. Another advantage of allowing calibration, e.g., adjustment of the UV map based on determined camera distortion information, to be implemented in the playback device is that image encoding can be performed independent of camera calibration and/or camera dependent UV map modification, at the content server, thereby avoiding unintentional amplification of image artifacts which might otherwise occur if attempts were made to modify the images prior to encoding to compensate for camera dependent distortions.

According to some other embodiments, multiple calibration profiles are applied to the image data corresponding to different components in the acquisition and/or playback chain. For instance, the system may apply a first calibration profile to the source content, creating an intermediate or mezzanine level image, and then apply a second calibration profile to the intermediate image. As an example, one of the profiles may calibrate the image to the lens and/or camera used acquire the source content, whereas the other profile may correspond to componentry in the particular playback device. For instance, the second calibration profile may calibrate the displayed content according to optical characteristics of lenses in the head mounted display.

Given the ability to support real time and near real time encoding and streaming to multiple users, the methods and apparatus described herein are well suited for streaming scenes of sporting events, concerts and/or other venues. Moreover, by supporting wide viewing angles including those up to and including 360 degrees and/or 3D viewing, the methods and apparatus disclosed herein are well suited for use with head mounted displays intended to provide a user a 3D immersive experience, with the freedom to turn and observe a scene from different viewing angles as might be the case if present and the users head turned to the left, right, and rear. This can allow users at live events to observe not only the stage, field or other main area of interest, but to also be able to turn and appreciate views of the environment, such as the stadium or crowd. While embodiments described herein can be used to capture, stream playback content in real time or near real time, such embodiments are not limited to real time applications.

An exemplary camera calibration system, in accordance with some embodiments, includes: a target apparatus having a known three dimensional (3D) shape and including markers on an interior surface of said target apparatus at known locations; a camera calibration apparatus including: a camera interface for receiving an image of the surface of said target apparatus from a first camera being calibrated; and a camera calibrator configured to compare actual locations of the markers in said image to expected locations of said markers and to generate a set of camera calibration information based on differences between the actual locations of the markers in said image and the expected locations of said markers. An exemplary camera calibration method, in accordance with some embodiments, includes: operating a first camera to capture an image of an interior surface of a target apparatus having a known three dimensional (3D) shape and including markers on an interior surface of said target apparatus at known locations; operating a camera interface to receive the image of the interior surface of said target apparatus from the first camera being calibrated; and operating a camera calibrator configured to compare actual locations of the markers in said image to expected locations of said markers and to generate a set of camera calibration information based on differences between the actual locations of the markers in said image and the expected locations of said markers.

Numerous variations on the above described methods and apparatus are possible. Numerous additional aspects, benefits and embodiments will be discussed in the detailed description which follows.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements. The systems and methods described herein are particularly well suited for and discussed primarily in the context of stereoscopic video, but can be applied to two-dimensional (2D) video as well.

FIG. 16E is a fifth part of a flowchart of an exemplary method of performing camera calibration and/or using camera calibration information in accordance with an exemplary embodiment.

FIG. 16 comprises the combination of FIG. 16A, FIG. 16B, FIG. 16C, FIG. 16D and FIG. 16E.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages without necessarily achieving other aspects or advantages.

Figure 1:
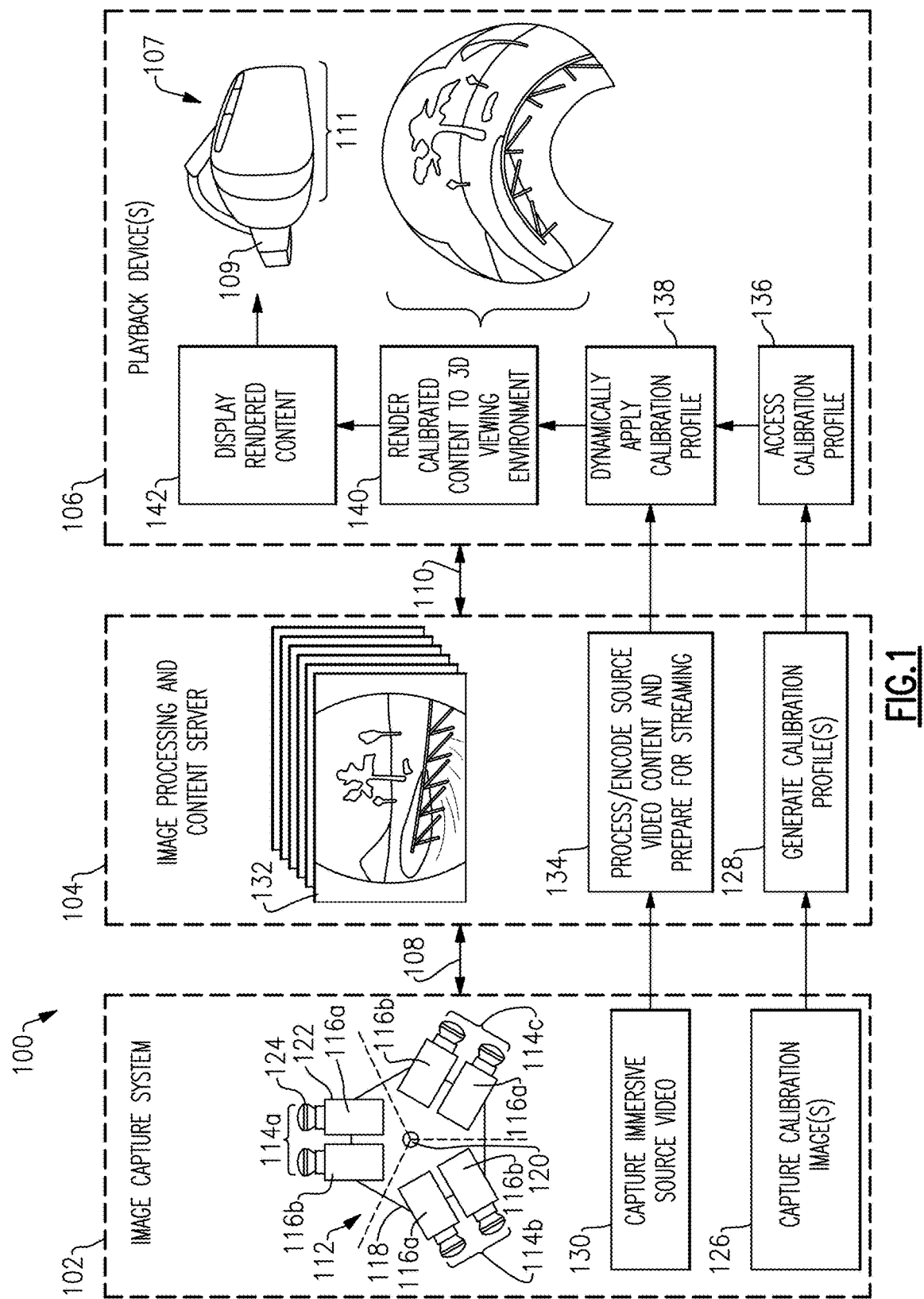
FIG. 1 shows an immersive content system for capturing immersive source content and delivering the content to one or more playback devices which display the immersive content.

FIG. 1 shows an example of an immersive content system 100 including an image capture system 102, an image processing and content delivery server 104, and a set of one or more playback devices 106.

The image capture system 102 can be in networked or other electronic communication with the content server 104 via a first link 108, which can in turn be in networked or electronic communication with the playback device(s) 106 via at least one second link 110. The first and second links 108, 110 can be over a local area network (LAN), wide area network (WAN) such as the Internet, or any appropriate type of network or other connection. One or more of the links 108, 110 can be a hybrid fiber-coaxial (HFC) network or a satellite network, for instance. In one embodiment, the first link 108 is over a LAN at a sporting event venue, and the second link 110 is over a WAN, where the playback device 106 is at a viewer's home. While only a single image capture system 110, content server 104, and playback device 106 are shown, there can be multiple ones of any of these components. In another embodiment, the second link 110 includes a LAN connection to a first playback device 106 worn by a user located in proximity to the content server 104, and a WAN connection to a second playback device 106 worn by a user that is remote from the content server 104.

The image capture system 102 includes at least one camera rig 112 or other type of image content acquisition unit. The camera rig 112 can be capable of acquiring content for use in providing an immersive experience, and can include a plurality of cameras or other imaging devices. While only one camera rig 112 is shown, the image capture system 102 can include more than one camera rig 112 to capture content from different points of view in a single viewing theater and/or or to capture content form multiple different viewing theaters. As one example, a first camera rig 112 can be placed near a sideline at center court of a basketball game, second and third camera rigs 112 may be placed near each basket, and one or more additional camera rigs 112 can be placed at different locations in the stadium, such as in the stands with the audience, suspended in the air above the court, etc.

The illustrated camera rig 112 includes multiple camera pairs 114a, 114b, 114c, where each camera pair 114a, 114b, 114c captures images corresponding to different sectors of a 360 degree field of view. For instance, each camera pair 114a, 114b, 114c may have at least a 120 degree field of view, and may have larger fields of view up to or exceeding 180 degrees, in which case adjacent camera pairs 114a/114b, 114a/114c, 114b/114c capture overlapping content. The camera pairs 114a, 114b, 114c each include a right eye camera 116a and a left eye camera 116b intended to capture images corresponding to left and right eyes of a viewer. Each camera 116a, 116b is mounted or otherwise supported to a support structure 118, which can include a metal frame with mounts for fastening the cameras 116 to the frame. An upward facing camera 120 is also included for capturing an upward view. A downward facing camera which is not visible in FIG. 1 may be included below camera 120.

Stereoscopic camera pairs are used in some embodiments to capture pairs of upward and downward images, while in other embodiments a single upward camera and a single downward camera are used. In still other embodiments a downward image and/or upward image is captured prior to rig placement and used as a still ground or sky/ceiling image for the duration of an event. Such an approach tends to be satisfactory for many applications given that the ground and sky/ceiling views tend not to change significantly during an event.

Each camera 116 can include image processing electronics and at least one image sensor residing within a camera housing 122. The camera 116 can write video image data captured by the image sensor to one or more storage devices, which can reside within the camera housing 122, reside in a separate recording unit mounted to the camera housing 122, or otherwise be connected the camera 116, such as via a cable connected to a video output port of the camera 116, or via a wireless connection.

The image sensor can be any type of video sensing device, including, for example, but without limitation, CCD or CMOS sensors. The image sensor includes a color filter array, which can implement a Bayer pattern for example. Various size sensors can be used. In some configurations, the camera 116 can be configured to record and/or output video at at least "2 k" (e.g., 2048×1152 pixels), at least "4 k" (e.g., 4,096×2,540 pixels), at least "5 k" horizontal resolution (e.g., 5120×2700 pixels), at least "6 k" horizontal resolution (e.g., 6144×3160), or greater resolutions. In further embodiments, the resolution is between at least one of the aforementioned values (or some value between the aforementioned values) and about 6.5 k, 7 k, 8 k, 9 k, or 10 k, or some value there between). As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. Where the camera 116 is configured to record and/or output video at a particular resolution level including any of the above resolution levels, the image sensor has a resolution that is at least as large as that particular resolution level. In one embodiment, the image sensor is a CMOS device with a Bayer pattern color filter array, having a resolution of 6 k (6144×3160).

Each camera 116a, 116b can additionally be configured to record and/or output video data at frame rates of at least 12, 20, 23.98, 24, 25, 29.97, 30, 47.96, 48, 50, 59.94, 60, 120, or 250 frames per second, or other frame rates between these frame rates or greater.

As shown, each camera 116 can also have a lens 124 that can be releasably attached to a lens mount provided on the camera housing 122, while in some other cases the lens 124 can be fixably attached to the camera housing 122. The lens 124 generally focuses or otherwise refracts incoming light before the light enters an opening of the housing 122 and is incident on the image sensor. The lens 124 can be in the form of a lens system including a number of optical, electronic, and/or mechanical components operating together to provide variable focus, aperture, and/or zoom.

The lens 124 can be a wide angle lens having a relatively short focal length. For instance, the lens 124 can be an ultra-wide angle lens having a focal length shorter than the short length (e.g., vertical dimension) of the image sensor. For instance, where the image sensor is compatible with the Advanced Photo System type-C (APS-C) format, the image sensor may be 25.1 millimeters (mm) (h)×16.7 mm (v), and the lens 124 can have a focal length of less than 16.7 mm, or less than 15 mm. Or, where the image sensor is a full-frame sensor corresponding to a 35 mm film format, the lens 124 can have a focal length of less than 24 mm.

The lens 124 can be a fisheye lens, for example, which exhibits curvilinear barrel distortion. The image created using a fisheye lens may be a substantially or approximately hemispherical image, with a convex, non-rectilinear appearance. The visual angle of the lens 124 can be at least about 180 degrees, such as where a fisheye type lens is used. The lens 124 can have a very large depth of field, particularly where fisheye or other ultra-wide angle lenses are used, which allows substantially the entire image scene to remain in focus.

In some embodiments, the lens 124 is a Canon EF 8-15 mm fisheye zoom lens, having a focal length that is adjustable between 8 mm-15 mm, an aperture of f/4, and a diagonal angle of view of 180 degrees. Such a lens 124 can provide 180 degree circular fisheye images where the image sensor is a full frame image sensor, and can provide 180 degree diagonal angle of view images for image sensors ranging from full frame to APS-C.

The image processing and content server 104, which can also be referred to generally as a content delivery system, can include one or more computing devices, which can be one or more fixed or mobile computing devices, such as one or more servers, desktops, notebooks, laptops, or the like. The computers can include appropriate software and/or hardware for processing video content received from the image capture system 102. Where multiple computers are used, they can be in communication with one another over a LAN or other appropriate network.

Figure 7A:
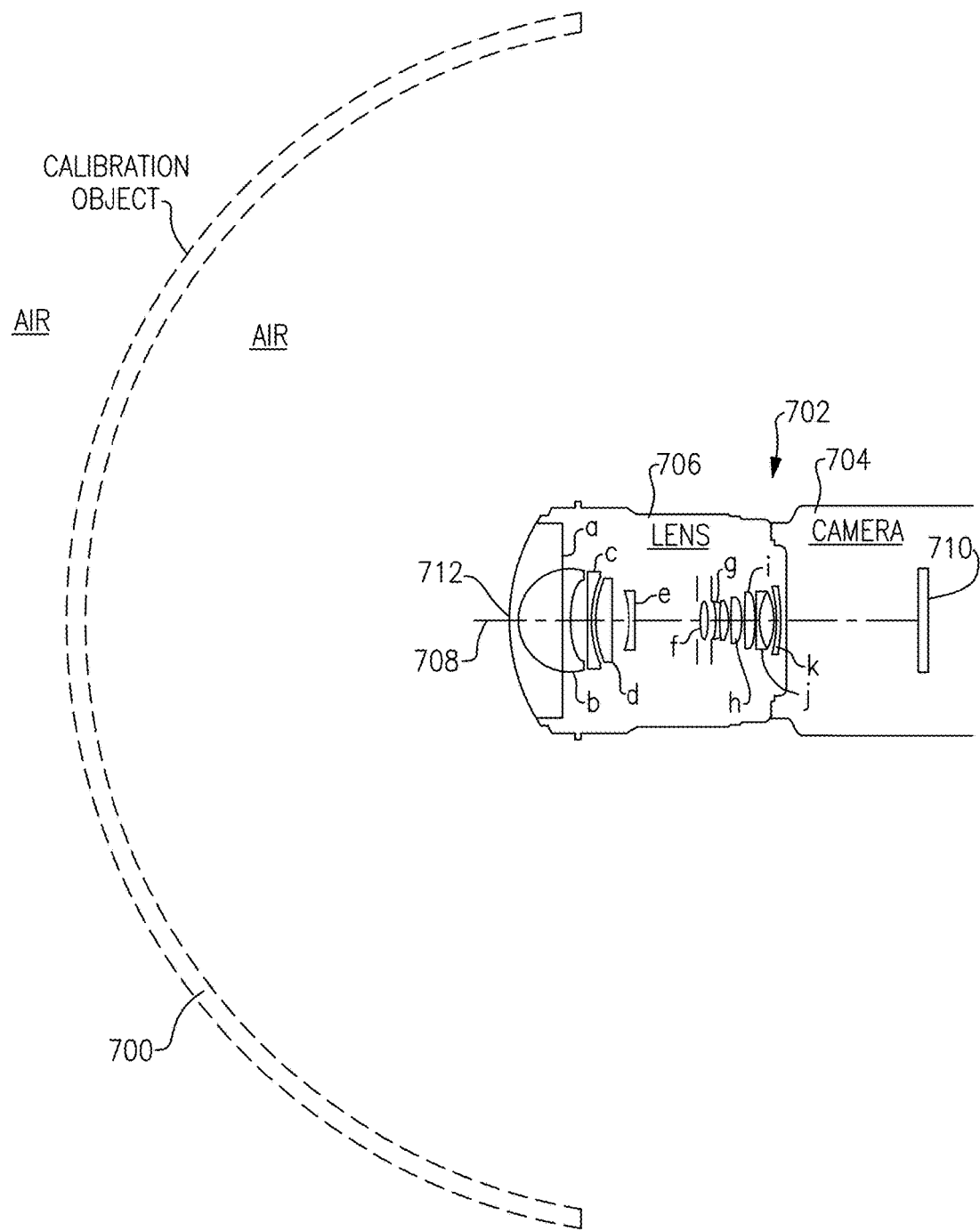
FIG. 7A is a cross-sectional side view of an example of a physical 3D calibration object positioned at a pre-determined location and orientation relative to a camera system.
Figure 7B:
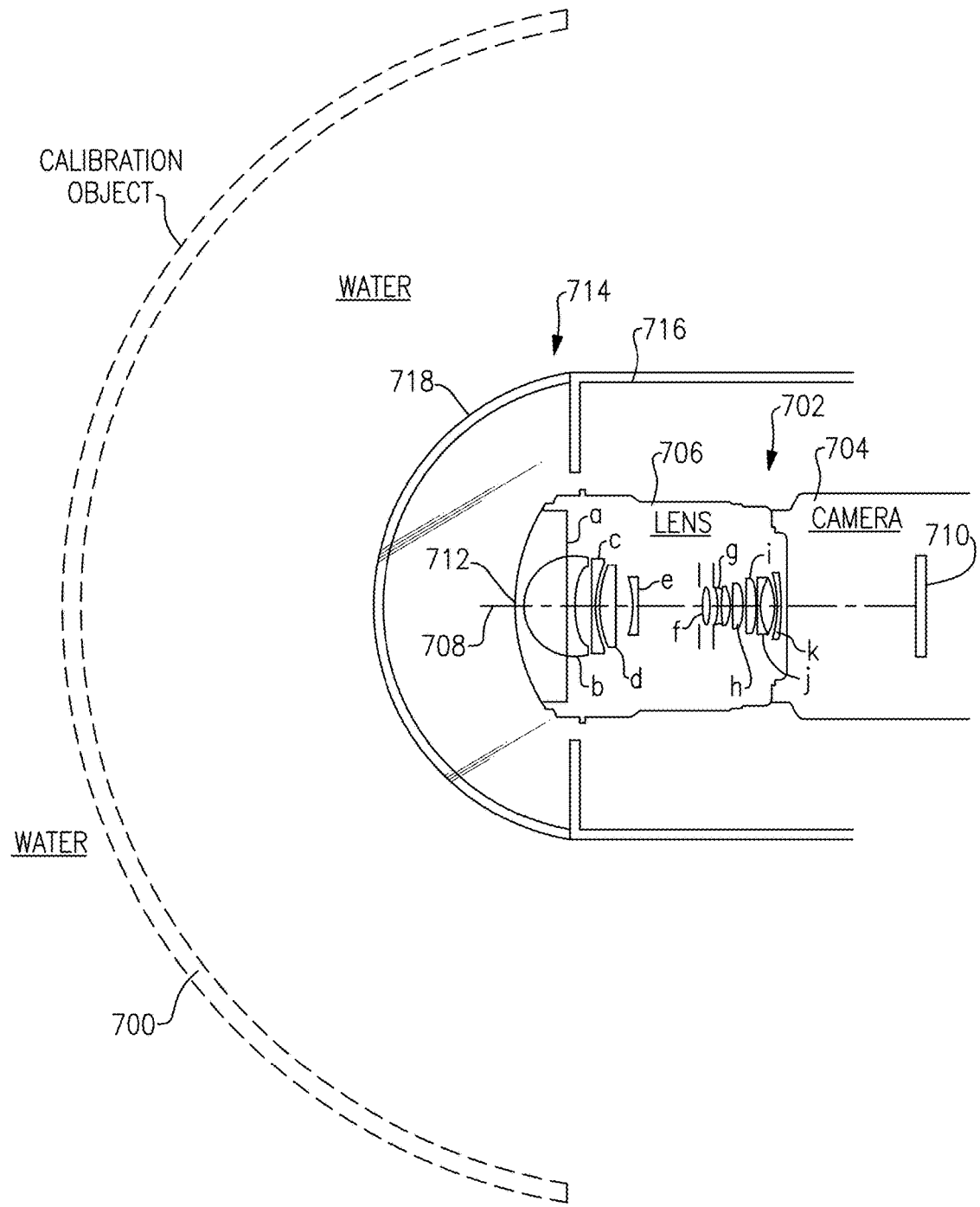
FIG. 7B is a cross-sectional side view of an example physical 3D calibration object positioned at a pre-determined location and orientation relative to a camera system that is configured for underwater use.
Figure 8:
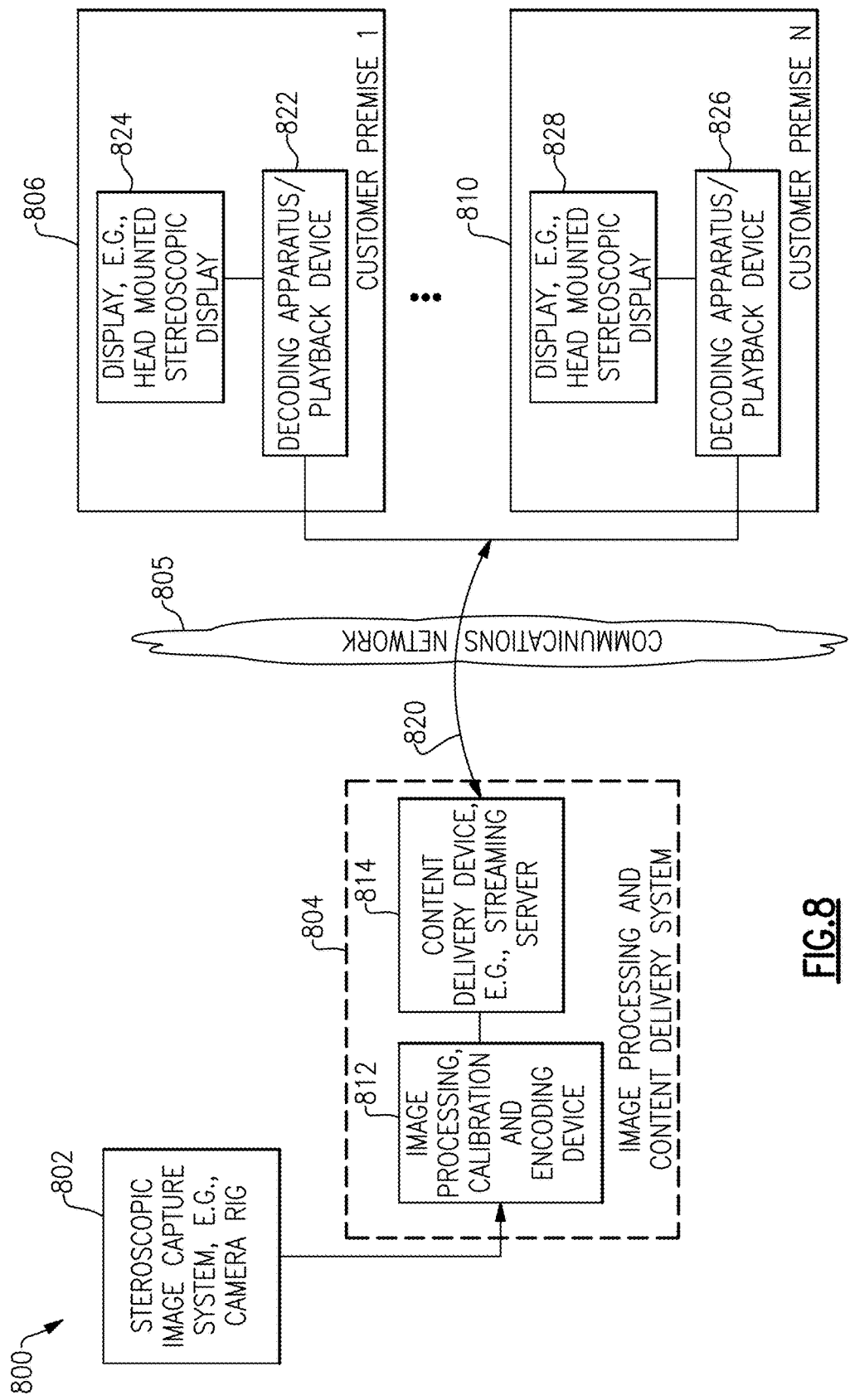
FIG. 8 shows an example of a system in accordance with some embodiments which can be used to capture, stream content, and output content to one or more users.
Figure 9:
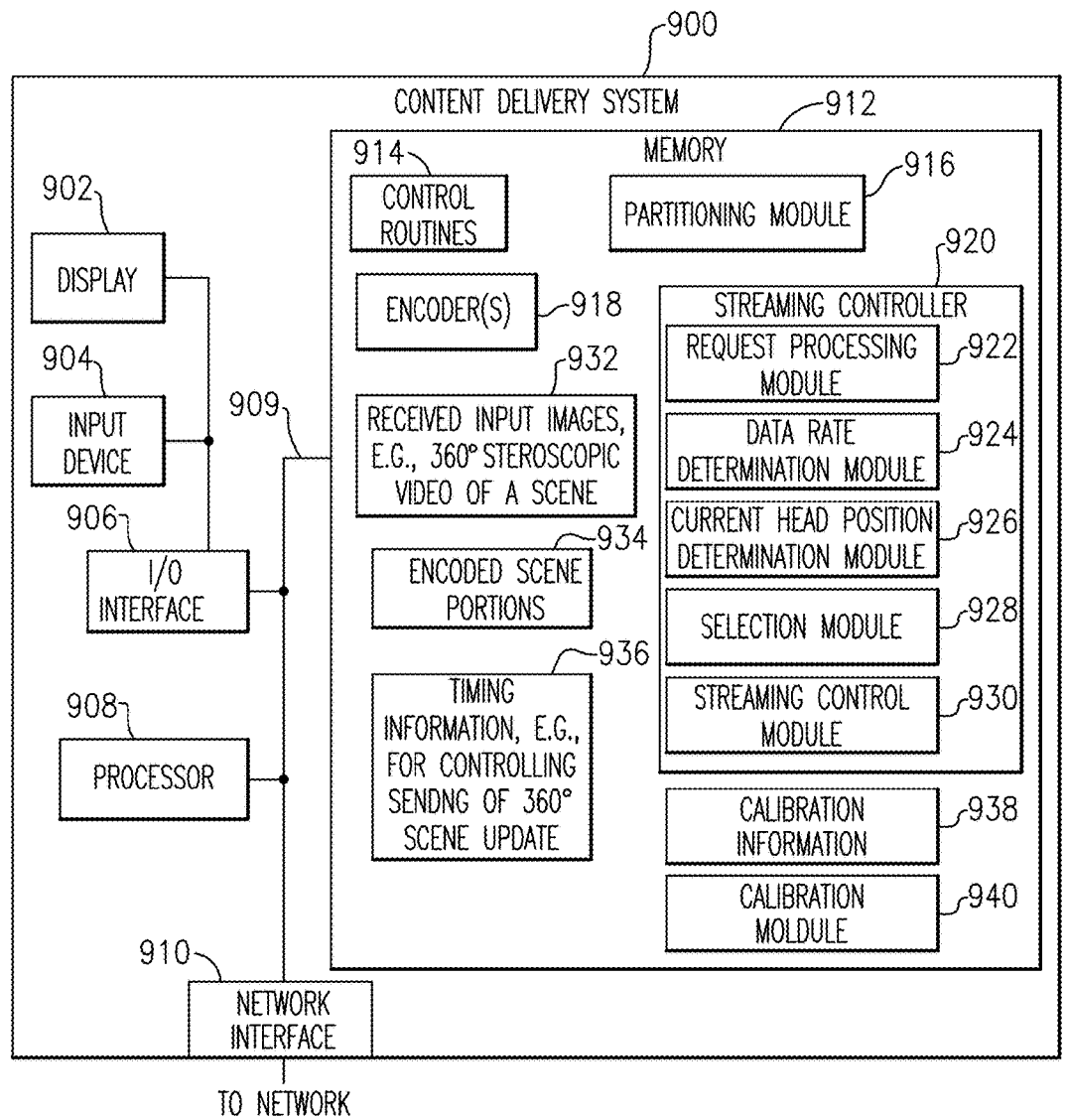
FIG. 9 shows an example of a content delivery system that can be used to encode and stream content in accordance with certain embodiments.

FIGS. 8 and 9 and the corresponding text provide additional details regarding exemplary content delivery systems. U.S. Patent Application Publication Nos. 2015-0346832, titled METHODS AND APPARATUS FOR DELIVERING CONTENT AND/OR PLAYING BACK CONTENT (the '832 publication), 2015-0249813, titled METHODS AND APPARATUS FOR STREAMING CONTENT (the '813 publication), and 2015-0346812, titled METHODS AND APPARATUS FOR RECEIVING CONTENT AND/OR PLAYING BACK CONTENT (the '812 publication), which are incorporated by reference in their entireties herein, also provide additional details regarding exemplary content delivery systems, and describe additional content delivery systems that are compatible with the embodiments described herein. For example, compatible content delivery systems are provided in FIGS. 1 and 7 of the '832 publication and the accompanying text. The content delivery system 104 can be any of the content delivery systems described herein (e.g., with respect to FIGS. 7 and 8) or in any of the '812, '813, or '832 publications.

The playback device(s) 106 can generally include any playback device capable of displaying immersive content to the user. The playback device 106 can include appropriate hardware and software for receiving, processing, storing, and/or displaying immersive content received from the content delivery system 104.

For instance, the playback device 106 can be a head-mounted display device 107 including straps 109 or other apparatus for attaching to the users head. The head-mounted display device 107 can include a housing 111. The housing 111 can include a pair of goggles having one or more lenses (e.g., left and right lenses) supported within a frame of the goggles and disposed between the viewers face and a display having at least one liquid crystal display (LCD) or other type of display screen(s) supported by or within the housing 111. Electronics within the housing can be used to receive and process source content, and control the display to present the source content to the viewer. FIGS. 6A-6C, 8, and 10 and the corresponding text provide additional details regarding exemplary head-mounted displays and other playback devices. The '832, '812, and '813 publications also describe additional playback devices that are compatible with the embodiments described herein. For example, compatible playback devices are provided in FIGS. 1 and 8 of the '832 publication and the accompanying text. The playback device 106 can be any of the content delivery systems described herein (e.g., with respect to FIGS. 6A, 6B, 8, and 10) or in any of the '832, '812, or '813 publications.

Referring still to FIG. 1, source content for use in providing immersive viewing is captured by the image capture system 102 at data flow block 130 and delivered to the content delivery system 104, via the link 108, for example. However, prior to capturing the source video the system 100 generates calibration information. In particular, the image capture system 102 at dataflow block 126 captures one or more calibration images. In some embodiments, the image capture system 102 is used to capture a calibration image for each camera 116 in the camera rig(s) 112. This can be advantageous because the resulting calibration images can be used to calibrate each camera 116 (and/or corresponding lens 124) on an individual, customized basis, thereby accounting for differences between cameras 116 and/or lenses 124. In some other embodiments, on the other hand, all of the cameras 116 are not used to capture calibration images, as will be discussed further with respect to FIG. 2.

Figure 2:
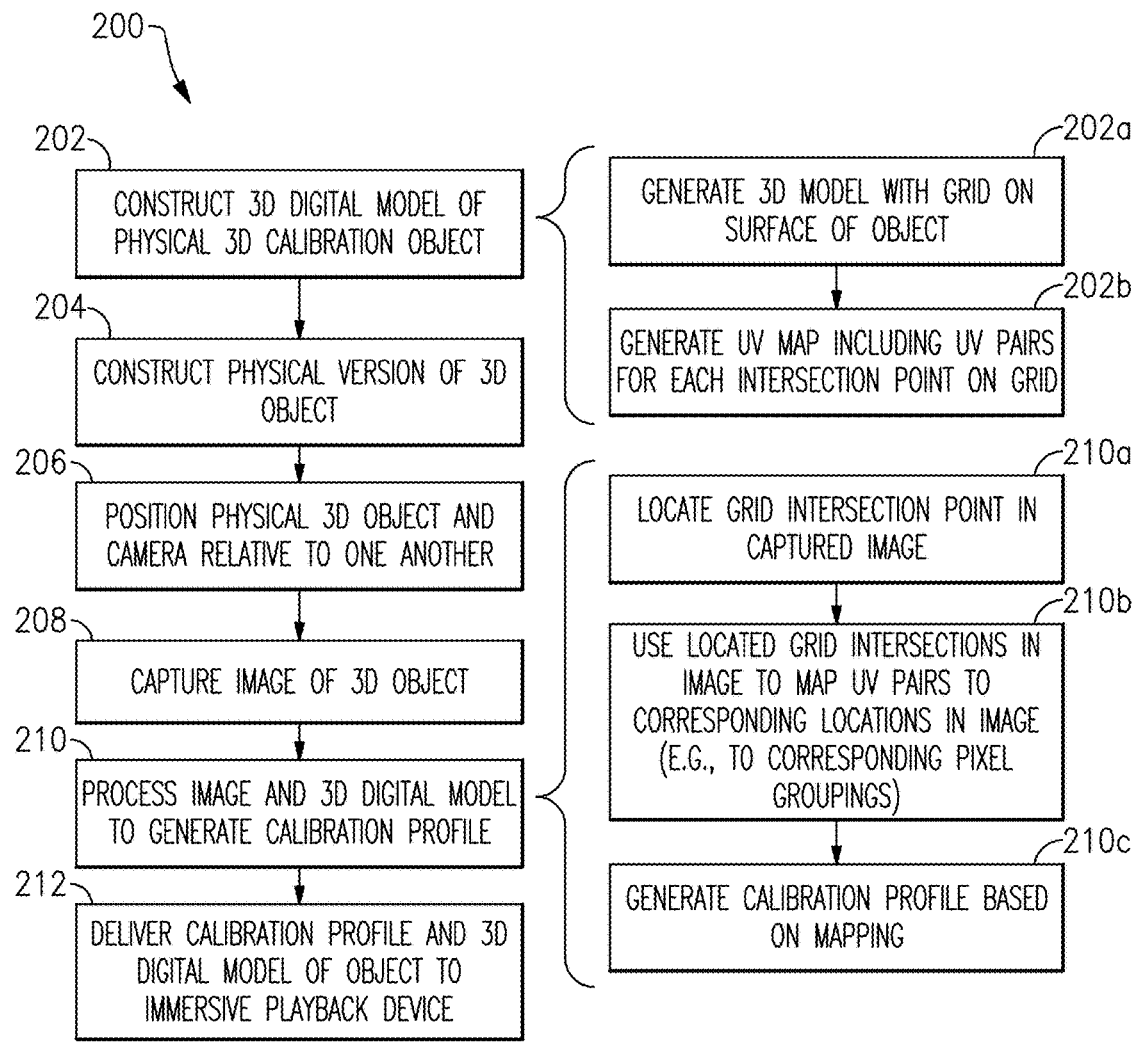
FIG. 2 is a flowchart showing a method of generating a calibration profile for use in playing back immersive content, where the calibration profile is derived from a calibration image taken of a 3D physical object, according to certain embodiments.
Figure 3A:
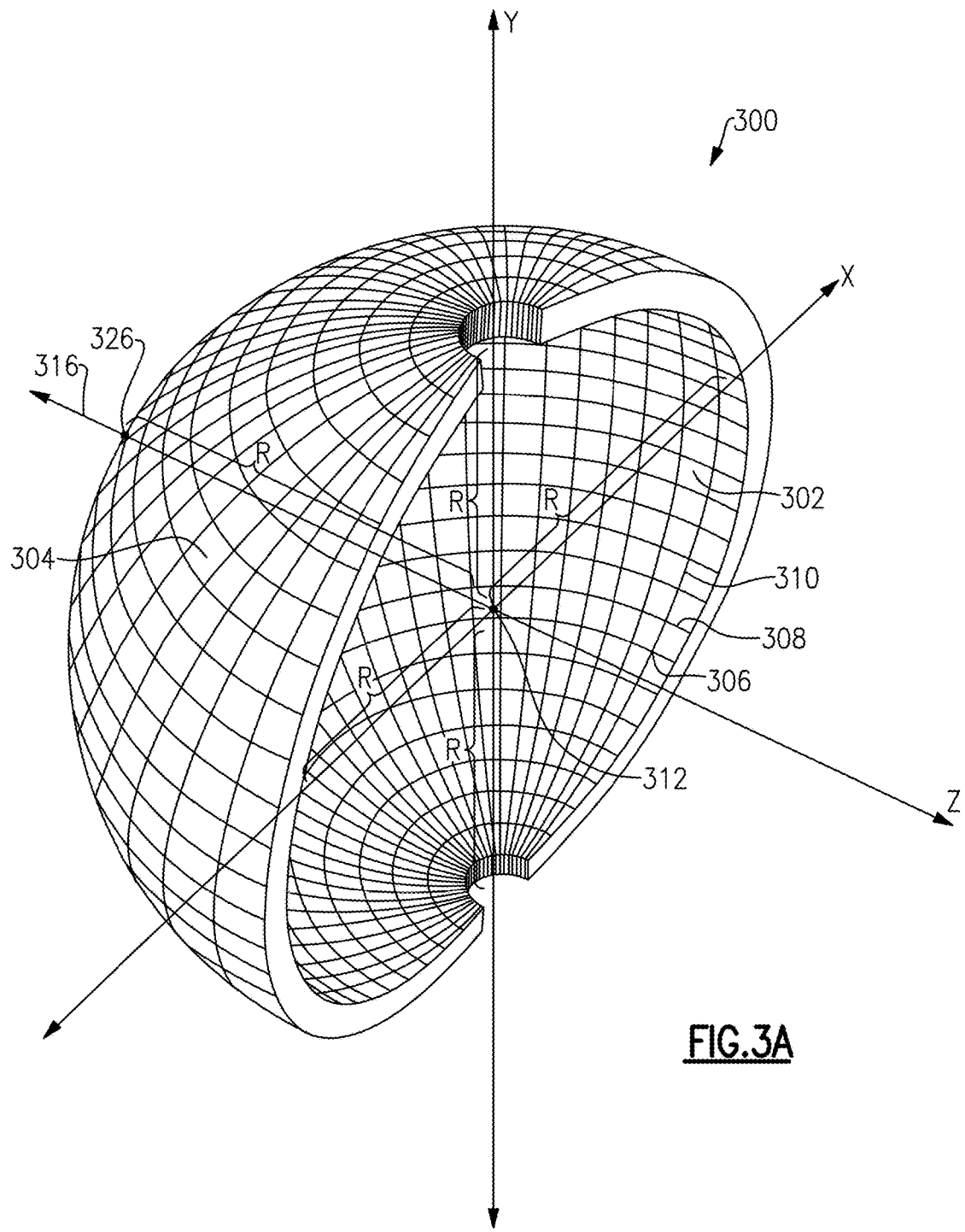
FIG. 3A is a perspective view of an example of a 3D physical calibration object, where the object is shaped has a hemisphere.
Figure 3B:
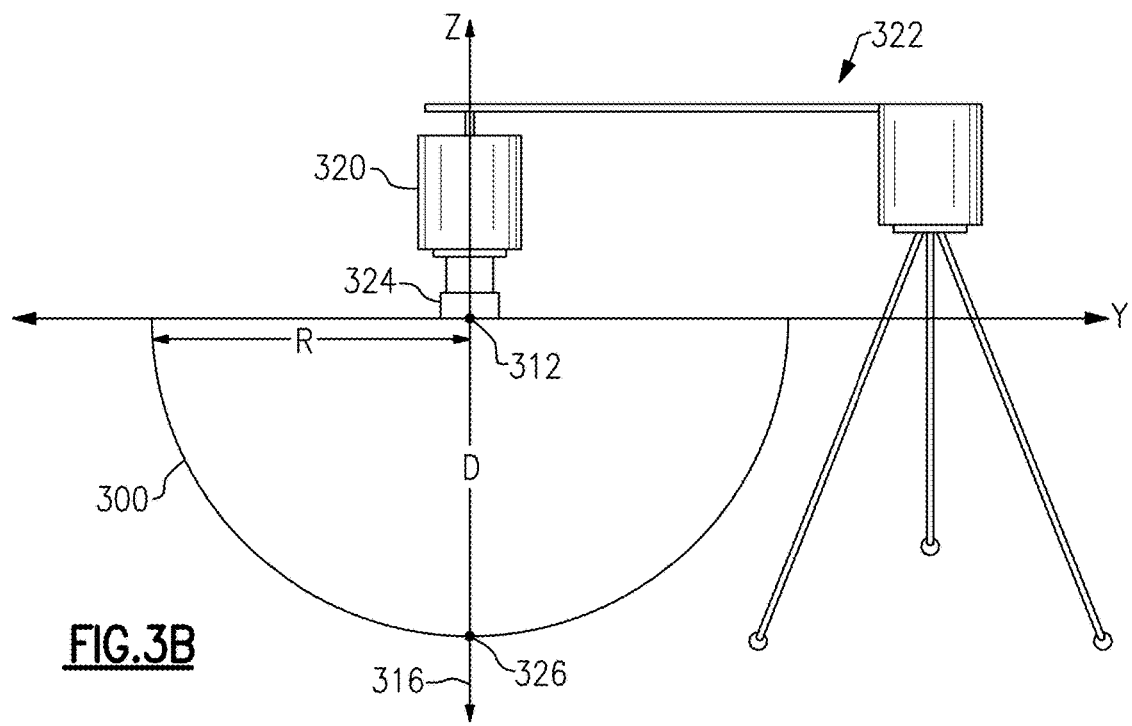
FIG. 3B is a side view of an example of a calibration object and camera for capturing immersive content, where the camera is positioned above the calibration object at a pre-determined orientation and distance.
Figure 3C:
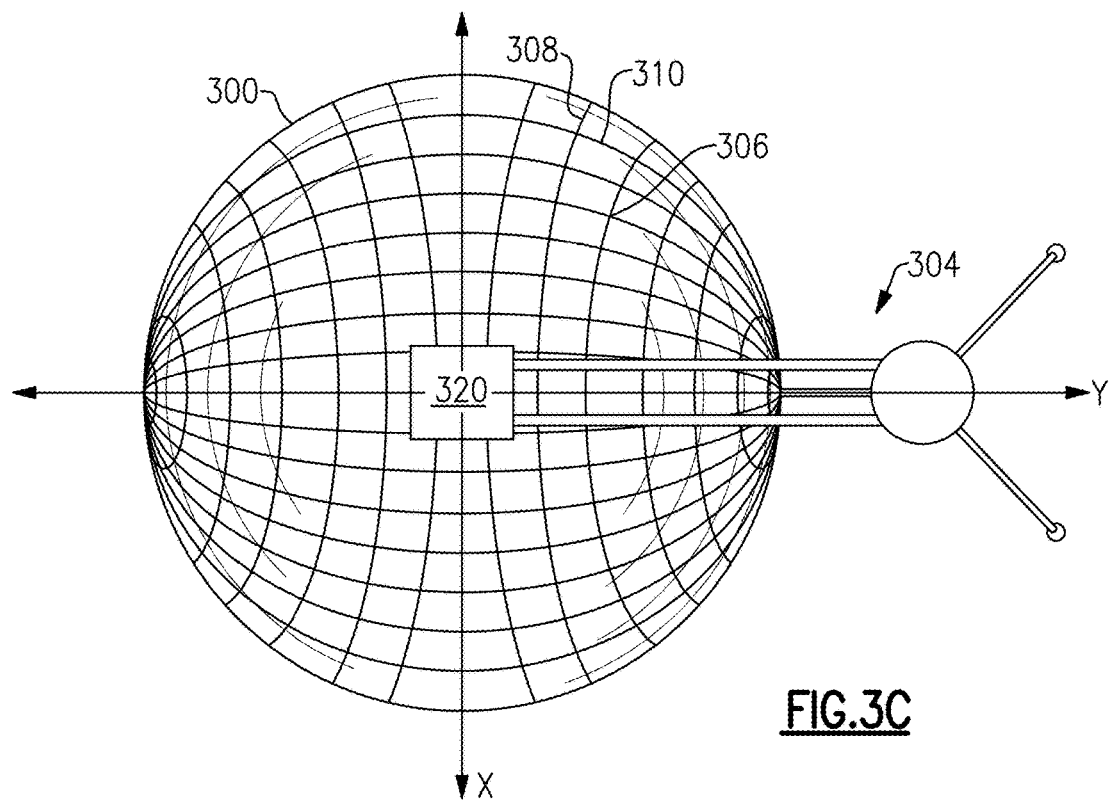
FIG. 3C is a top view of an example of a calibration object and camera for capturing immersive content, where the camera is positioned above the calibration object at a pre-determined orientation and distance.

As is discussed in further detail herein, such as with respect to FIGS. 2-5, the calibration image(s) can be taken of a 3D physical object having one or more 3D surfaces, such as the hemispherical object shown and described with respect to FIGS. 3A-3C.

Once the calibration images are captured, the images are delivered to the content delivery server 104. For instance, the calibration images may be delivered from the image capture system 102 via the link 108 or any other appropriate mechanism, although other approaches are possible as is detailed further below.

At block 128 the content delivery system 104 or other appropriate component generates one or more calibration profile(s) corresponding to the source camera 116 and/or lens 124 by processing the calibration image. For instance, the content delivery system 104 locates regions in the calibration image corresponding to markers on the physical 3D object. This information can be used to map portions of the image to a texture map corresponding to a digital representation of the physical 3D object. The content delivery system 104 can include the resulting mapping as part of the calibration profile, such as in a file along with the digital representation of the 3D object. The process of generating the calibration profile is described in greater detail herein, e.g., with respect to FIG. 2. A detailed example of a calibration file is shown and described below with respect to FIG. 5.

In the illustrated example, the content delivery system 104 delivers the calibration profile to the target playback device(s) 106 via the link 110 for use in playing back the content.

While the embodiment shown in FIG. 1 depicts the content delivery system 104 receiving the calibration images and generating the calibration profile, in some other embodiments some other computing device generates the calibration profile. For instance, in some other embodiments, the calibration profile is generated at or near the time the camera 116 and/or corresponding lens 124 are manufactured, at or near the time the camera rig 112 is assembled, or at some other point in time when the image capture system 102 may not be linked to the content delivery system 104. In such cases, the calibration profile may be generated by a separate computer and then delivered to the content delivery system 104 and/or playback device(s) 106. In one such implementation the image capture system 102 stores one or more files including calibration profiles for the cameras 116 and/or corresponding lenses 124 in the camera rig(s) 112, and delivers the calibration profile(s) to the content delivery system 104. For instance, the image capture system 102 may delivery the calibration profiles in association with the captured source content, e.g., at or near the time of streaming.

In another implementation, one or more calibration profiles are pre-loaded on the playback device 106 at manufacture, or downloaded to the playback device 106 after purchase, and the playback device 106 selects the appropriate calibration profile from on-board memory at playback 106.

The playback device 106 can store a number of calibration profiles corresponding to different compatible cameras and/or lenses. The playback device 106 can be configured to detect the camera 116 and/or corresponding lens 124 used to capture the source content at the time of playback, and select the proper calibration profile based on the identified camera 116 and/or lens 124. For instance, an indication as to the camera 116 and/or lens 124 used to generate the source content may be delivered to the playback device 106 in association with the source content. The indication may be in the form of a serial number of the source camera 116 and/or lens 124, or any other appropriate type of identifying information such as a camera and/or lens type.

The image capture system 102 begins to record source video content 132 at block 130. The captured source content 132 is delivered to the content delivery system 104. For instance, the captured source content 132 can be continuously streamed to the content delivery system 104 for live streaming. Or, in some cases where live streaming is not used, the source video content 130 can be stored local to the image capture system 102, such as in memory associated with the individual cameras 116, or in a common recorder connected to the camera rig 112, for later delivery to the content delivery system 104. As depicted in FIG. 1, the source video content can include highly distorted images where fisheye or other ultra-wide angle lenses 124 are used.

At data flow block 134, the content delivery system 104 receives the source content and encodes and/or otherwise processes the source image content as appropriate to prepare the image content for streaming. For instance, the source video content 132 received from the image capture system 102 may be captured using the camera rig 112 and delivered as separate streams or files each corresponding to a different camera 116, camera pair 114, or viewing scene portion.

At data flow block 134 the content delivery system 104 can perform a variety of image processing functions including camera cropping and compression/encoding of captured images. Streaming of content can be a function of feedback information received from the playback device(s) 106 over the link 110. Such feedback can include viewer head position and/or user selection of a position at the event corresponding to a camera rig 102 which is to be the source of the images. For example, a user may interact with the head-mounted display device 107 to select or switch between images from a camera rig positioned at centerline of a football field to a camera rig positioned at a field goal within the simulated 3D environment. The content server 104 can respond to changes in selected viewing position to stream images captured using the camera rig 112 that corresponds to the selected viewing position.

According to certain embodiments the content delivery system 104 can implement sophisticated encoding processes which can facilitate streaming applications. For example, the content delivery system 104 in some embodiments separately encodes portions of the source content corresponding to different viewing angles, and transmits to the playback device(s) 106 only a select subset of the encoded data sufficient to display to the viewer the portion of the viewing scene the viewer is currently looking at.

In some implementations, the content delivery system 104 additionally creates multiple encoded versions of the same image scene content, such as multiple encoded versions corresponding to different quality and/or resolution levels. In such cases, the content delivery system 104 selects an appropriate encoded version of the content for streaming to the playback device 106, e.g., based on available bandwidth.

Additional details regarding content delivery systems capable of these and other sophisticated image processing and encoding techniques are provided in the '832, '812, and '813 publications. In particular, FIGS. 2A-6 and 14A-14B of the '832 publication describe some such techniques, among other portions of the '832, '812, and '813 publications.

After processing the source video content 132 and/or determining which of the source video content 132 to transmit to the target playback device 106 based on head-position information or other feedback from the playback device 106, the content delivery system 104 streams the content to the playback device 106 via the link 110.

The playback device 106 processes the received content as appropriate upon receipt. For instance, the playback device 106 may decode (e.g., decompress) some or all of the received image data. Moreover, the playback device 106 may further process the received image data to identify some or all of the received video frames to render for playback. A variety of other appropriate processing steps can be applied to the image data, some or all of which may be applied prior to calibrating the image data. The calibration process will now be discussed.

At block 136, the playback device 106 of illustrated embodiment accesses one or more appropriate calibration profiles to apply to the decoded video image frames. For example, the content delivery system 104 in some implementations transmits calibration profiles corresponding to each of the cameras 116 and/or lenses 124 of the camera rig(s) 112. Since the calibration profiles are camera dependent and do not normally change during playback, they can be sent to the playback device 106 and buffered or otherwise stored by the playback device 106 prior to streaming.

The playback device 106 may store the calibration profiles locally and, as video content is received from the content delivery system 104 and identified for playback, the playback device 106 processes the received content to identify the proper calibration profile to apply, e.g., the calibration profile corresponding to the source camera 116 and/or lens 124. For instance, the content delivery system 104, image capture system 102, or other appropriate component may embed information in the streamed content which is sufficient to enable the playback device 106 to determine which calibration profile to apply. The streamed content can include alphanumeric strings (e.g., serial numbers) or other identifiers for different portions of the video image data identifying the camera 116 and/or lens 124 used to capture the image data corresponding to each portion. The playback device 106 in such a case may maintain a table or other data structure mapping identifiers to corresponding calibration profiles, and can look up the proper calibration profile with the table using the received identifier. A variety of mechanisms are possible, and some additional examples are described below with respect to FIG. 4. For instance, information sufficient to identify the proper calibration profile (or the calibration profile itself) can be added to a manifest file generated by the image processing and content server 104 and sent to the playback device 106. Such information can be sent as a separate file, on a file basis. Or the information for identifying the calibration profile (or the calibration profile itself) can be embedded in the transport stream, and in some such cases can change on a scene-by-scene basis, or on some other appropriate basis.

At data flow block 138, after identifying and accessing the proper calibration profile for video frames to be rendered, the playback device 106 applies the calibration profile to each frame. For instance, as described in further detail herein, e.g., with respect to FIG. 5, the calibration profile can include a table that maps a 3D texture map corresponding to the 3D calibration object to corresponding image frame portions. The table can map vertices in the texture map to corresponding groups of pixels in the image, for example. The playback device 106 in some embodiments invokes a 3D renderer executing on the playback device 106 and provides the 3D renderer with the image frame, the table, and a 3D a digital model that represents of the 3D calibration object. For instance, as is discussed in greater detail with respect to FIG. 5, the digital model can include a polygon mesh corresponding to the 3D object. The 3D renderer uses the received information to map the image frame onto a surface of the 3D object that approximates the viewing scene. Where the 3D object is a hemisphere, for example, the 3D renderer can map the image frame onto the interior, concave surface of the hemisphere, thereby generating a calibrated image frame. This process will be described in greater detail herein, e.g., with respect to FIGS. 4 and 5.

The playback device 106 can then further process calibrated image frames at block 140 to render the image content for display. For example, the playback device 106 may present a view to the user corresponding to a field of view spanning more than that of a single camera 116 and therefore more than a single image frame. Rather, depending on factors such as the width of the field of view presented to the user and/or where the user is currently looking, each output frame may be a composite frame including image data from multiple cameras 116. As such, at block 140 the playback device 106 may, depending on user head position and/or how wide a field of view the playback device 106 presents to the user at any given time, identify calibrated source image frames from multiple cameras 116, and stitch or seam together those image frames or portions thereof to create the composite output frame. The playback device 106 may apply any other appropriate processing to the calibrated image data prior to displaying the image data to the viewer, as desired. The calibration techniques described herein correct for distortions/variations between cameras and/or lenses with little loss, thereby greatly improving the stitching process.

At block 142 the playback device 106 provides the output frames to the display of the playback device 106. For instance, where the playback device 106 is a head-mounted display 107, the playback device 106 drives the display screen(s) supported by the housing 111, providing the viewer with an immersive simulated 3D environment. The display device 106 can output content to the viewer at any desired frame rate. The output frame rate can be the same as the capture frame rate or can be some lower frame rate. The frame rate can be selectable by the user and/or adjusted automatically, e.g., dynamically based on available network bandwidth.

FIG. 2 is a flowchart 200 showing a method of generating a calibration profile for use in playing back immersive content, where the calibration profile is derived from a calibration image taken of a 3D physical object, according to certain embodiments. For instance, the method of FIG. 2 can be performed for each camera 116 on the camera rig 112 and/or each lens 124 of the image capture system 102 of FIG. 1. This results in a custom calibration profile being generated for each camera 116 in the rig(s) 112, which can improve accuracy.

In other cases, the method is not performed for each camera 116 in the rig(s), and may be performed only once. For instance, in some cases a single calibration image is taken using only one of the cameras 116 in the camera rig 112. The single calibration image can be used to calibrate all of cameras 116 in the rig, assuming each camera 116 is of the same or at least similar type as the camera used to capture the calibration image and/or a same or similar type of lens 124 is attached thereto. While this may allow some amount of loss due to variability across the individual lenses and/or positions of the lenses with respect to the sensors of the respective cameras, calibration complexity is reduced since a single calibration profile can be generated and applied across all of the captured content. In yet further embodiments, the calibration image is taken using a camera and/or lens that is not actually used to capture source content and is not part of the camera rig 112, but is of a same or similar type as the cameras 116 in the camera rig 112 and/or has the same or similar type of lens 124 attached thereto. Again, this approach can result in some amount of loss, but can simplify the overall calibration process.

At block 202, a computing device is used to construct a 3D digital model of a physical 3D calibration object. The computing device may be a server of the content delivery system 104 or any other appropriate computing device. The 3D digital model may be generated using a computer-aided design (CAD) software tool, or a 3D drawing or illustration tool or package, for example. In some embodiments a software tool can be used that performs an automatic tracing process and converts a raster image to vectors by an edge-finding process.

FIG. 3A illustrates an exemplary physical 3D calibration object 300 shaped as a hemisphere. The object 300 has at least one 3D surface, and in the illustrated embodiment has an interior, concave surface 302 and an exterior, convex surface 304. A plurality of markers 306 can be distributed across at least one 3D surface of the object 300. The markers 306 can be used in processing an image of the physical calibration object to generate a calibration profile, as is discussed further herein. The markers 306 in the illustrated example are intersection points of a plurality of horizontal grid lines 308 and vertical grid lines 310 running along the interior and exterior surfaces 302, 304 of the object 300. While the illustrated embodiment includes markers 306 disposed on both the interior and exterior surfaces 302, 304, in some other embodiments markers 306 are only disposed on only one surface. For instance, the markers 306 can be disposed on only the interior surface 302 because that is the surface that approximates the simulated 3D viewing environment and is used to map the source image content to the simulated viewing environment.

Moreover, while the markers 306 shown in FIG. 3A are grid intersection points, other types of markers 306 are possible. In general, the markers 306 can include any type of visually discernable marking or other indicia that can be recognized via computer processing of a captured image of the object 300. As just a few non-limiting examples, the markers 306 in various other implementations can include a plurality of any of the following symbols distributed across any 3D surface of the object 300: "x", "o", "+".

The markers 306 can be distributed substantially or approximately uniformly across a surface of the object 300 as is depicted in FIG. 3A, and such regularity may aid in processing. In some other embodiments the markers 306 are distributed in a non-uniform manner.

The illustrated 3D object 300 is a solid hemisphere with the horizontal and vertical grid lines 308, 310 patterned on the surfaces of the hemisphere. In other embodiments, the object 300 is not solid and has at least one opening. For instance, in another embodiment, the object is a hemisphere constructed of a plurality of horizontally and vertically arranged strips, each shaped as a half-circular arc and sized and arranged with respect to the other strips to construct a hemisphere. The markers of such an object correspond to the intersections of the horizontally oriented strips with the vertically oriented strips.

While the hemispherical shape of the illustrated 3D object 300 can be useful in for immersive viewing because it can be a relatively good approximation of the simulated viewing environment, other shapes can be used. For example, while a hemisphere corresponds to half of a sphere, in other embodiments, the object 300 corresponds to some other portion of a sphere, i.e., more or less than half of a sphere.

In various embodiments, the object 300 can include at least one curved surface and/or concave surface. For example, the object can comprise a half-cylinder, or some other portion of a cylinder, such as where an interior concave surface of the cylinder portion corresponds to the simulated viewing environment. Some other shapes that can be used, without limitation, including a half ellipsoid or other portion of an ellipsoid, or a half ovoid or other portion of an ovoid, half cone or other portion of a cone. In some other embodiments, the 3D object 300 does not include curved surfaces, and may include only planar surfaces. Depending on the embodiment, the 3D object can be comprised of a combination of any of the foregoing shapes.

While illustrated object 300 has smooth surfaces 302, 304, in other cases the surfaces can include a plurality of smaller planar tiles assembled together to create a larger object. While adjacent tiles may be set at an angle with respect to one another, the aggregate object in some such cases may approximate a hemisphere or other object having curved smoothly curving surfaces, particularly when viewed from a pre-determined distance.

The object 300 can be constructed from plastic, metal, laminated paper, or any other appropriate material capable of holding its shape. The grid lines 308, 310 may be drawn onto the surface of the object 300, or in another implementation a number of bent metal rods form the grid lines 308, 310.

The object 300 is a 3D object, as indicated, and can have an interior surface with significant depth. For instance, referring to both FIG. 3A and FIG. 3B, the illustrated object 300 has a maximum depth D corresponding to the radius R of the hemisphere, where the depth D is defined as the distance from the center point 312 to a point 326 on the back of the object 300. In particular, the space the object resides in can be defined by three orthogonal axes x, y, z, where the center point 312 is the center of the cross-sectional circular area that defines the opening of the object 300 and resides in the x, y plane, and the point 326 resides on the z-axis.

In order to approximate a real world viewing environment, it can be useful for a 3D surface of the object 300 to be symmetric in at least one dimension with respect to a point that corresponds to a viewer perspective. For example, the illustrated object 300 can have a viewing perspective at or near the center point 312, or at some other point along or near the z-axis, such that the interior surface 302 of the object 300 is substantially symmetric about the viewing perspective and/or about the z-axis.

Returning to FIG. 2, at sub-block 202a the user generates the 3D model having the grid on the surface of the object. Where a CAD tool is used to generate the 3D digital model corresponding to the object 300 of FIG. 3, for example, the user can first draw a hemisphere having the desired size and then draw the grid-lines 308, 310 onto the hemisphere.

At block sub-block 202b a texture map is generated that for the 3D object. For instance, a UV texture map can be created that corresponds to a 2D representation of one or more surfaces of the 3D object. U,V coordinate pairs in the texture map can correspond to intersection points on the grid, for example. In one embodiment, the CAD tool or other software tool used to generate the 3D object also generates the texture map as part of the process of generating the 3D digital object. For instance, the texture map can be one component of a data structure corresponding to the 3D object, as will be discussed further with respect to FIG. 5.

At block 204 a physical version of the 3D digital model is constructed. The digital model can be generated prior to building a physical version of the object 300, and in some such cases the physical object is constructed using the 3D digital model. For instance, the 3D digital model and/or information derived therefrom can be input to one or more devices which automate construction of the physical object, such as a 3D printer or other industrial robot. In some embodiments, the 3D digital model is processed by a device to build a mold, and the mold is then used to construct the 3D calibration object. In other implementations, the physical object is constructed prior to the digital model. For example, in such cases the 3D digital model can be built using on one or more photographs of the physical object, or using one or more measurements taken of the physical object. The physical 3D calibration object 300 in some embodiments is constructed using a computer-controlled-cutting (CNC) water jet cutting machine, although other types of CNC machines can be used. A 3D printing process can also be used to build the calibration object 300.

At block 206 the physical calibration object and a camera are placed relative to one another at a pre-determined orientation to prepare for taking the calibration image. FIGS. 3B and 3C show side and top views respectively of a camera 320 supported by a tripod 322 and positioned relative to a hemispherical calibration object 324. In particular, the camera 320 is positioned such that the lens 324 of the camera 320 is located approximately at the center point 312. The camera 320 is positioned such that its optical axis 316 runs through the center point 312 and is normal to the plane defined by the circular cross-sectional opening of the object 300. Referring to FIG. 3A, the camera 316 is positioned such that the optical axis 316 extends along the z-axis and extends through the point 326 on the back of the object 300. As indicated previously, the interior surface 302 of the object 300 can approximate the 3D viewing environment simulated by the playback device 106. Because the center point 312 of the hemisphere or some other point along the z-axis can correspond to the location of the viewer in the simulated viewing environment, locating the lens 324 at or near the center point 312 (or other point corresponding to the viewer perspective along the z-axis) with the interior surface 302 symmetric about the optical axis 316 of the camera 320 can aid in the calibration and rendering process.

The arm of the tripod arm that carries the camera can be manually adjusted to position the lens 324 of the camera 320 at the pre-determined orientation with respect to the object 300. In other cases, the camera 320 is positioned via motorized control, allowing greater accuracy in positioning the camera 320. In some cases a camera positioning guide can be used to assist in precisely positioning the camera 320 with respect to the object 300. The guide can be an integral part of the object 300 or can be separate, e.g., attachable to the object 300. In some implementations, the guide is a micro-adjuster capable of making fine adjustments to the position of the camera 320 in three dimensions (x, y, z). The camera 320 can also include a laser to help facilitate alignment/positioning.

At block 208 the user controls the camera to capture at least one image of the physical 3D object.

At block 210 a computing device processes the captured image of the physical calibration object together with the 3D digital model of the physical object to generate a calibration profile corresponding to the camera, lens, and/or other optical or other componentry used to capture the calibration image.

The computing device that processes the captured image can be a server or other computer within the content delivery system 104, although any computing device can be used. In one embodiment, the image capture system 102 itself is configured to process images captured using the cameras 116 in the camera rig(s) 112 to generate calibration profiles. This can facilitate generation of custom calibration profiles each time a different lens 124 is used with a camera 116 in the rig 112, or when a new camera 116 is mounted to the rig 112, such as to replace an existing camera 116.

At sub-block 210a, the computing device processes the calibration image to locate the markers in the captured image. For instance, referring to FIGS. 3A and 3C, the computing device can process an image of the hemispherical object 300 to identify one or more pixels in the image corresponding to the intersection points 306 in the image. The computing device may use any appropriate image processing technique to identify the intersection points 306 or other markers. For instance, the computing device can employ edge detection algorithms, best-fit analysis, tessellation, Hough transforms, application of a convolutional kernel to the image, or some combination thereof.

Figure 2A:
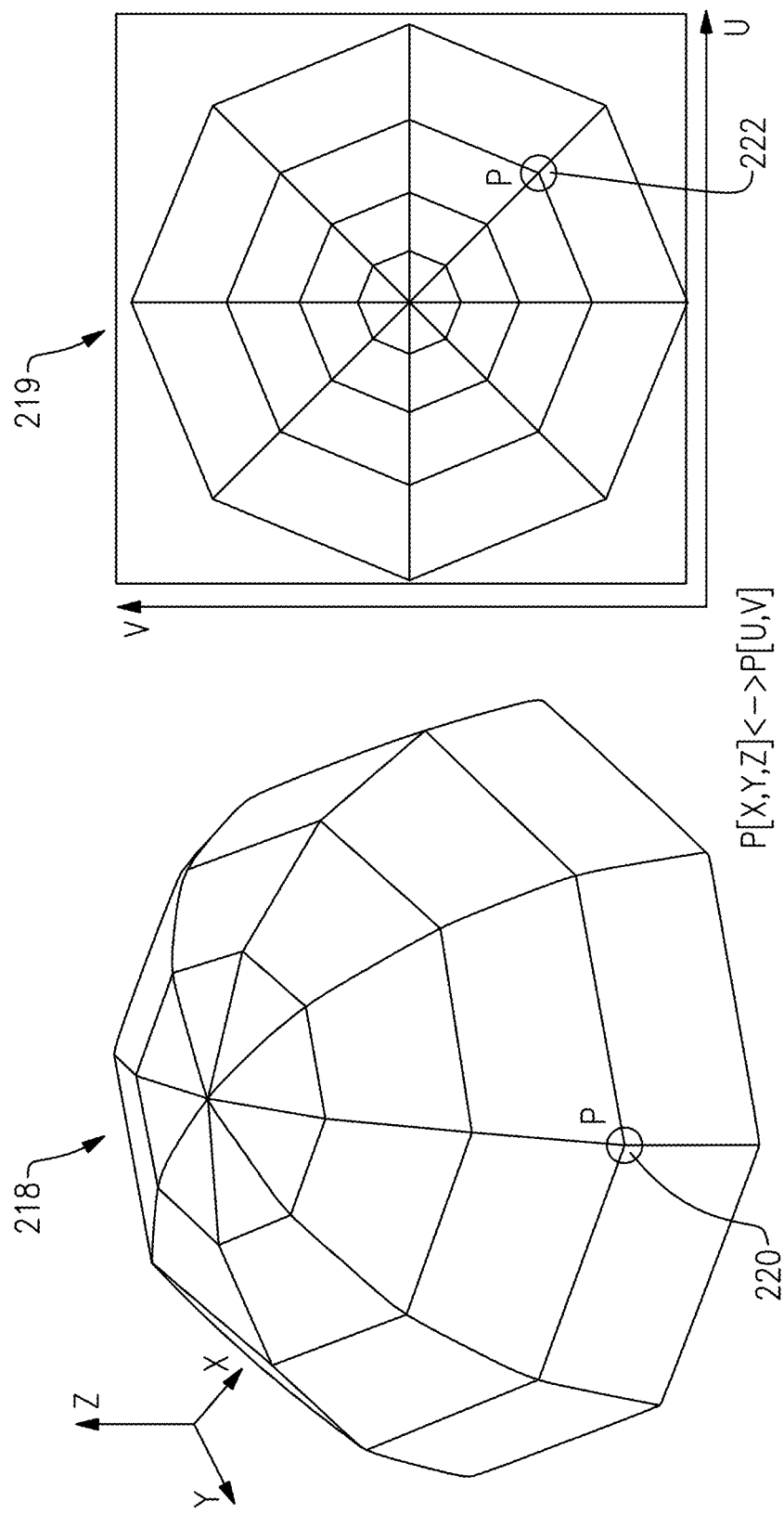
FIG. 2A depicts a UV map (right) and 3D image (left) constructed using the UV map.

Once the grid intersections or other markers are located, the computing device can store a mapping of one or more image locations (e.g., one or more x, y pixel pairs) that correspond to the identified markers. At sub-block 210b, the computing device correlates the identified locations in the image to a 3D texture map. For instance, for each identified group of one or more pixels that corresponds to a grid intersection point, the computing device correlates the group to a U,V pair in a UV mapping, which as discussed comprises a 2D image representation of the 3D digital model of the calibration object. For example, each U,V pair can correspond to an intersection in a 3D mesh associated with the 3D digital model of the calibration object (e.g. a first U,V pair can map to a first vertex (intersection) of a 3D mesh). Each U,V pair can represent the X,Y coordinates of a single pixel in the 2D image texture. And surrounding pixels can be mapped to the 3D mesh by interpolating between nearby U,V pairs. Depicted to the right in FIG. 2A is an image 219 showing a 2D image texture of a 3D digital model as well as a UV map. The 3D image 218 shown to the left in FIG. 2A depicts the result of mapping pixels on to the 3D mesh using the UV map 219.

Once the pixel groups corresponding to the markers are correlated to corresponding points in the texture map, the computing device can generate the calibration profile at subblock 210c. For instance, where the object 300 of FIGS. 3A-3C is used, the computing device can store a table, where each entry lists an identified group of pixels for an identified marker in the 3D object as well as the corresponding point in the 3D texture map. The computing device can generate a file corresponding to the calibration profile that includes the table as well as optionally include a 3D digital model of the calibration object, as will be described further with respect to FIG. 5. In some embodiments the 3D digital model is stored separately from the table.

At block 212 the calibration profile and/or 3D digital model of the calibration object are electronically delivered to the immersive playback device. The delivery may be may be performed by the content delivery system, for example, such as for live streaming applications, or by some other entity, such as where the playback device is pre-loaded with calibration profiles at manufacture/assembly, or where calibration profiles can be downloaded over the Internet or other network.

Figure 4:
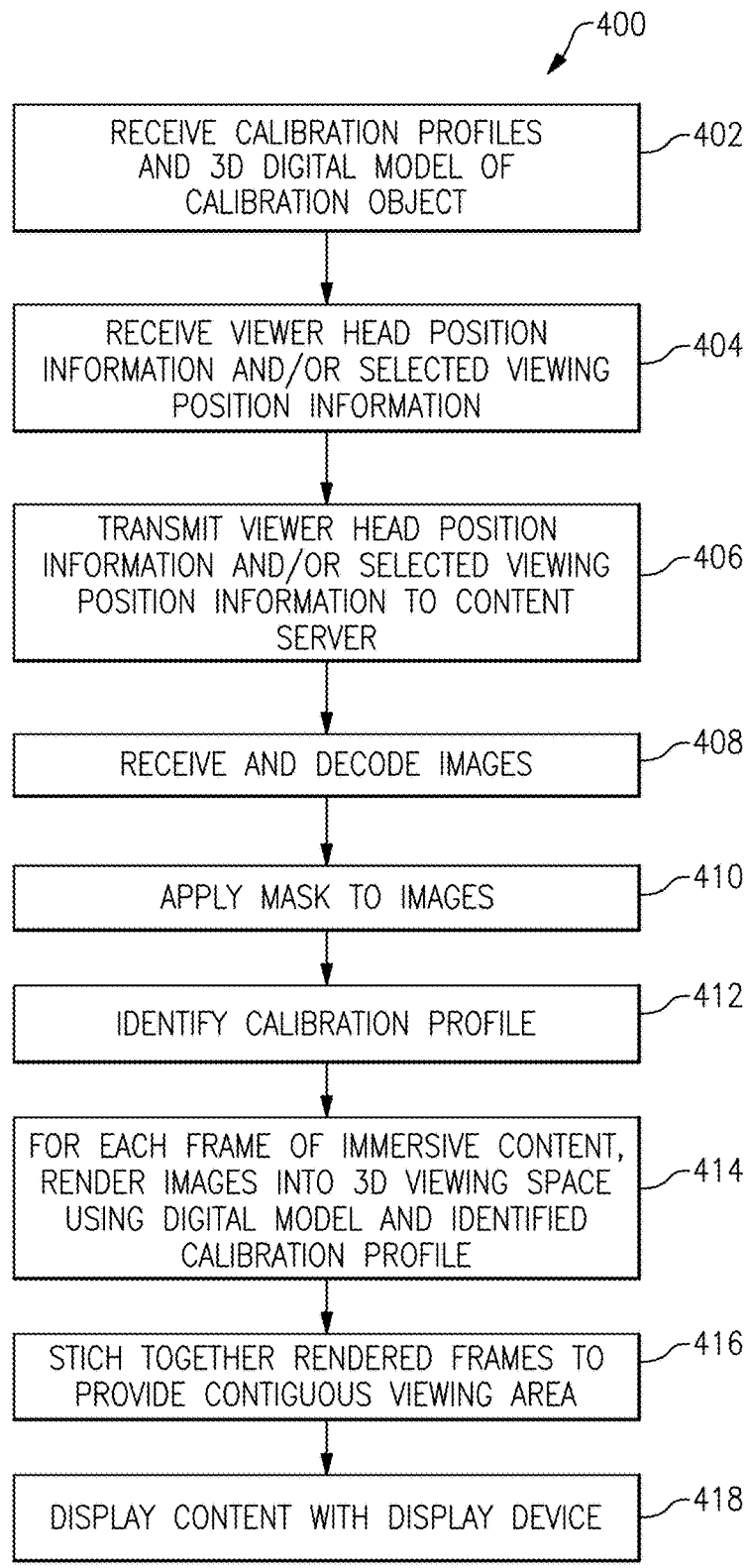
FIG. 4 is a flowchart showing an example of a method of applying calibration profile information to immersive content prior to playback.

FIG. 4 is a flowchart 400 showing a method of applying calibration profile information to immersive content prior to playback. Some or all of the method of FIG. 4 can be implemented by the playback device 106, and FIG. 4 will be described in this context for the purposes of illustration. However, in some other embodiments a portion of the method can be performed by the content delivery system 104 or other appropriate component.

At block 402, the playback device 106 receives one or more calibration profiles and the 3D digital model of the calibration object in any of the manners discussed herein, such as from the content delivery system 104 or other computer over a network link, via download from a network location, via pre-loading during manufacture, via download from a memory card or other memory device connectable to the playback device 106, or the like. Whatever the delivery mechanism, the calibration profiles can be stored by the playback device 106, either persistently in local memory (e.g., a solid-state flash memory, spinning magnetic hard drive, or the like), or can be buffered temporarily for access during playback.

The playback device 106 can receive viewer head position information and/or selected viewing position information from the user at block 404. For example, with respect to head position, the playback device 106 can include one or more sensors for detecting head position and/or head movement, and can use information output by the sensors to determine head position and movement. In one embodiment the playback device 106 is a head-mounted device that includes a combination of 3-axis gyroscopes, accelerometers, and magnetometers, and the playback device 106 is capable of using information output from the sensors to track absolute head orientation relative to Earth without drift. With respect to selected viewing position information, the playback device 106 may include a control input such as a button or touch screen interface that allows the user to select between a plurality of different viewer positions. For instance, a first viewer position may correspond to a viewing position at a first position on a sporting field, where a first camera rig 112 is positioned, and a second viewer position may correspond to a viewing position at a second position on a sporting field, where a second camera rig 112 is positioned.

At block 406 the playback device 106 transmits viewer head-position information and/or selected viewing position information to the content delivery server 104 for use by the content server 104 in determining which source content to delivery to the playback device 106.

The content delivery server 104 can process the selected viewing position information to determine the currently selected viewer position, which may correspond to a first camera rig 112 in the image capture system 102, and the content delivery server 104 can select source content from the first camera rig 112 for streaming.

Based on the head-position information, the content delivery server 104 can determine which source content captured by the first camera rig 112 should be streamed to the playback device 106. As one illustrative example, referring to the camera rig 112 shown in FIG. 1, the playback device 106 presents the user with a 120 degree horizontal field of view at any given time, which is a subset of the entire 360 viewing environment captured by the three stereoscopic camera pairs 114a, 114b, 114c. The content delivery system 104 determines which captured 120 degree sector corresponds to the user's current head-position, and identifies one or more of the camera pairs 114a, 114b, 114c corresponding to the identified sector. Because each camera pair 114a, 114b, 114c captures one 120 degree horizontal viewing sector, unless the user is looking at a 120 degree sector that exactly aligns with a sector captured by one of the camera pairs 114a, 114b, 114c, the 120 degree sector the user is currently looking will include content captured by two of the camera pairs 114a, 114b, 114c. The content delivery system 104 can use the head-position information to further determine which portion of the content from each of the identified camera pairs 114a, 114b, 114c corresponds to the currently viewed sector. In this manner, the content delivery system 104 can use the head-position information to identify a subset of captured source content relevant for display and stream only the subset to the playback device 106.

In other embodiments, the playback device 106 can be configured to perform some or all of this functionality. For instance, in some implementations the playback device 106 determines the currently viewed sector and sends that information to the content delivery system 104 along with a request for content.

The source content stored by the content delivery system 104 and/or streamed to the playback can be partitioned, encoded (e.g., compressed), and/or formatted by the content delivery system 104 or other appropriate entity in any desirable manner. For instance, any of the partitioning and encoding techniques described in any of the '812, '813, or '832 publications can be used, such as the those described with respect to FIGS. 2A-2C, 3, 4, 5, 6, and 14A-14B of the '832 publication.

Block 406 may be omitted such as in non-streaming applications, where the playback device 106 accesses source content corresponding to an entire viewing scene from its local memory, or from memory connected to the playback device 106 during playback.

At block 408 the playback device 106 receives and decodes one or more images received from the content delivery system 104. For instance, the content delivery system 104 identifies content to stream as described with respect to block 406 and communicates the identified content to the playback device 106 at block 408. In particular, the playback device 106 receives encoded (e.g., compressed) images corresponding to one or more cameras 116 in the rig 112, and decodes (e.g., decompresses) the images at block 408.

The playback device 106 can apply a mask to the decoded images at block 410 in some embodiments. The playback device 106 can select an appropriate mask for each image depending on to which portion of the 3D viewing environment the image in question corresponds.

At block 412 the playback device 106 identifies an appropriate calibration profile to apply to each image frame or other appropriate portion of the image data. In general, the streamed content received from the content delivery system 104 can include information sufficient for the playback device to identify a proper calibration profile to use for each image frame or other image data portion. Such information can be sent in association with each individual frame, or it can be sent in association with a group of frames or other image data portions, such as on a scene-by-scene basis. As described previously, the content delivery system 104 can embed in the source image content indicators (e.g., product serial numbers) associated with each image frame or group of image frames that identifies a camera 116 and/or lens 124 used to capture the frame(s). The playback device 106 in such configurations can consult a locally stored table to identify the calibration profile that corresponds to the received indicator. In other cases, the embedded indicators directly identify the calibration profile rather than identifying a source camera 116 and/or lens 124.

In other embodiments the content delivery system 104 sends the calibration profiles themselves in association with the source content. For example, the content delivery system 104 may send the calibration profile for a particular camera 116, lens 124, and/or rig 112 the first time a request for content corresponding to that camera 116, lens 124, or rig 112 is being sent to the playback device 106. Or the content delivery system 104 may send the calibration profile upon request. For instance, the playback device 106 may determine that it does not have a copy of a particular calibration profile for one or more image frames to playback, or that it has an outdated copy. In such cases, the playback device 106 can request the calibration profile from the content delivery system 104.

In some optional implementations, multiple different calibration objects can be used, each of which has a different shape (e.g., one being hemispherical, another being half ellipsoid, etc.), and/or distribution of markers across its surface(s) (e.g., a first distribution for simple calibration for lower end use, a second distribution for higher accuracy calibration for higher end use). The system can generate 3D digital models for each object as well as corresponding calibration profiles in any of the manners described herein. For instance, the system can generate multiple calibration profiles for each camera 116; one for each of the different calibration objects. In one such case each calibration object corresponds to a different lens used to capture the calibration image using the camera 116. In such cases the streamed content can include information that enables the playback device 106 to identify the proper 3D digital model and calibration profiles to apply, depending on which lens was used to capture the source content. For instance, the image capture system 102 may record an indication as to the lens 124 used to capture content, and the indication can then be forwarded to the playback device 106 by the content delivery system 104. This approach can provide flexibility for adding flexibility using of a variety of different lenses 124 with the camera rig(s) 112.

At block 414 the playback device 106 renders each image frame into the 3D viewing space using the 3D digital model and the calibration profile. The playback device 106 can include a 3D rendering engine that receives the 3D digital model and the calibration profile and uses the calibration profile to map each image frame onto a surface of the 3D digital model.

Figure 5:
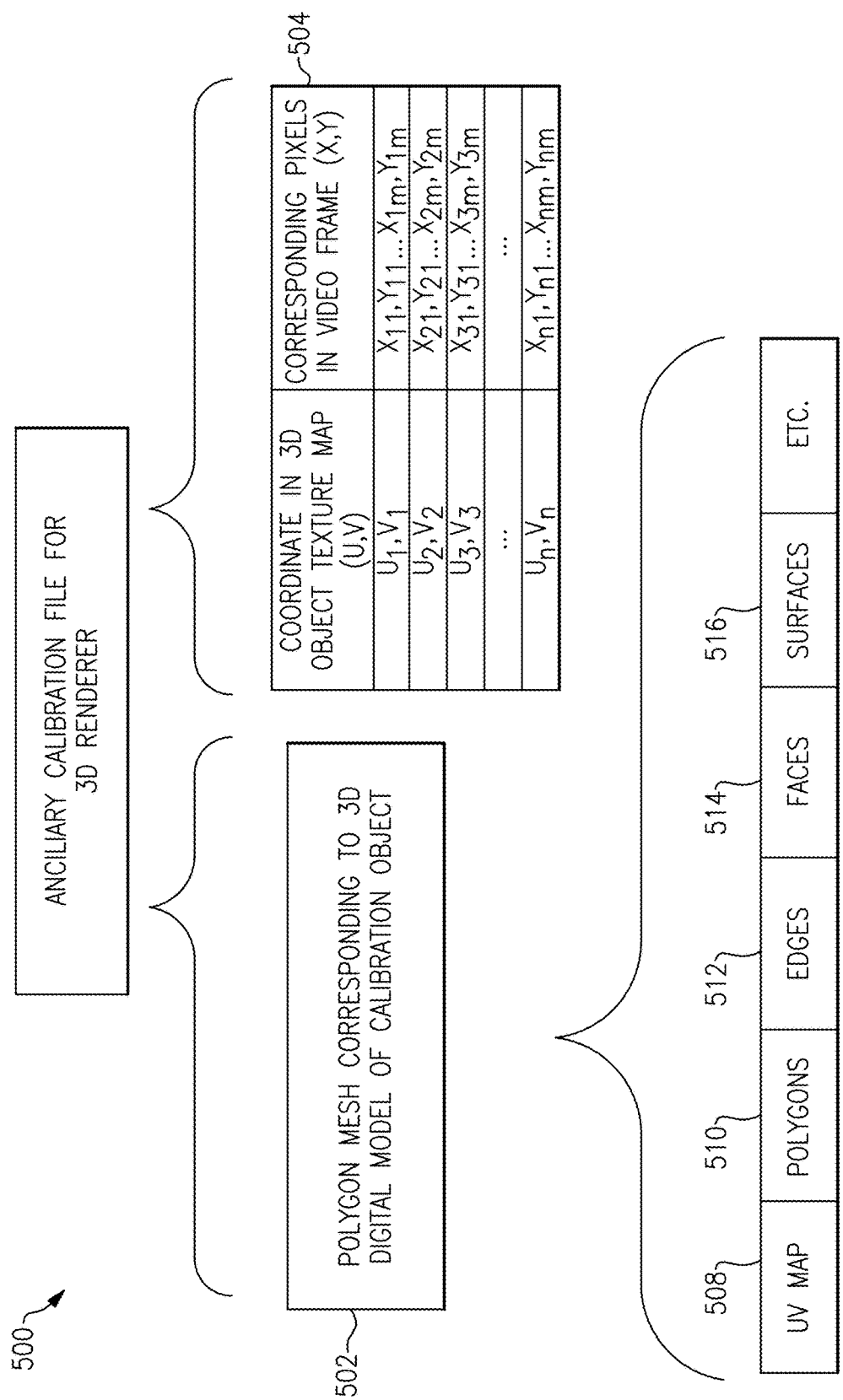
FIG. 5 illustrates an example of a file including calibration information derived from a calibration image, where the file is usable to project images into a 3D viewing space that simulates a real world viewing environment.

For example, the calibration profile can be stored in a data structure such as the ancillary calibration file 500 shown in FIG. 5. The exemplary file 500 can be processed by the 3D rendering engine to map the image onto the 3D digital model surface (e.g., the interior surface of a hemisphere or other portion of a sphere, of a half ellipsoid or other portion of an ellipsoid, or of a half ovoid or other portion of an ovoid), and includes both the 3D digital model 502 of the calibration object and a calibration table 504.

The 3D digital model 502 can be a polygon mesh usable by the 3D rendering engine to graphically render the calibration object, and can include a set of elements 506 including a UV texture map 508, and sets of polygons 510, edges 512, faces 514, and surfaces 516 that define the polygon mesh. The UV texture map can be a 2D representation of a surface of the 3D model, such as the interior surface 302 of the hemispherical calibration object of FIGS. 3A-3C, for example.

The calibration table 504 includes a set of UV pairs corresponding to vertices in the UV map 508 as well as corresponding groups of pixels in the calibration image that correspond to each UV pair.

The 3D rendering engine uses the information in the table 504 along with the UV mapping 508 and/or other items in the set of elements 506 to paint the image onto the surface of the object that corresponds to the UV mapping 508. For instance, the 3D renderer maps each group of pixels identified in the table 504 onto a portion of the surface of the 3D object that corresponds to the UV pair correlated to that group of pixels.

After each frame has been mapped onto the 3D object, the playback device stitches together rendered frames in order to provide a contiguous viewing area, at block 416. For instance, as discussed, depending on the viewer's head position, each output frame may be a composite frame that includes content from images taken multiple different cameras 116 and/or camera pairs 114.

For instance, referring to the camera rig 112 of FIG. 1, stereoscopic image content is captured using the camera pair 114a, 114b, 114c, and the playback device 106 displays both left and right eye output frames to the user at each display interval. Each camera pair 114a, 114b, 114c can correspond approximately to a 120 degree horizontal viewing sector of the entire 360 degree horizontal viewing environment, although some overlap may be present, such as where the horizontal field of view of the cameras is greater than 120 degrees. Depending on the head position of the user and resulting current viewing sector, each left eye output frame and each right eye output frame can include content from multiple ones of the camera pairs 114a, 114b, 114c.

As a specific example, where the first camera pair 114a is defined to point in a forward direction, a user turns his or her head from the forward facing direction 60 degrees to the left, so as to create a viewing axis that points directly along the axis that delineates the 120 degree sector captured by the first camera pair 114a from the 120 degree sector captured by the second viewing pair 114b. Because the currently viewed sector now spans half of the 120 degree sector of the first camera pair 114a and half of the 120 degree sector captured by the second camera pair 114b, the content delivery system 104 would stream image frames (or portions thereof) captured by the first camera pair 114a as well as image frames (or portions thereof) captured by the second camera pair 114b.

For each display interval, the playback device 106 maps the received left and right eye frames (or portions thereof) from the first camera pair 114a as well as left and right eye frames (or portions thereof) from the second camera pair 114b to the 3D viewing environment at block 414. Then, at block 416, the display device 106 stitches or seams together the mapped left eye frame from the first camera pair 114a with the mapped left eye frame from the second camera pair 114b to create a composite left eye frame, and stitches or seams together the mapped right eye frame from the first camera pair 114a with the mapped right eye frame from the second camera pair 114b to create a composite right eye frame. As part of this process, some of the image data corresponding to image scene portions that are not in the currently viewed/presented scene portion may be dropped from the composite images. The display device 106 then drives the display with the composite left and right eye images. A variety of different techniques can be used to stitch the image data together.

At block 418 the playback device drives the LCD screen (s) or other type of display with the processed content, providing the user with an immersive experience.

Figure 6C:
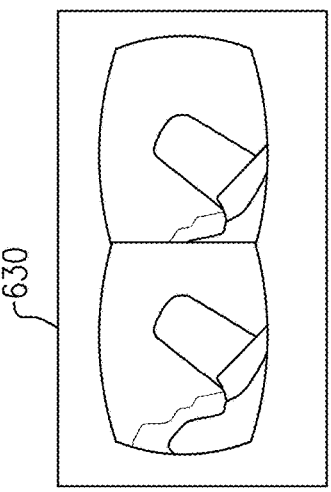
FIG. 6C shows an example of a display screen of a playback device.
Figure 6A:
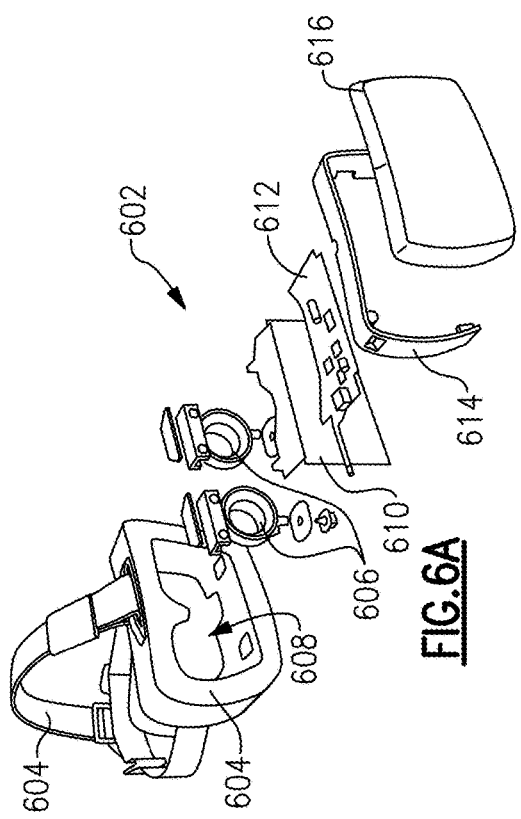
FIG. 6A shows an exploded view of one example of a head mounted display capable of displaying immersive content.

FIG. 6A shows an exploded view of one example of a head mounted display device 602 capable of displaying immersive content. The exemplary display device 602 includes a set of straps 603 configured to secure the device 602 to the user's head. The straps 603 connect to a goggle frame 604. A pair of lenses 606 are mounted within an opening of the goggle frame 604. A display 610 is mounted to the front of the goggle frame 604, with a viewing side oriented towards the user such that the user can view the display 610 through the lenses 606. Where the device 602 supports stereoscopic viewing, the display 610 can include a single LCD or other display screen that is electronically divided into separate left and right eye viewing areas, or the display 610 can alternatively include physically separate left and right display screens.

The display device 602 can further include a set of electronics 612, some or all of which can be mounted to one or more circuit boards as shown. The electronics 612 can include, without limitation, one or more microprocessors, microcontrollers, or the like, one or more accelerometers, gyroscopes, and/or magnetometers, which can be used to track motion and head-position relative to Earth, and/or a camera with a near-infrared CMOS sensor that can be used to track head position or other user movement/position. The microprocessor(s) can implement any appropriate software or firmware for implementing the techniques described. The 3D rendering engine can execute on the microprocessor for example. In one embodiment the display 610 includes a single 7-inch LCD with a resolution of 1280×800 (corresponding to a resolution of 640×800 for each eye) and an ARM processor implementing image processing, calibration, and rendering functionality.

The display device 602 further includes an outer frame 614 that fits around the goggle frame 604 and holds a cover 616 in place over the front of the device 602.

Figure 6B:
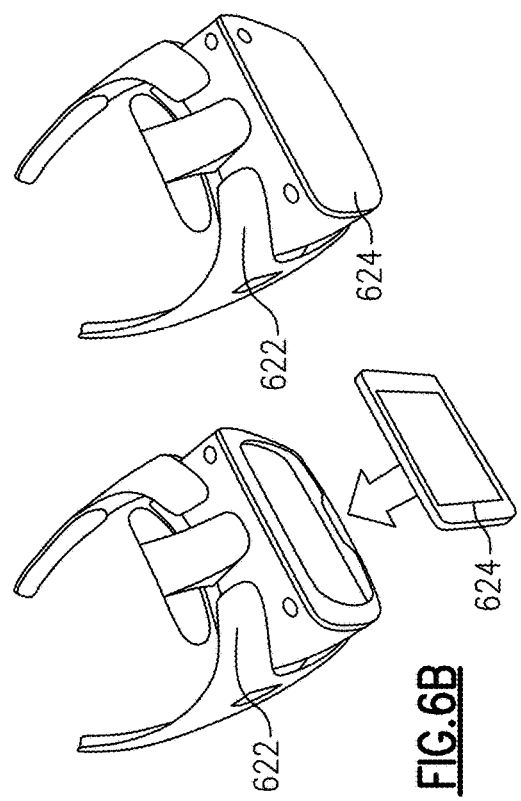
FIG. 6B shows an example of a head mounted display including a wearable portion and a separate electronic device that mates with the wearable portion.

FIG. 6B shows an example of a head mounted display 620 including a wearable portion 622 and a separate electronic device 624 that mates with the wearable portion 622. The electronic device 624 can be a mobile computing device such as a smart phone or tablet, for example, and can include some or all of the electronics 612 of the device 602 shown in FIG. 6A. The electronic device 724 can attach to the wearable portion 622 via a snap fit, for example.

FIG. 6C shows example of a display screen 630 of a playback device. The example display screen 630 is a single display screen that has been electronically divided into left and right eye images.

FIG. 7A is a cross-sectional side view of an example physical 3D calibration object 700 positioned with respect to a camera system 702 including a camera body 704 and a fisheye lens 706 attached thereto. The exemplary lens 706 includes a plurality of refractive optical components a-k disposed along an optical axis 708. The optical components work together to focus light onto an image sensor 710 within the camera 704. As one example, the lens 706 can be the Canon EF 8-15 mm fisheye zoom lens described previously. The front most point 712 of the lens can be near a center point of the calibration object 700, as is also shown in FIGS. 3B-3C, although other positions are possible.

The lens 706 significantly distorts captured images. Such distortion can include both spatial distortion such as barrel distortion and chromatic distortion. Moreover, optical behavior can vary from lens to lens, even for lenses of the same type. Such distortions and/or variation in optical behavior can result from a combination some or all of the following factors, without limitation: the indexes of refraction and/or other optical properties of the individual optical components a-k; the relative positioning of the optical components a-k with respect to one another; the position of the optical components with respect to the image sensor 710; the orientation of the image sensor 710 with in the camera 710; the connection between the body of the lens 706 and the body of the camera 710.

The calibration processes described herein can account for such distortion and optical variation while efficiently projecting the captured image content into a simulated immersive viewing environment.

FIG. 7B is a cross-sectional side view of an example physical 3D calibration object 700 positioned with respect to the camera system 702 of FIG. 7A, where the camera system is configured for underwater use. The camera system 702 is disposed within a waterproof housing 714 having a body portion 716 and a front portion 718. The body portion 716 can be designed to accommodate and protect the camera system 702 while capturing footage underwater, and can be made from plastic, rubber, metal, or a combination thereof or of the like. The front portion 718 can made from glass, clear plastic, or some other optically transmissive material so as to allow light to enter the housing 714. The front portion 718 is shaped as a dome, although other shapes are possible, and defines an interior region or chamber holding air.

In addition to the sources of distortions and/or variations in optical behavior describe above with respect to FIG. 7A, images captured by the camera system 702 shown in FIG. 7B will exhibit distortion and/or variations in optical behavior resulting from the refractive index and/or other optical properties of the dome, as well as the refractive index and/or other optical properties of the water. Thus, it can be beneficial to capture one or more images of the calibration object 700 using the configuration shown in FIG. 7B, while the camera system 702 and calibration object 700 are disposed within the underwater housing 714. In this manner, a calibration profile generated using the calibration images using any of the techniques described herein can be used to accurately calibrate source content that is taken underwater.

FIG. 8 illustrates an exemplary system 800 implemented in accordance with some embodiments. The system 800 is compatible with the embodiments described herein, and can be configured and/or used to perform any of the calibration, playback and other techniques described with respect to any of the foregoing figures. For instance, the system of FIG. 8 can be similar to or the same as the system 100 described with respect to FIG. 1. The system 800 supports content delivery, e.g., imaging content delivery, to one or more customer devices, which can be playback devices/content players, located at customer premises. The system 800 includes the exemplary image capturing device 802, a content delivery system 804, a communications network 805, and a plurality of customer premises 806, . . . , 810.

The image capturing device 802 supports capturing of stereoscopic imagery. The image capturing device 802 captures and processes imaging content. The image capture device 802 can be used to capture calibration images of a 3D calibration object as described herein, for example. The image capturing device 802 can be similar to or the same as the image capture system 102 of FIG. 1, for instance. The communications network 805 may be, e.g., a hybrid fiber-coaxial (HFC) network, satellite network, and/or the Internet.

The content delivery system 804 includes an image processing, calibration and encoding apparatus 812 and a content delivery device, e.g. a streaming server 814. The content delivery system 804 may be the same as or similar to the content delivery system 104 of FIG. 1, for example. The image processing, calibration and encoding apparatus 812 is responsible for performing a variety of functions including, without limitation: camera and/or lens calibration based on one or more target images and/or corresponding markers or other grid patterns (e.g., images of any of the 3D physical calibration objects described herein) captured during a camera calibration process; generation of a calibration profile that can include a distortion correction or compensation mesh, and which can be used by a playback device to compensate for distortions introduced by a calibrated camera and/or to map captured images into a simulated 3D environment approximated by the calibration object; processing, e.g., cropping and encoding of captured images; and supplying calibration and/or environmental information to the content delivery device 814, which can be supplied to a playback device and used in the rendering/image playback process. The content delivery device 814 may be implemented as a server configured respond to requests for content with image calibration information, environment information, and/or one or more images captured by the camera rig 802 which can be used in simulating a 3D environment.

Streaming of images and/or content maybe and sometimes is a function of feedback information such as viewer head position and/or user selection of a position at the event corresponding to a camera rig 802 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that while a single camera rig 802 is shown in FIG. 8 multiple camera rigs may be present in the system and located at different physical locations at a viewing theater such as a sporting event or other event, with the user being able to switch between the different positions and with the playback device 822 communicating the selected position from the playback device 822 to the content server 814.

The encoding apparatus 812 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported. Some partitioning and encoding techniques that can be implemented by the encoding apparatus are described in the '832 application, and in particular with respect to at least FIGS. 3, 4, 5, 6, 11, and 12 of the '832 publication.

The content streaming device 814 is configured to stream, e.g., continuously or substantially continuously electronically transmit, encoded content for delivering the encoded image content to one or more customer devices, e.g., over the communications network 805. Via the network 805, the content delivery system 804 can send and/or exchange information with the devices located at the customer premises 806, 810 as represented in the figure by the link 820 traversing the communications network 805.

While the encoding apparatus 812 and content delivery server 814 are shown as separate components in the FIG. 8, and can be implemented on separate physical servers or other computing devices, in some other embodiments they are implemented as a single server or other computing device which encodes and streams content and otherwise performs all of the functions of the content delivery system 804. For example, the encoding device 812 and the content delivery device 814 can be implemented as separate software or firmware modules implemented in or on one or more processors of a server, or in other cases can be implemented using separate hardware within a single computing device.

The encoding process may be a 3D, e.g., stereoscopic, image encoding process where information corresponding to left and right eye views of a scene portion are encoded and included in the encoded image data so that 3D image viewing can be supported.

Each customer premise 806, 810 may include a plurality of devices/players to decode and playback/display the imaging content streamed by the content streaming device 814. Customer premise 1 806 includes a decoding apparatus/playback device 822 coupled to a display device 824, while customer premise N 810 includes a decoding apparatus/playback device 826 coupled to a display device 828. In some embodiments the display devices 824, 828 are head mounted stereoscopic display devices. In some embodiments, the decoding apparatus/playback devices 122, 126 are incorporated together with the respective displays 124, 128 into a head-mounted unit such as one of the head-mounted display devices shown in FIGS. 6A and 6B.

In various embodiments decoding apparatus 822, 826 provide the imaging content to the corresponding display devices 824, 828 for display. The decoding apparatus/players 822, 826 may be computing devices capable of decoding the imaging content received from the content delivery system 804, calibrating the decoded content using any of the calibration profiles and calibration techniques described herein, generating imaging content using the decoded content, and rendering the imaging content, e.g., 3D image content, on the display devices 824, 828. A system/playback device such as the one illustrated in FIG. 10 and described below can be used as any of the decoding apparatus/playback devices 822, 826, and vice versa.

FIG. 9 illustrates an exemplary content delivery system 900 with encoding capability that can be used to encode and stream content in accordance with certain embodiments.

The system 900 may be configured to perform encoding, storage, and transmission and/or content output. The content delivery system 900 may be used as the system 804 of FIG. 8. While the system 900 shown in FIG. 9 is used for encoding, processing and streaming of content, it should be appreciated that the system 900 may also include the ability to decode and display processed and/or encoded image data, e.g., to an operator.

The system 900 includes a display 902, input device 904, input/output (I/O) interface 906, a processor 908, network interface 910 and a memory 912. The various components of the system 900 are coupled together via bus 909 which allows for data to be communicated between the components of the system 900.

The memory 912 can include one or more of any type of storage device, including flash memory or other solid state storage, spinning hard drives or other magnetic storage, combinations of the same and the like.

The memory 912 can store and/or load for execution various modules, e.g., routines, which when executed by the processor 908 control the system 900 to implement the partitioning, encoding, storage, and streaming/transmission and/or output operations.

The memory 912 can store calibration information 938, which can include any of the calibration profiles, 3D digital models of calibration objects, or other calibration information described herein. As discussed herein, such calibration information 938 can be usable to account for camera and/or lens distortions and other variations and/or to map source image content into a 3D viewing environment. For instance, the calibration information 938 in one embodiment includes a plurality of files similar to the calibration file 500 shown in FIG. 5, where each file corresponds to a different camera and/or lens.

The memory 912 can store and/or load for execution various modules, e.g., routines, which when executed by the processor 908 control the computer system 900 to implement the immersive stereoscopic video acquisition, encoding, storage, and transmission and/or output methods described in the present application and/or in any of the '812, '813, or '832 publications.

For example, the memory 912 can store and/or load for execution a calibration module 940 which is configured to generate the calibration information 938. The calibration module 940 can implement any of the techniques for generating calibration profiles or other calibration information described herein. The calibration module 940 can be configured to perform operations corresponding to data blocks 208-212 of the method 200 described in FIG. 2, for example.

The memory 912 can additionally store and/or load for execution control routines 914, a partitioning module 906, encoder(s) 918, a streaming controller 920, received input images 932, e.g., 360 degree stereoscopic video of a scene, encoded scene portions 934, and timing information 936.

In some embodiments the modules are implemented as software modules which can execute on the processor 908. In other embodiments the modules are implemented in hardware, e.g., as circuitry, with each module being implemented as a circuit for performing the function to which the module corresponds. In still other embodiments the modules are implemented using a combination of software and hardware.

The control routines 914 include device control routines and communications routines to control the operation of the system 900. The partitioning module 916 is configured to partition a received stereoscopic 360 degree version of a scene into N scene portions in accordance with the features of the invention.

The encoder(s) 918 may, and in some embodiments do, include a plurality of encoders configured to encode received image content, e.g., 360 degree version of a scene and/or one or more scene portions in accordance with various implementations. In some embodiments the encoder (s) 918 include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 918 is the encoded scene portions 934 which are stored in the memory for streaming to customer devices, e.g., playback devices. The encoded content can be streamed to one or multiple different devices via the network interface 910.

Embodiments of partitioning and encoding techniques that can be implemented by the encoding apparatus are described in the '832 publication, and in particular with respect to at least FIGS. 2A-2C, 3, 4, 5, 6, 11, and 12 of the '832 publication.

The streaming controller 920 is configured to control streaming of encoded content for delivering the encoded image content to one or more customer devices, e.g., over the communications network 805. The illustrated streaming controller 920 includes a request processing module 922, a data rate determination module 924, a current head position determination module 926, a selection module 928 and a streaming control module 930. The request processing module 922 can be configured to process a received request for imaging content from a customer playback device. The request for content is received in various embodiments via a receiver in the network interface 910. In some embodiments the request for content includes information indicating the identity of requesting playback device. In some embodiments the request for content may include data rate supported by the customer playback device, a current head position of the user, e.g., position of the head mounted display. The request processing module 922 processes the received request and provides retrieved information to other elements of the streaming controller 920 to take further actions. While the request for content may include data rate information and current head position information, in various embodiments the data rate supported by the playback device can be determined from network tests and other network information exchange between the system 900 and the playback device.

The data rate determination module 924 can be configured to determine the available data rates that can be used to stream imaging content to customer devices, e.g., since multiple encoded scene portions can be supported, the content delivery system 900 can support streaming content at multiple data rates to the customer device. The data rate determination module 924 is further configured to determine the data rate supported by a playback device requesting content from system 900. In some embodiments the data rate determination module 924 is configured to determine available data rate for delivery of image content based on network measurements.

The current head position determination module 926 can be configured to determine a current viewing angle and/or a current head position of the user, e.g., position of the head mounted display, from information received from the playback device. In some embodiments the playback device periodically sends current head position information to the content delivery system 900, where the current head position determination module 926 receives and processes the information to determine the current viewing angle and/or a current head position.

The selection module 928 can be configured to determine which portions of a scene (e.g., scenes spanning up to and including 360 degrees of horizontal viewing angle) to stream to a playback device based on the current viewing angle/head position information. The selection module 728 can be further configured to select the encoded versions of the determined scene portions based on available data rate to support streaming of content.

The streaming control module 930 is configured to control streaming of image content, e.g., multiple portions of a 360 degree stereoscopic scene, at various supported data rates in accordance with the features of the invention. In some embodiments the streaming control module 930 is configured to control stream N portions of a 360 degree stereoscopic scene to the playback device requesting content to initialize scene memory in the playback device. In various embodiments the streaming control module 930 is configured to send the selected encoded versions of the determined scene portions periodically, e.g., at a determined rate. In some embodiments the streaming control module 930 is further configured to send 360 degree scene update to the playback device in accordance with a time interval, e.g., once every minute. In some embodiments sending 360 degree scene update includes sending N scene portions or N-X scene portions of the full 360 degree stereoscopic scene, where N is the total number of portions into which the full 360 degree stereoscopic scene has been partitioned and X represents the selected scene portions recently sent to the playback device. In some embodiments the streaming control module 930 waits for a predetermined time after initially sending N scene portions for initialization before sending the 360 degree scene update. In some embodiments the timing information to control sending of the 360 degree scene update is included in the timing information 936. In some embodiments the streaming control module 930 is further configured identify scene portions which have not been transmitted to the playback device during a refresh interval; and transmit an updated version of the identified scene portions which were not transmitted to the playback device during the refresh interval.

In various embodiments the streaming control module 930 is configured communicating at least a sufficient number of the N portions to the playback device on a periodic basis to allow the playback device to fully refresh a 360 degree version of said scene at least once during each refresh period.

Embodiments of techniques for multi-data rate streaming and streaming of select image scene information content that can be used with any of the implementations described herein are described in the '832 publication, such as with respect to at least FIGS. 3, 4, 5, 6, 11, and 12 of the '832 publication.

Figure 10:
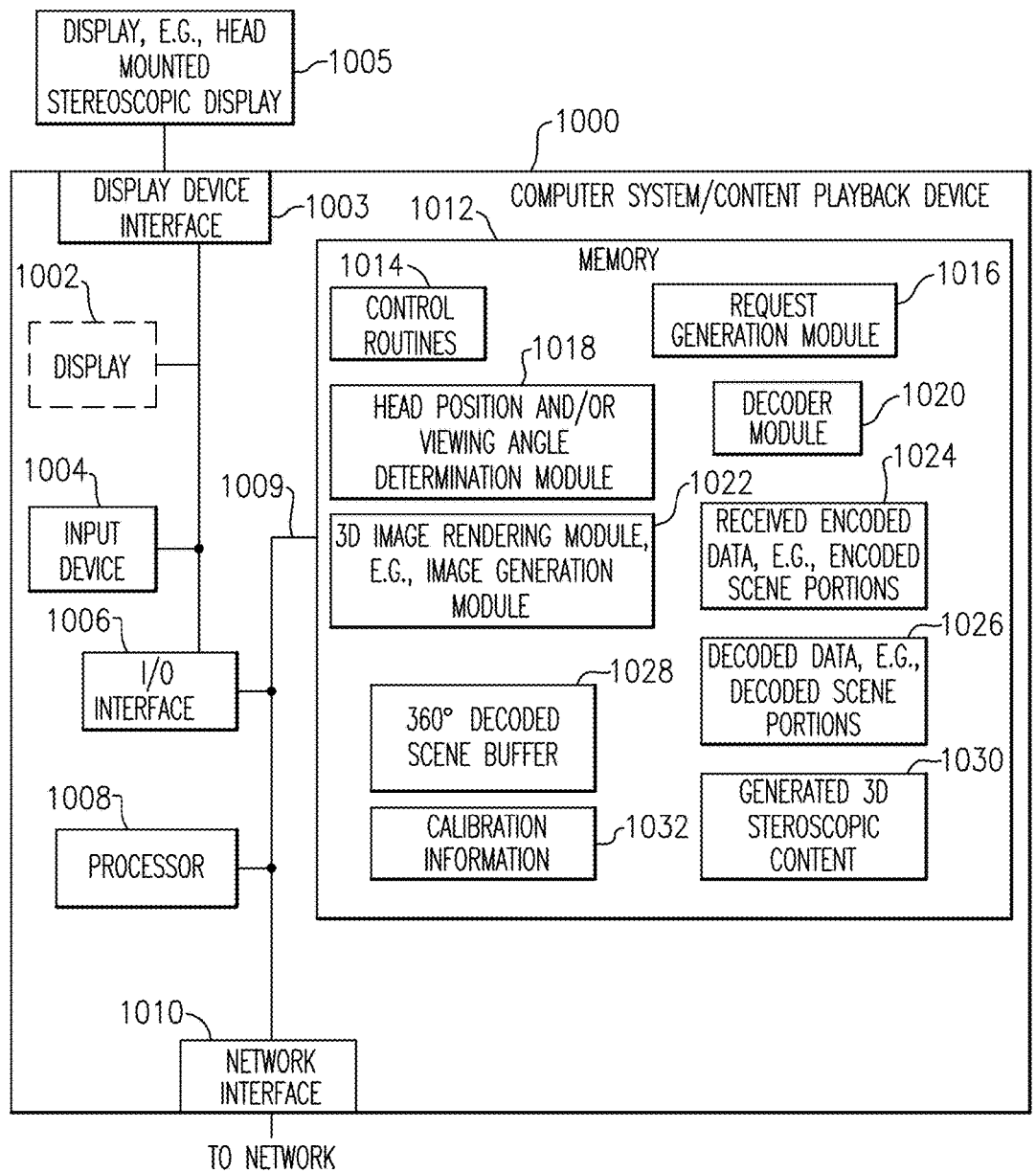
FIG. 10 shows an example of a playback device that can be used to receive, decode, and display content, such as content streamed by any of the content delivery systems described herein.

FIG. 10 illustrates a computer system/playback device 1000 implemented in accordance with certain embodiments which can be used to receive, decode, store and display imaging content received from a content delivery system such as the one shown in FIGS. 1, 8, and 9. The playback device 1000 may be used with or form a part of a 3D head mounted display such as the OCULUS RIFT™ VR (virtual reality) headset, which may be the head mounted display 1005. The playback device 1000 includes the ability to decode the received encoded image data and generate 3D image content for display to the customer. The playback device 1000 in some embodiments is located at a customer premise location such as a home or office but may be located at an image capture site as well. The playback device 1000 can perform signal reception, decoding, display and/or other operations. The playback device 1000 can be similar to or the same as the playback devices shown and described with respect to FIGS. 1, 6A, 6B, and 8, for example.

The illustrated device 1000 includes a display 1002, a display device interface 1003, input device 1004, input/output (I/O) interface 1006, a processor 1008, network interface 1010 and a memory 1012. The various components of the playback device 1000 are coupled together via bus 1009 which allows for data to be communicated between the components of the system 1000. While in some embodiments display 1002 is included as an optional element as illustrated using the dashed box, in some embodiments an external display device 1005, e.g., a head mounted stereoscopic display device, can be coupled to the playback device via the display device interface 1003.

The memory 1012 can include one or more of any type of storage device, including flash memory or other solid state storage, spinning hard drives or other magnetic storage, combinations of the same and the like.

The memory 1012 can store calibration information 1032 usable by the 3D rendering module 1022 or other component of the playback device 1000 to calibrate the image content, and can include any of the calibration information described herein. For example, the calibration information 1032 can be received from the content delivery system 900 and can include some or all of the calibration information 938 stored in the content delivery system 900, including one or more files similar to the files 500 shown in FIG. 5. The calibration information 1032 can include calibration profiles corresponding to one or more camera rigs used to generate content that is being streamed to the playback device 1000 for playback, for example. The calibration information 1032 can also include a 3D digital model corresponding to a calibration object, as discussed herein.

The memory 1012 can store and/or load for execution various modules, e.g., routines, which when executed by the processor 1008 control the playback device 1000 to decoding and output operations in accordance with the invention. The memory 1012 can additionally store and/or load for execution control routines 1014, a request for content generation module 1016, a head position and/or viewing angle determination module 1018, a decoder module 1020, a stereoscopic image rendering module 1022 also referred to as a 3D image generation module, and data/information including received encoded image content 1024, decoded image content 1026, a 360 degree decoded scene buffer 1028, and generated stereoscopic content 1030.

The control routines 1014 include device control routines and communications routines to control the operation of the device 1000. The request generation module 1016 is configured to generate a request for content to send to a content delivery system for providing content. The request for content is sent in various embodiments via the network interface 1010. The head position and/or viewing angle determination module 1018 is configured to determine a current viewing angle and/or a current head position of the user, e.g., position of the head mounted display, and report the determined position and/or viewing angle information to the content delivery system 900. In some embodiments the playback device 1000 periodically sends current head position information to the system 900.

The decoder module 1020 is configured to decode encoded image content 824 received from the content delivery system 900 to produce decoded image data 1026. The decoded image data 1026 may include decoded stereoscopic scene and/or decoded scene portions.

The 3D image rendering module 1022 generates 3D images in accordance with embodiments described herein, e.g., the calibration information 1032 and/or decoded image content 1032, for display to the user on the display 1002 and/or the display device 1005. For instance, the 3D image rendering module 1022 may perform some or all of operations of the method 400 of FIG. 4. In some embodiments a separate module is used to perform calibration functionality. The generated stereoscopic image content 1030 output by the 3D image generation module 1022. Thus the rendering module 1022 renders the 3D image content 1030 to the display 1002. In some embodiments the display device 1005 may be a 3D display such as an OCULUS RIFT™ VR head-mounted display. The operator of the playback device 1000 may control one or more parameters via input device 1004 and/or select operations to be performed, e.g., optionally select to display 3D scene or 2D scene.

The display interface 1003 is coupled to a head mounted stereoscopic display 1005, an input device 1004 (e.g., a button, touch screen interface, etc.), an optional display 1002, and input/output (I/O) interface 1006. The I/O interface 1006 couples the various input/output elements including the display interface 1003, display 1002, and input device 1004 to the bus 1009, which in turn is coupled to processor 1008, network interface 1010 and memory 1012. The network interface 1010 allows the playback device 1000 to receive content from the streaming device 814 and/or communicate information such as view head position and/or position (camera rig) selection indicating selection of particular camera rig and/or corresponding viewing position at an event. The memory 1012 includes various data and modules as shown in FIG. 10. When executed the decoder module 1020 causes received images to be decoded while the 3D image rendering module 1022 causes further processing of the images in accordance with the present invention and optionally stitching of images together as part of the presentation process.

In other embodiments a 3D environment is mapped and 3D environment information is communicated to the playback device and used to modify the 3D default environment mesh used to render the images during playback to take into consideration the actual physical shape of the auditorium, stadium or other environment in which the original images are captured. The 3D environment map may include information regarding the distance from the camera rig, and thus the camera used to capture the image, to a wall or other perimeter location, surface, or other feature or location of the environment in which the images will be captured. The distance information can be, and sometimes is, matched to a grid point of the calibration profile, UV map, 3D digital model of the calibration object, and/or correction mesh used during playback to simulate the environment and to adjust the playback images based on the actual environment from which images are taken. In various embodiments a 3D model of and/or 3D dimensional information corresponding to an environment from which video content will be obtained is generated and/or accessed. Camera positions in the environment are documented. Multiple distinct camera positions may be present within the environment. For example, distinct end goal camera positions and one or more mid field camera positions may be supported and used to capture real time camera feeds. The 3D module and/or other 3D information are stored in a server or the image capture device used to stream video to one or more users.

Figure 11A:
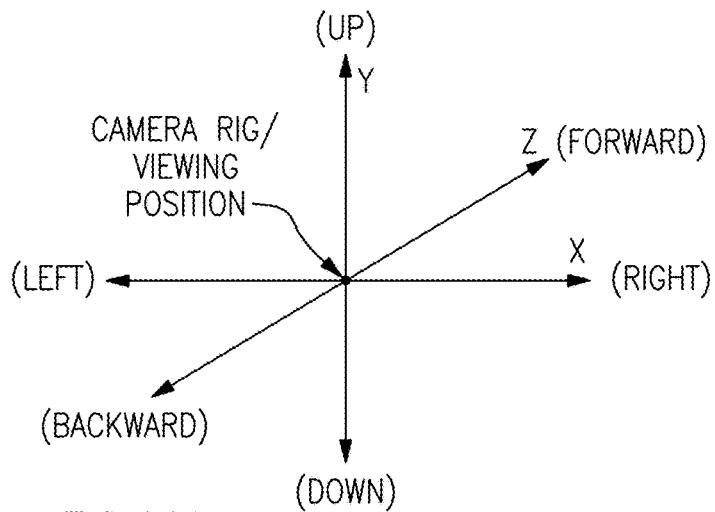
FIG. 11A shows a first view of a set of orthogonal axes defining an example of a 3D recording environment and corresponding 3D viewing space.
Figure 11B:
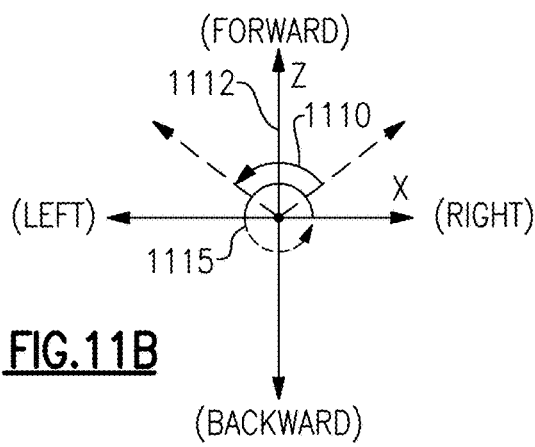
FIG. 11B shows a second view of the set of orthogonal axes defining an example of a 3D recording environment and corresponding 3D viewing space.
Figure 11C:
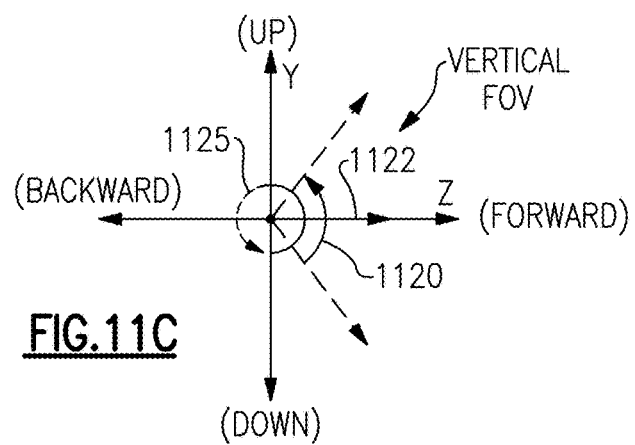
FIG. 11C shows a third view of the set of orthogonal axes defining an example of a 3D recording environment and corresponding 3D viewing space.

FIGS. 11A-11C show different views of a set of orthogonal axes x, y, z defining an example of a 3D recording environment and corresponding simulated 3D viewing space. For instance, a camera rig such as the camera rig 112 of FIG. 1 can be positioned at the origin of the x, y, and z axes. The origin can also correspond to a viewing position or user location within a simulated 3D viewing space, where the simulated viewing space can be generated by any of the head-mounted displays or other immersive display device described herein.

A first direction along the z-axis can be defined to be a forward facing direction (e.g., facing the stage at a concert or performance), while the opposite direction along the z-axis is defined to be a backward facing direction (e.g., facing the audience, directly away from the stage). A first direction along the x-axis can be defined to be a rightward facing direction, and the opposite direction along the x-axis can be defined to be a leftward facing direction. A first direction along the y-axis can be defined to be an upward facing direction (e.g., at the sky or ceiling), and the opposite direction along the y-axis can be defined to be a downward facing direction (e.g., at the floor).

As shown in FIG. 11B, the display device is capable of presenting a horizontal field of view at any given time having a central axis 1112 with a pointing direction that depends on where the user is currently looking. A viewing angle 1110 of the horizontal field of view can be less than 360 degrees, and in various implementations is at least about 120, 130, 140, 150, 160, 180, 190, 200, 210, or 240 degrees, is some value between any of these values, or is some other value. The playback device can allow the user to change head position (look left and right and/or turn around) to move the horizontal field of view within an available horizontal viewing angle 1115 larger than the viewing angle 1110 of the horizontal field of view. For instance, the available horizontal viewing angle 1115 can be at least about 180, 210, 240, 270, 300, 330, or 360 degrees, or some value between any of these values, or some other value, depending on the embodiment. In one embodiment the viewing angle 1110 of the horizontal field of view is about 120 degrees, and the available horizontal viewing angle 1115 is about 360 degrees.

The display device can according to some embodiments present a vertical field of view which changes incrementally as the user moves their head to look up and down. As illustrated in FIG. 11C, the display device can be capable of presenting a vertical field of view at any given time having a central axis 1122 with a pointing direction that depends on where the user is currently looking. A viewing angle 1120 of the vertical field of view, depending on the embodiment, can be at least about 80, 90, 110, 110, 120, 150, or 180 degrees, or some value between any of these values, or some other value. The playback device can allow the user to change head position (look up and down) to move the vertical field of view within an available vertical viewing angle 1125 larger than the viewing angle 1120 of the vertical field of view. For instance, the available vertical viewing angle 1125 can be at least about 100, 110, 120, 150, 180, 210, 240, 270, 300, 330, or 360 degrees, depending on the embodiment. In one embodiment, the viewing angle 1120 of the vertical field of view is about 120 degrees, and the available vertical viewing angle 1125 is about 180 degrees.

Figure 12:
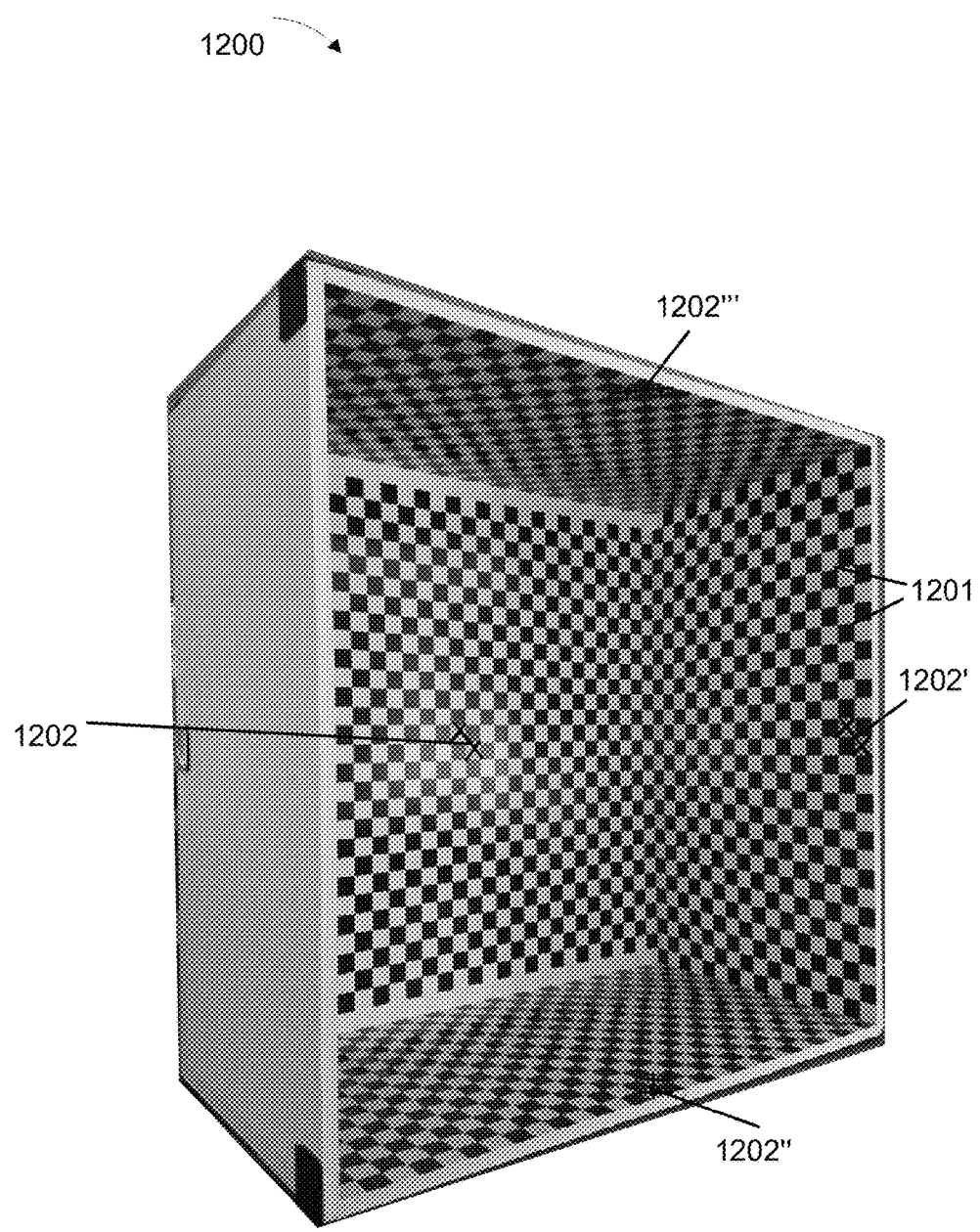
FIG. 12 shows a first view of an exemplary calibration target object, e.g., apparatus, having a rectangular shape and target grids on each of the flat inside surfaces of the calibration apparatus, e.g., target box.
Figure 13:
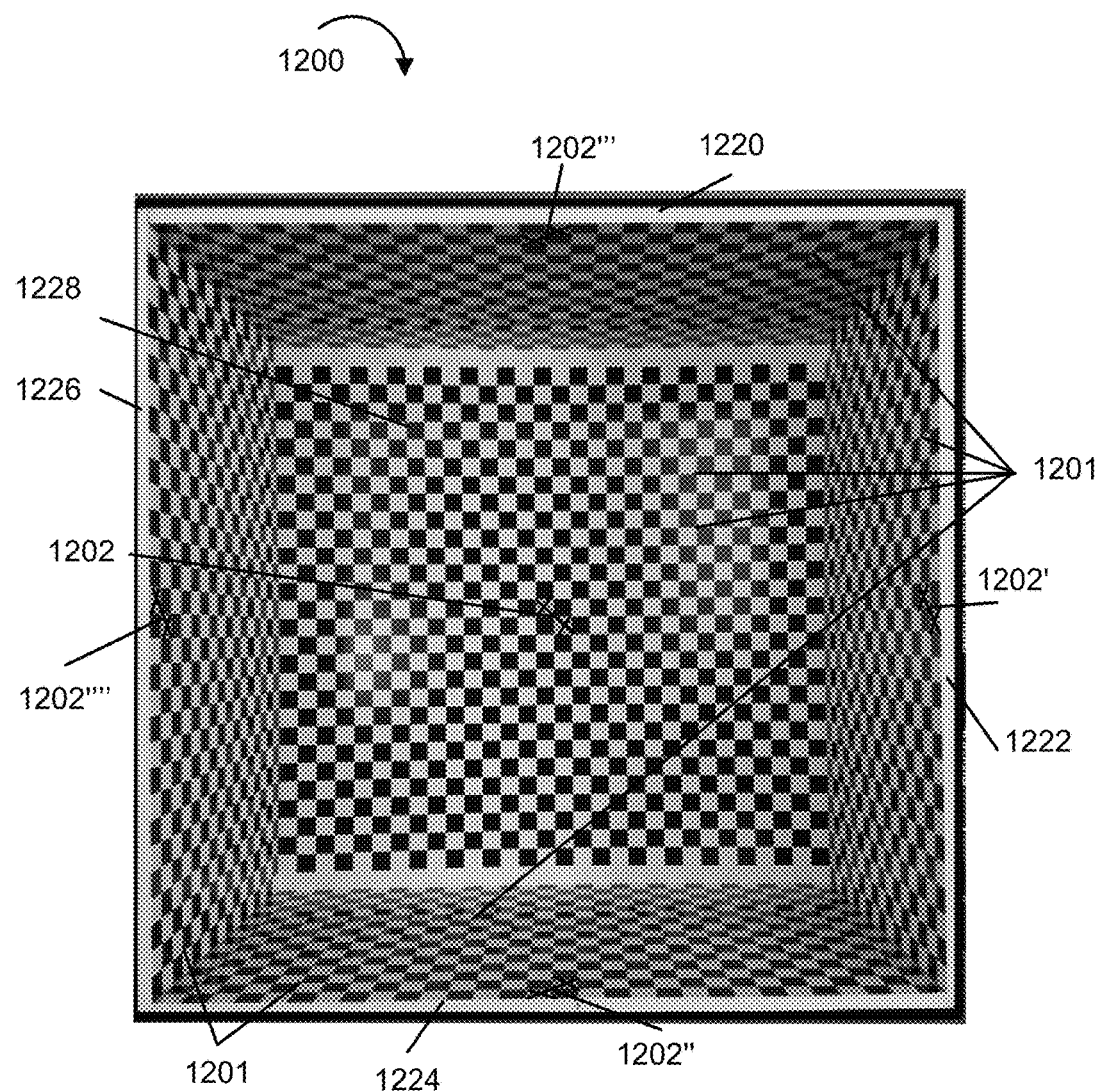
FIG. 13 shows a second view of the exemplary calibration target object, e.g., apparatus, having a rectangular shape and target grids on each of the flat inside surfaces of the calibration apparatus, e.g., target box.
Figure 14:
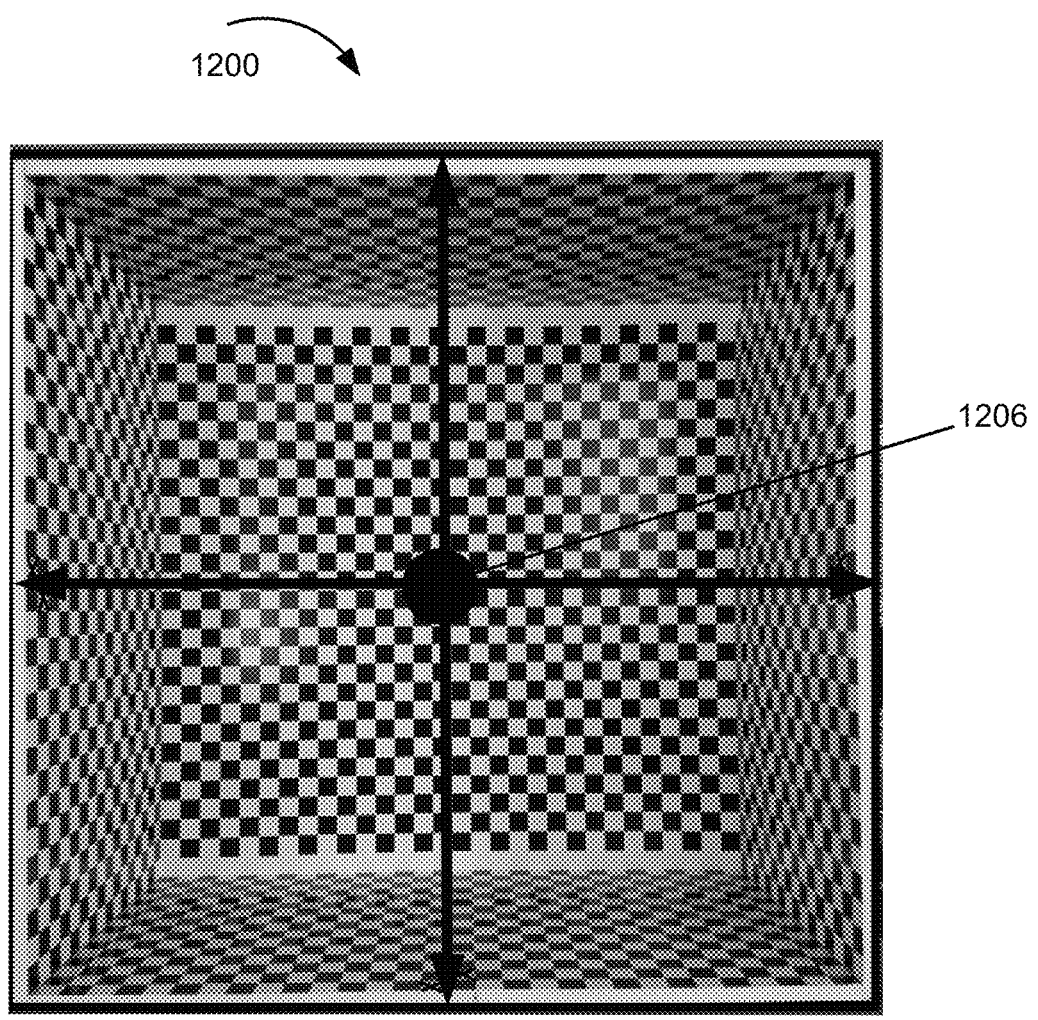
FIG. 14 shows a third view of the exemplary calibration target object, e.g., apparatus, having a rectangular shape and target grids on each of the flat inside surfaces of the calibration apparatus, e.g., target box.

FIGS. 12, 13 and 14 show various views of an exemplary calibration target object, e.g., apparatus 1200, having a rectangular shape and target grids formed of black and white squares on each of the flat inside surfaces, e.g., left, right, top and bottom sidewalls of the calibration apparatus. The target apparatus (1200) shown in FIG. 12 has a known three dimensional (3D) shape and thus known volume and includes markers (1201) which are formed by the intersection of the corners of squares which form the target grid pattern on interior surfaces of said target apparatus (1200). The markers (1201) may be viewed as nodes in a mesh which are expected for a given camera configuration, e.g., lens and sensor, to appear in an image captured by the camera at predetermined locations in the 2D space of the captured image, e.g., UV space.

Distortions introduced by the lens or other camera components can be, and sometimes are, detected by comparing the location of the target markers in a captured image to the expected locations. The distortion information can be, and then sometimes is, used to generate UV map correction information which can be used to correct a UV map intended to map a captured image to a mesh model. The UV map and mesh model need not be identical to the pattern and shape of the target object 1200 since once the distortions introduced by a camera are known, the effect of distortions can be predicated and used for UV maps with a different number of nodes than the number of nodes in the test pattern and/or for applying an image as a texture which to a mesh model corresponding to a surface with a different shape than the shape of the test object 1200. Thus, a simple to construct test object 1200 can be used to determine the distortions and corrections needed for mapping images onto a spherical surface or other surface with an even more complicated shape.

In addition to markers 1201, test apparatus 1200 includes surface center markers 1202, 1202', 1202", 1202''' and 1202"" (see FIG. 13). As shown in FIG. 13, the target apparatus (1200) includes four flat sides (1220, 1222, 1224, 1226) and a back (1228), each of flat sides (1220, 1222, 1224, 1226) and back (1228) including markers (1201) in addition to panel center markers (1202''', 1202', 1202", 1202''') and 1202, respectively.

As can be seen in FIG. 14, the apparatus 1200 in the exemplary embodiment is square but other rectangular shapes are possible. Center point 1206 corresponds to center marker 1202 in the back of the target apparatus 1200. By aligning the optical axis of a camera to be calibrated with the target center marker 1202 alignment with the center of the test apparatus can be easily obtained. The proper positioning of the camera can be, and in some embodiments is, automated based on visual cues, e.g., alignment with the center marker 1202 and distances to one or more side markers 1202', 1202", 1202''' and 1202"" being detected and the camera moved automatically until the distances between the camera and the side markers is uniform and equal. A camera position control device 1516 is used in some embodiments in combination with a position drive motor 1502 as will be disused further below with regard to FIG. 15 to achieve such automated positioning as part of a camera calibration method.

Figure 15:
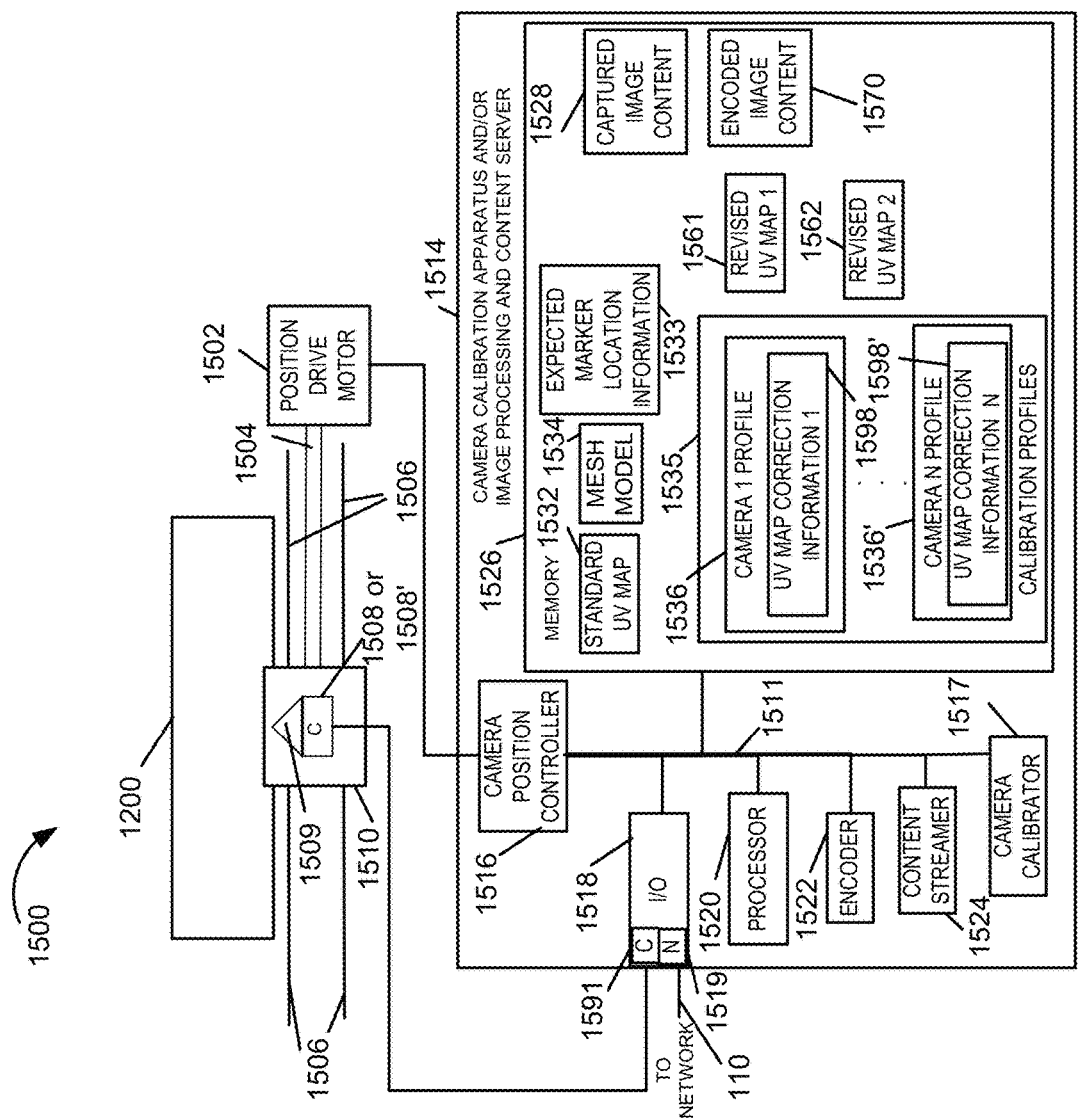
FIG. 15 illustrates a calibration system which uses an exemplary calibration apparatus such as the one shown in FIG. 12-14 or in any of the other figures of the present application and which can generate sets of camera calibration information from images of the calibration apparatus which are captured by a camera mounted in the camera calibration system.
Figure 16A:
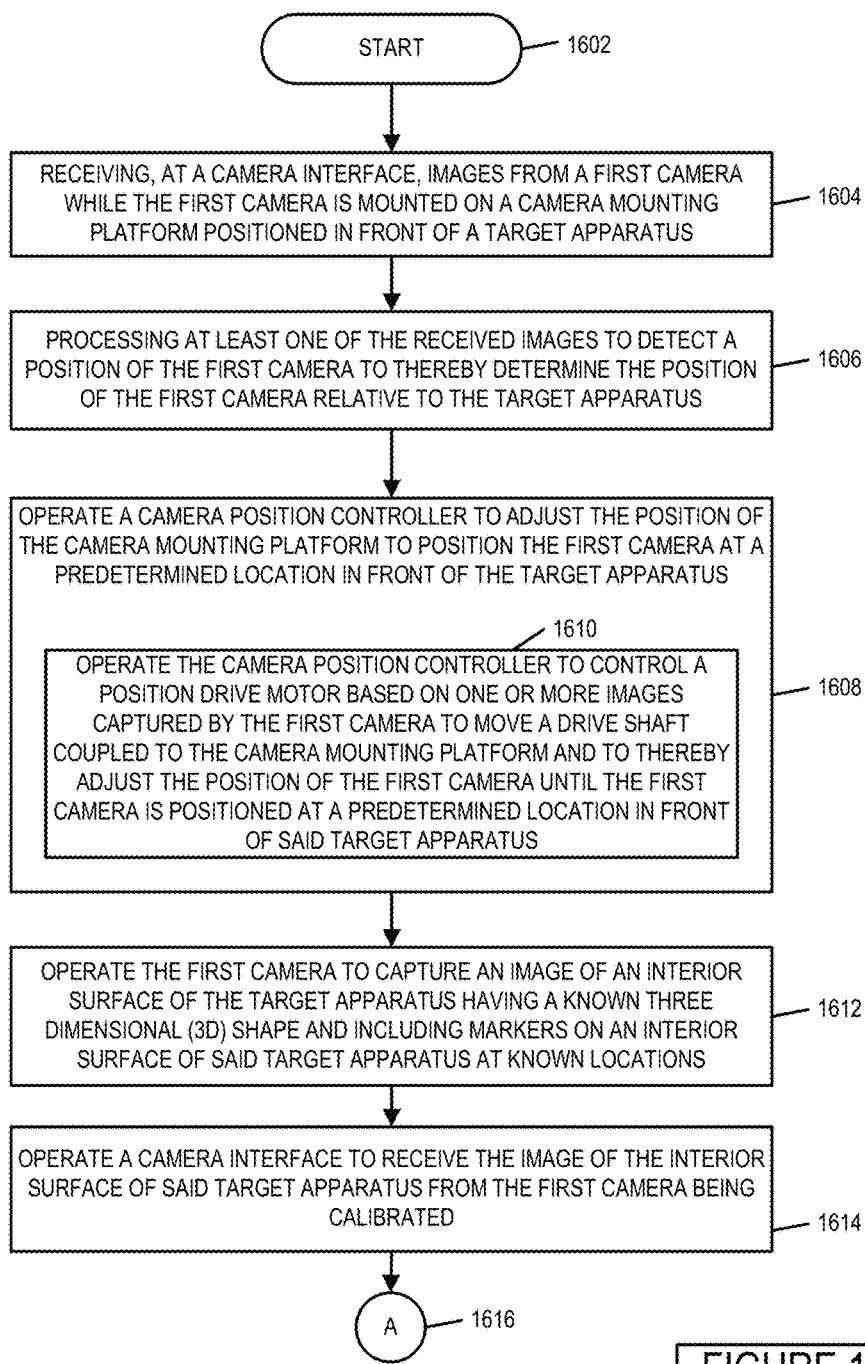
FIG. 16A is a first part of a flowchart of an exemplary method of performing camera calibration and/or using camera calibration information in accordance with an exemplary embodiment.
Figure 16B:
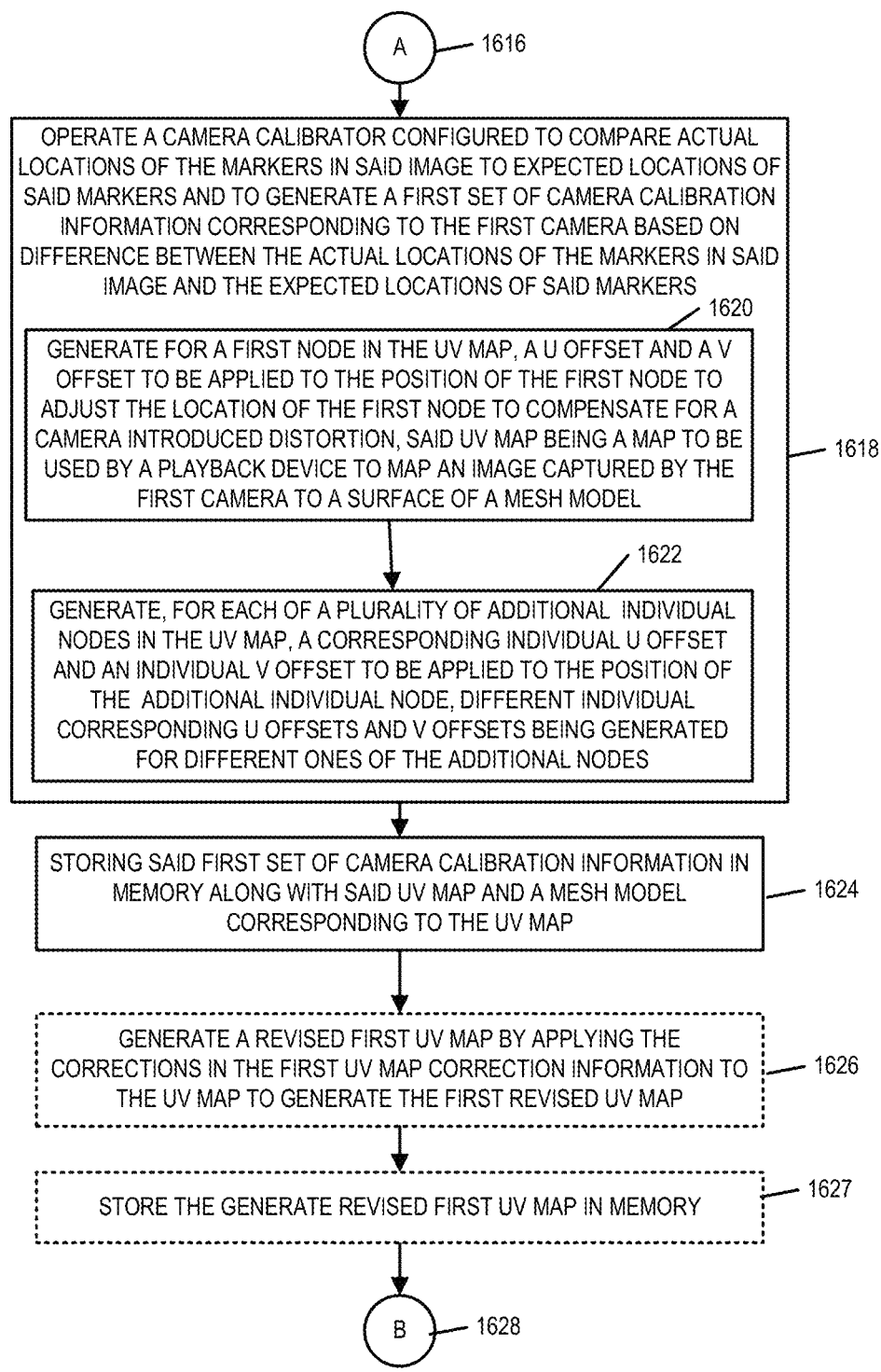
FIG. 16B is a second part of a flowchart of an exemplary method of performing camera calibration and/or using camera calibration information in accordance with an exemplary embodiment.
Figure 16C:
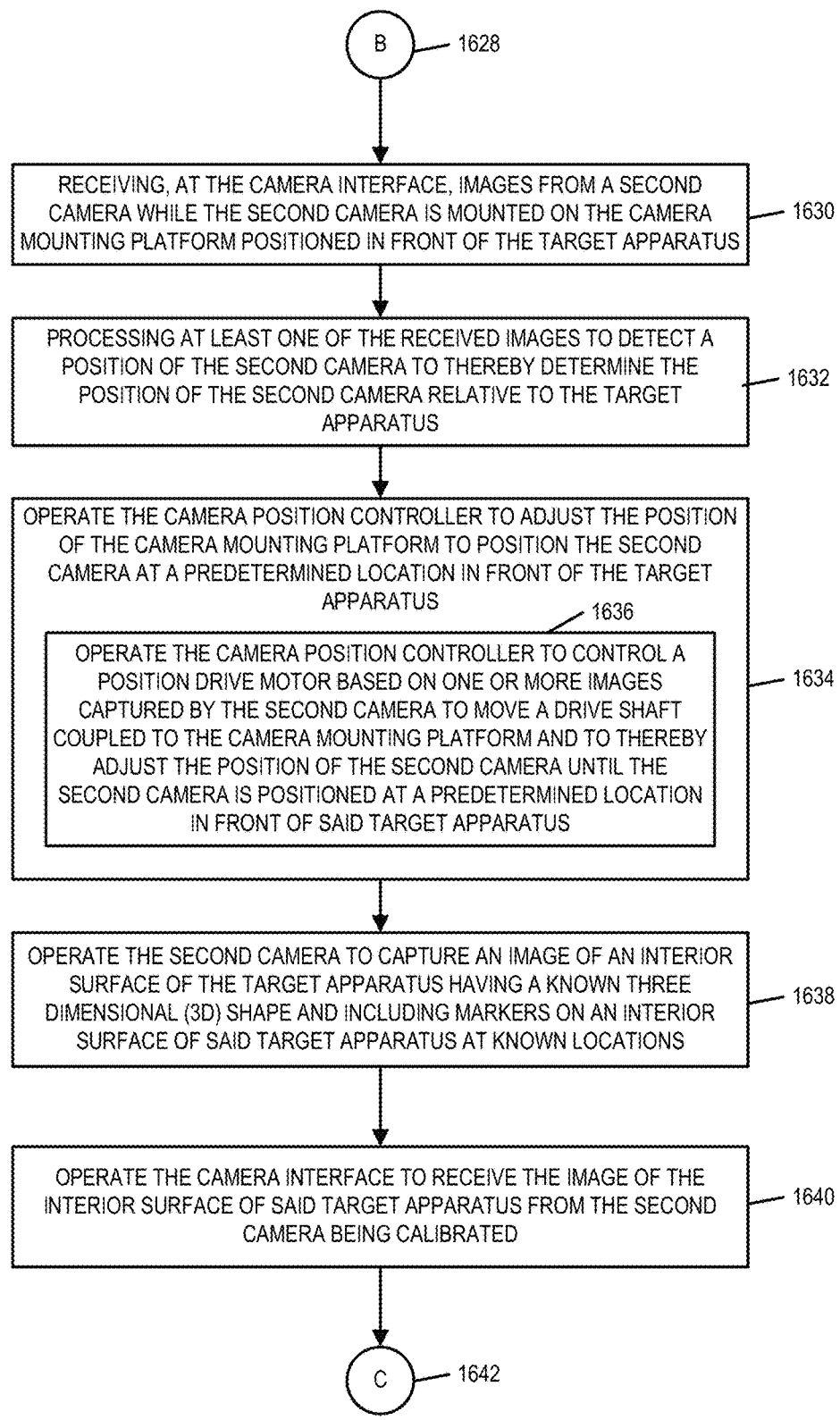
FIG. 16C is a third part of a flowchart of an exemplary method of performing camera calibration and/or using camera calibration information in accordance with an exemplary embodiment.
Figure 16D:
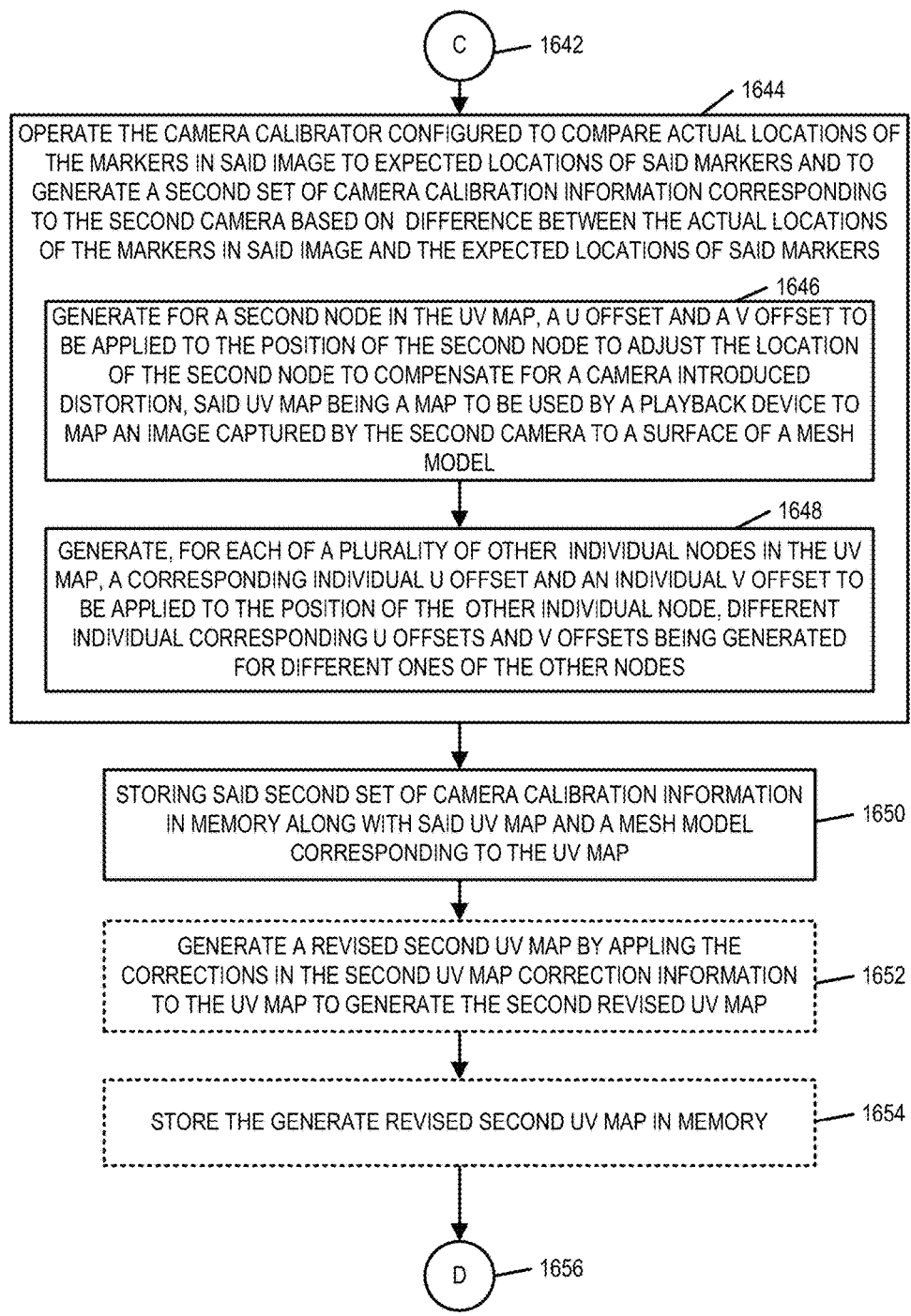
FIG. 16D is a fourth part of a flowchart of an exemplary method of performing camera calibration and/or using camera calibration information in accordance with an exemplary embodiment.

FIG. 15 shows an exemplary camera calibration system 1500 used in some embodiments. The system 1500 can also be used as a content server and may be, and sometimes is, used in place of the image processing and content server 104 shown in FIG. 1.

Exemplary calibration system 1500 includes target calibration apparatus 1200, camera mounting table 1510, rails 1506, position drive motor 1502, drive shaft 1504, and a camera calibration apparatus 1514. Camera calibration apparatus 1514 includes a camera position controller 1516, a camera calibrator 1517, an I/O interface 1518, a processor 1520, e.g., a CPU, an encoder 1522, a content streamer 1524, and memory 1526 coupled together via a bus 1511 over which the various elements may exchange data and information. I/O interface 1518 includes a camera interface 1591 and a network interface 1519. Memory 1526 includes a standard UV map 1532, a mesh model 1534, expected marker location information 1533, calibration profiles 1535, revised UV map 1 1561, revised UV map 2 1562, captured image content 1528, e.g., a first image captured by camera 1508 and a second image captured by camera 1508', and encoded image content 1570, e.g. output from encoder 1522. Calibration profiles 1535 includes a plurality of sets of camera profile information (camera 1 profile information 1536, . . . , camera N profile information 1536'). Camera 1 profile information 1536 includes UV map correction information 1 1598. Camera N profile information 1536' includes UV map correction information N 1598').

In the system of FIG. 15, the target apparatus 1200 is placed in front of a camera mounting table 1510 which is mounted on rails 1506. A first camera 1508 or second camera 1508', or some other camera can be placed on the camera mounting table 1510 for calibration. The camera 1508 or 1508' includes a lens 1509. A drive shaft 1504 connects a position drive motor 1502 to the table 1510 and can push the table 1510 along the rails 1506 to move the camera table 1510 left or right. A second position drive motor 1502', drive shaft 1504' and set of rails 1506' which are not shown for simplicity can move the entire camera table 1510 and rails 1506 in the vertical direction so that automated camera position control is supported in both directions.

The camera position controller 1516 receives images via the camera interface 1591 of input/output interface 1518 from the camera 1508 on the table 1510 and uses the visual cues to determine when the camera 1508 is properly positioned, e.g., centered, in front of and slightly within the test apparatus 1200.

The camera position controller 1516 is part of the camera calibration apparatus 1514 shown in FIG. 15 which includes a camera interface 1591 for receiving an image of the surface of said target apparatus 1200 from a first camera 1508 being calibrated; and a camera calibrator 1517 configured to compare actual locations of the markers 1201 in said image to expected locations of said markers 1201 and to generate a first set of camera calibration information 1536 based on differences between the actual locations of the markers 1201 in said image and the expected locations of said markers 1201. In some, but not necessarily all embodiments, the target apparatus 1200 is an open box.

The camera calibration apparatus 1514 includes the camera mounting platform or table 1510; and rails 1506 for supporting the camera mounting platform 1510 along with the position drive motor 1506 and drive shaft 1504 which is coupled to the camera mounting platform 1510 and to said position drive motor 1502. The camera calibration apparatus 1514 further includes the camera position controller 1516 for controlling the position drive motor 1502 based on one or more images captured by the first camera 1508 while positioned on said camera mounting platform 1510 to position the first camera 1508 at a predetermined location in front of said target apparatus 1200. In some embodiments the predetermined location is a location positioned midway between a first side 1226 and a second side 1222 of said target apparatus 1200.

In some embodiments the target apparatus 1200 is square, has four sides of the same length and wherein said predetermined location is at the center of said square, said back 1228 of said target apparatus 1200 includes a center portion marker (1202) which can to facilitate camera alignment with said center portion marker (1202). In some but not all embodiments each of the sides 1220, 1122, 1224, 1226 of said target apparatus 1200 are at least two feet long.

In some embodiments the sides 1220, 1222, 1224, 1226 and back 1228 of said target apparatus 1200 are made of a rigid sheet material and arranged perpendicular to each other. In some embodiments each of the markers (1201) is part of a test pattern, each marker (1201) being an intersection of points in a grid formed by a pattern of squares.

The camera calibrator (1517) is coupled to other components of the apparatus 1514 via bus 1511 which allows the components to communicate. In some embodiments the camera calibrator 1517 generates first UV map correction information 1598 indicating one or more adjustments to be made to the location of nodes in a standard UV map 1532) based on the differences between the actual locations of the markers 1201 in said first image and the expected locations of said markers 1201. The expected location of the markers 1201 is stored in expected marker location information 1533 in memory 1526 and known based on properties of at least a lens 1509 included in the first camera 1508.

The first UV map correction information 1598 includes information indicating a U offset and a V offset to be applied to a first node in the UV map 1532, said UV map being a map to be used by a playback device 106 to map an image captured by said first camera 1508 to a surface of a mesh model 1534.

The calibration apparatus 1514 further includes: a network interface 1519 for communicating the UV map 1532, the first UV correction information 1598, and the mesh model 1534 to a playback device 106 for use in rendering images captured by the first camera 1508. The network interface 1519 is in addition to camera interface 1591, both of which are part of I/O interface 1518 in the embodiment shown in FIG. 15.

The camera calibrator 1517 is further configured to, in some embodiments, compare actual locations of the markers 1201 in a second image captured by a second camera 1508' to be calibrated to the expected locations of said markers 1201 and to generate a second set of camera calibration information 1536' based on differences between the actual locations of the markers 1201 in said second image and the expected locations of said markers 1201. The camera calibrator 1517 generates second UV map correction information 1598' indicating one or more adjustments to be made to the location of nodes in the UV map 1532 based on the differences between the actual locations of the markers 1201 in said second image and the expected locations of said markers 1201 in the second image. The second UV map correction information 1598' includes information indicating a second U offset and a second V offset to be applied to a second node in the UV map 1532, said second node being the same or a different node from said first node, said UV map further being a map to be used to map an image captured by said second camera 1508' to a surface of the mesh model 1534.

The network interface 1519 is further configured, in some embodiments, to communicate the second UV correction information 1598' to the playback device 106 for use in rendering images captured by the second camera 1508'.

In some embodiments the camera calibrator 1517 is configured to: generate a revised first UV map 1561 by applying the corrections in the first UV map correction information 1598 to the UV map 1532 to generate a first revised UV map 1561; and wherein the network interface 1519 is configured to transmit the revised first UV map 1561 to a playback device 106 for use in rendering images captured by the first camera 1508) using the mesh model

1534 and generate a revised second UV map 1562 by applying the corrections in second UV map correction information 1598' to the UV map 1532 to generate a second revised UV map 1562; and wherein the network interface 1519 is configured to transmit the revised second UV map 1562 to the playback device for use in rendering images captured by the second camera 1508' using the mesh model 1534.

FIG. 15 illustrates a calibration system 1500 which uses an exemplary calibration apparatus such as the one 1200 shown in FIG. 12-14 or in any of the other figures of the present application and which can generate sets of camera calibration information from images of the calibration apparatus which are captured by a camera mounted in the camera calibration system.

Figure 17:
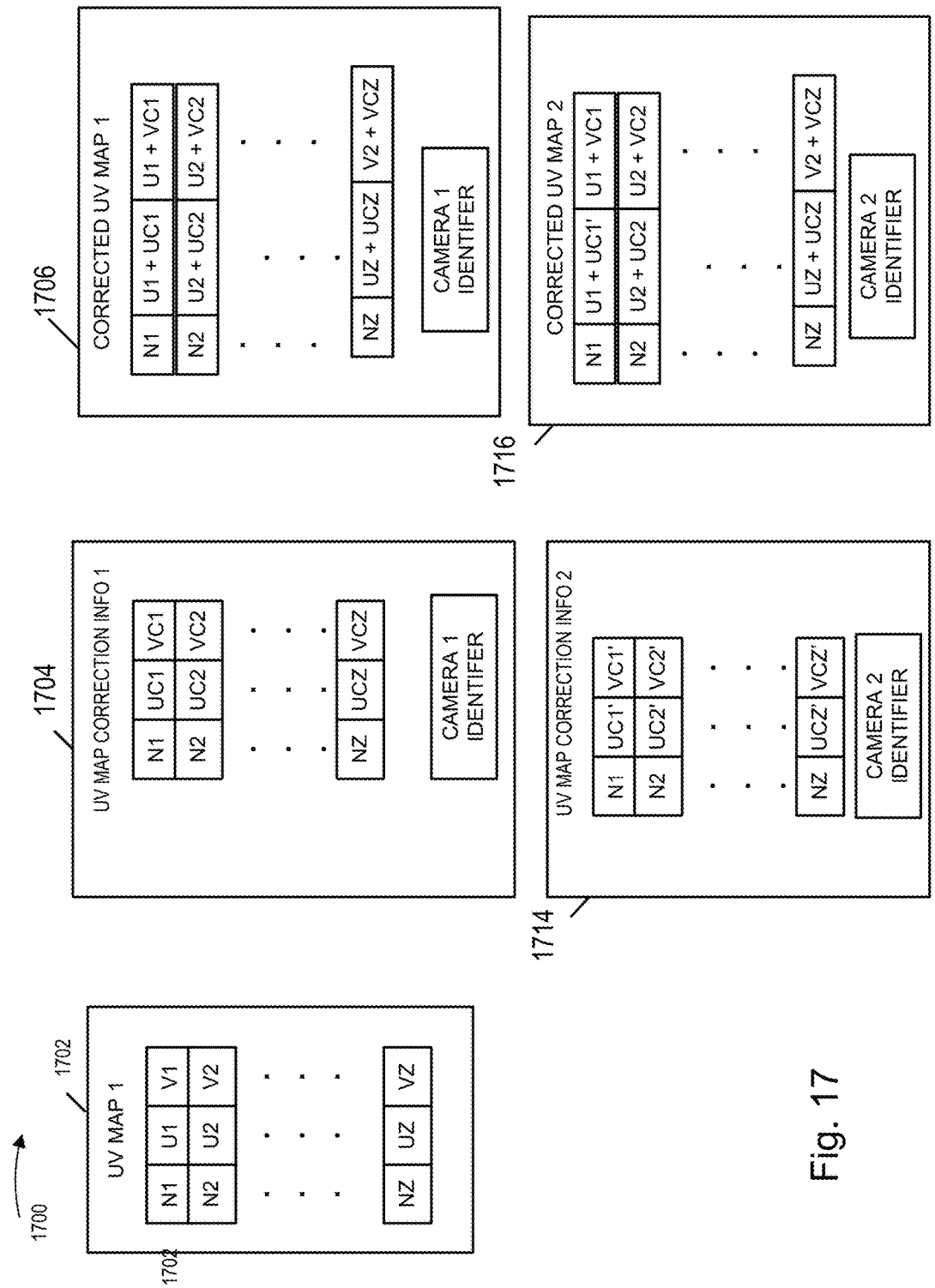
FIG. 17 illustrates a set 1700 of information including a UV map 1702, UV correction information 1704, 1704' and corrected UV maps 1706, 1706'.

FIG. 17 illustrates various maps and information which maybe used in the embodiment shown in FIG. 15.

FIG. 17 illustrates a set 1700 of information including a UV map 1702, UV correction information 1704, 1704' and corrected UV maps 1706, 1706'. The UV map 1702 maybe, and in some embodiments is, used as the standard UV map 1532 of FIG. 15. The UV map is stored as a set of node locations N1, N2, NZ with each row 1722, 1724, 1726 including the information indicating the location of an individual node in the UV map 1702. For example row 1722 corresponds to Node 1 (N1) and indicates that N1 is located at the location in 2D UV space defined by the coordinate pair (U1, V1). U1 and V1 are values along different axis of the 2D space in which the UV map is defined and which is used to partition images for application to segments of the mesh model 1534 used during rendering by a playback device. The nodes of the UV map define a mesh whose individual segments correspond to segments of the 3D model 1534. By changing the location of a node to take into consideration camera distortions introduced by an individual camera, e.g., camera 1 or camera 2, the segments defined by the changed node locations will also change, e.g., their position and/or shape as defined in UV space is altered to compensate for camera distortions.

UV map correction information 1704 includes an identifier 1738 identifying the camera to which the correction information corresponds. The correction information includes entries 1732, 1734, 1736 for the nodes of the UV map 1702 which should be adjusted to compensate for camera introduced distortions. The correction information 1704 maybe, and sometimes is used as UV map correction information 1 1598 shown in FIG. 15. The correction map information indicates the value that should be added to the U and V values which define a nodes position to compensate for camera introduced distortions. For example, row 1732 indicates that the value UC1 should be added to the value U1 to correct the U coordinate of node 1 used for the UV map associated with camera 1. UV Map correction information 2 1704 maybe used as the UV map correction information N 1598' for camera 2 and maybe generated by calibrating camera 2 as discussed with regard to FIG. 15. Since UV map correction information 1704' is similar to UV map correction information 1704 for camera 1, but with different correction values reflecting the different distortions introduced by camera 2 which differs in some respects, e.g., due to manufacturing and/or assembly differences, from camera 1 correction information 1704' will not be discussed in any further detail.

While in some embodiments UV map 1702 and corresponding correction information 1704, 1704' is transmitted along with content captured by cameras 1 and 2, with the camera dependent corrections to the UV map being applied by a playback device as part of image rendering, in other embodiments corrected UV maps 1706, 1706' are generated and transmitted instead of the UV map 1702 and correction information 1704, 1706.

The corrected UV map corresponding to camera 1 1706 is similar to the UV map 1 1702 but includes for each node N1 to Nz corrected U and V position information as shown in rows 1742, 1744, 1746 respectively. The corrected UV map 1708 also includes a camera identifier 1748 to indicate which camera the information corresponds. As shown in FIG. 17, the corrected UV map 1706 includes for node 1 a U coordinate which is the sum of the U coordinate (U1) for node 1 in UV map 1 and the U coordinate correction (UC1) included in UV map correction information 1704. Similarly, the corrected UV map 1706 includes for node 1 a V coordinate which is the sum of the V coordinate (V1) for node 1 in UV map 1 and the V coordinate correction (VC1) included in UV map correction information 1704. The U and V coordinates of the other nodes in the corrected information are generated from the information in UV map 1 and UV map 2 in the same or similar manner in which the U and V coordinate information is generated for node 1 but using the information for the particular node listed in the table. Corrected UV map 1 maybe used as revised UV map 1562. Corrected UV map 2 1706' includes information which is similar to that of corrected UV map 1 but for the second camera identified in the set of corrected UV map information 1706'.

FIG. 17 is exemplary and it should be appreciated there a numerous ways in which the UV maps, UV map correction information, and corrected UV maps can be expressed, stored and/or transmitted.

FIG. 16, comprising the combination of FIG. 16, FIG. 16B, FIG. 16C, FIG. 16D and FIG. 16E, is a flowchart 1600 of an exemplary method of performing camera calibration and/or using camera calibration information in accordance with an exemplary embodiment. Operation starts in step 1602 in which the camera calibration system 1500 is powered on and initialized. Operation proceeds from step 1602 to step 1604.

In step 1604, images are received at a camera interface 1591 from a first camera 1508 while the first camera 1508 is mounted on a camera mounting platform 1510 positioned in front of a target apparatus 1200. Operation proceeds from step 1604 to step 1606.

In step 1606 at least one of the received images are processed to detect a position of the first camera 1508 to thereby determine the position of the first cameral 508 relative to the target apparatus 1200. In some embodiments, the camera position controller performs step 1606. In some embodiments, processor 1520 performs step 1606. Operation proceeds from step 1606 to step 1608.

In step 1608, a camera position controller 1516 is operated to adjust the position of the camera mounting platform 1510 to position the first camera 1508 at a predetermined location in front of the target apparatus 1200. Step 1608 includes step 1610. In step 1610 the camera position controller 1516 is operated to control a position drive motor 1502 based on one or more images captured by the first camera 1508 to move a drive shaft 1504 coupled to the camera mounting platform 1510 and to thereby adjust the position of the first camera 1508 until the first camera 1508 is positioned at a predetermined location in front of said target apparatus 1200. Operation proceeds from step 1608 to step 1612.

In step 1612 the first camera 1508 is operated to capture an image of an interior surface of the target apparatus 1200 having a known three dimensional (3D) shape and including markers 1201 on an interior surface of said target apparatus 1200 at known locations. Operation proceeds from step 1612 to step 1614.

In step 1614, a camera interface 1591 is operated to receive the image of the interior surface of said target apparatus 1200 from the first camera 1508 being calibrated. Operation proceeds from step 1614, via connecting node A 1616, to step 1618.

In step 1618 a camera calibrator 1517 configured to compare actual location of the markers 1201 in said image to expected location of said markers 1201 and to generate a first set of camera calibration information 1536 corresponding to the first camera 1508 based on the difference between the actual location of the markers 1201 in said image and the expected locations of said markers 1201. In some embodiments, the first set of camera calibration information 1536 includes first UV map correction information 1598 indicating one or more adjustments to be made to the location of nodes in the UV map 1532 based on the actual locations of markers 1210 in the image captured by the first camera 1508 and the expected locations of said markers 1210. In some embodiments, the first set of calibration information 1536 includes information identifying the first camera 1508. Step 1618 includes steps 1620 and step 1622.

In step 1620 the camera calibrator 1517 generates for a first node in the UV map 1532, a U offset and a V offset to be applied to the position of the first node to adjust the location of the first node to compensate for a camera introduced distortion, said UV map 1532 being a map to be used by a playback device 106 to map an image captured by the first camera 1508 to the surface of a mesh model 1534. Operation proceeds from step 1620 to step 1622, in which the camera calibrator 1517 generates, for each of a plurality of additional individual nodes in the UV map 1532, a corresponding individual U offset and a V offset to be applied to the position of the additional individual node, different individual corresponding U offsets and V offsets being generated for different ones of the additional nodes. Operation proceeds from step 1618 to step 1624. In step 1624 said first set of camera calibration information 1536 is stored in memory 1526 along with said UV map 1532 and a mesh model 1534 corresponding to the UV map 1532. In some embodiments processor 1520 performs step 1624. In some other embodiments, the camera calibrator 1517 performs step 1624.

In some embodiments, operation proceeds from step 1624 to step 1626. In other embodiments, operation proceeds from step 1624, via connecting node B 1628 to step 1630. Returning to step 1626, in step 1626 a revised first UV map 1561 is generated by applying corrections in the first UV map correction information 1598 to the UV map 1532 to generate the first revised UV map 1561. In some embodiments processor 1520 performs step 1626. In some other embodiments, the camera calibrator 1517 performs step 1626. Operation proceeds from step 1626 to step 1627, in which the generated first revised UV map 1561 is stored in memory 1526. In some embodiments processor 1520 performs step 1627. In some other embodiments, the camera calibrator 1517 performs step 1627. Operation proceeds from step 1627, via connecting node B 1628, to step 1630.

In step 1630, images are received at the camera interface 1591 from a second camera 1508' while the second camera 1508 is mounted on the camera mounting platform 1510 positioned in front of the target apparatus 1200. Operation proceeds from step 1630 to step 1632.

In step 1632 at least one of the received images are processed to detect a position of the second camera 1508' to thereby determine the position of the second camera 1508' relative to the target apparatus 1200. In some embodiments, the camera position controller performs step 1632. In some embodiments, the processor 1520 performs step 1632. Operation proceeds from step 1632 to step 1634.

In step 1634, the camera position controller 1516 is operated to adjust the position of the camera mounting platform 1510 to position the second camera 1508' at a predetermined location in front of the target apparatus 1200. Step 1634 includes step 1636. In step 1636 the camera position controller 1516 is operated to control a position drive motor 1502 based on one or more images captured by the second camera 1508' to move a drive shaft 1504 coupled to the camera mounting platform 1510 and to thereby adjust the position of the second camera 1508' until the second camera 1508' is positioned at a predetermined location in front of said target apparatus 1200. Operation proceeds from step 1634 to step 1638.

In step 1638 the second camera 1508' is operated to capture an image of an interior surface of the target apparatus 1200 having a known three dimensional (3D) shape and including markers 1201 on an interior surface of said target apparatus 1200 at known locations. Operation proceeds from step 1638 to step 1640.

In step 1640, the camera interface 1591 is operated to receive the image of the interior surface of said target apparatus 1200 from the second camera 1508' being calibrated. Operation proceeds from step 1640, via connecting node C 1642, to step 1644.

In step 1644 the camera calibrator 1517 configured to compare actual location of the markers 1201 in said image to expected location of said markers 1201 and to generate a second set of camera calibration information 1536' corresponding to the second camera 1508' based on the difference between the actual location of the markers 1201 in said image and the expected locations of said markers 1201. In some embodiments, the second set of camera calibration information 1536' includes second UV map correction information 1598' indicating one or more adjustments to be made to the location of nodes in the UV map 1532 based on the actual locations of markers 1210 in the image captured by the second camera 1508' and the expected locations of said markers. In some embodiments, the second set of calibration information includes information identifying the second camera 1508'. Step 1644 includes steps 1646 and step 1648.

In step 1646 the camera calibrator 1517 generates for a second node in the UV map 1532, a U offset and a V offset to be applied to the position of the second node to adjust the location of the second node to compensate for a camera introduced distortion, said UV map 1532 being a map to be used by a playback device 106 to map an image captured by the second camera 1508' to the surface of the mesh model 1534. Operation proceeds from step 1646 to step 1648, in which the camera calibrator 1517 generates, for each of a plurality of other individual nodes in the UV map 1532, a corresponding individual U offset and a V offset to be applied to the position of the other individual node, different individual corresponding U offsets and V offsets being generated for different ones of the other nodes. Operation proceeds from step 1644 to step 1650. In step 1650 said second set of camera calibration information 1536' is stored in memory 1526 along with said UV map 1532 and a mesh model 1534 corresponding to the UV map 1532. In some embodiments, operation proceeds from step 1650 to step 1652. In other embodiments, operation proceeds from step 1650, via connecting node D 1656 to step 1658. Returning to step 1652, in step 1652 a revised second UV map 1565 is generated by applying corrections in the second UV map correction information 1598' to the UV map 1532 to generate the second revised UV map 1562. Operation proceeds from step 1652 to step 1654 in which the generated second revised UV map 1562 is stored in memory 1526. In some embodiments processor 1520 performs step 1654. In some other embodiments, the camera calibrator 1517 performs step 1654. Operation proceeds from step 1654, via connecting node D 1656, to step 1658.

In step 1658 a request for content from a playback device 106 is received, e.g., via network interface 1519. In some embodiments, operation proceeds from step 1658 to steps 1660, 1662, 1668 and 1670. In some other embodiments, operation proceeds from step 1658 to steps 1664, 1666, 1668 and 1670.

In step 1660, a network interface 1619 is operated to communicate, e.g., in response to the request for content from playback device 106, the UV map 1532, the first UV map correction information 1598, and the mesh model 1534 to the playback device 106 for use in rendering images captured by the first camera 1508. In step 1662, a network interface 1619 is operated to communicate, e.g., in response to the request for content from playback device 106, the UV map 1532, the second UV map correction information 1598', and the mesh model 1534 to the playback device 106 for use in rendering images captured by the second camera 1508'. In various embodiments, the UV map 1532 and the mesh model 1534 are transmitted in one of steps 1660 and 1662 rather than in both of steps 1660 and 1662. In some embodiments, UV map 1532, the mesh model 1534, the first UV map correction information 1598, and the second UV map correction information 1598' are transmitted to the playback device 106 in a single step.

In step 1664, a network interface 1616 is operated to transmit, in response to the request for content received from the playback device 106, the revised first UV map 1561 and the mesh model 1534 to the playback device 106 for use in rendering images captured by the first camera 1508 using the mesh model 1534. In step 1666, a network interface 1616 is operated to transmit, in response to the request for content received from the playback device 106, the revised second UV map 1562 and the mesh model 1534 to the playback device 106 for use in rendering images captured by the second camera 1508' using the mesh model 1534. In various embodiments, the mesh model 1534 is transmitted in one of steps 1664 and 1666 rather than in both of steps 1660 and 1662. In some embodiments, a the revised first UV map, the revised second UV map and the mesh model are transmitted to the playback device in a single step.

In step 1668, in response to the request for content, images captured by the first camera 1518, e.g., left eye images of stereoscopic image pairs are sent to the playback device 106, e.g., from device 1514 via network interface 1519.

In step 1670, in response to the request for content, images captured by the first camera 1518, e.g., right eye images of stereoscopic image pairs are sent to the playback device 106, e.g., from device 1514 via network interface 1519.

Examples of Numbered Embodiments

1. A camera calibration system (1500) comprising:
a target apparatus (1200) having a known three dimensional (3D) shape and including markers (1201) on an interior surface of said target apparatus (1200) at known locations; a camera calibration apparatus (1514) including:
a camera interface (1591) for receiving an image of the surface of said target apparatus (1200) from a first camera (1508) being calibrated; and
a camera calibrator (1517) configured to compare actual locations of the markers (1201) in said image to expected locations of said markers (1201) and to generate a set of camera calibration information (1536) based on differences between the actual locations of the markers (1201) in said image and the expected locations of said markers.

2. The camera calibration system (1500) of embodiment 1, wherein said target apparatus (1200) includes four flat sides (1220, 1222, 1224, 1226) and a back (1228), each of said flat sides and back including markers (1201).

4. The camera calibration system of embodiment 1, wherein said target apparatus (1200) is an open box, the camera calibration system further comprising:
a camera mounting platform (1510); and
rails (1506) for support said camera mounting platform (1510).

5. The camera calibration system of embodiment 4, further comprising:
a position drive motor 1506;
a drive shaft (1504) coupled to said camera mounting platform (1510) and to said position drive motor (1502); and
a camera position controller (1516) for controlling the position drive motor (1502) based on one or more images captured by the first camera (1508) while positioned on said camera mounting platform (1510) to position the first camera (1508) at a predetermined location in front of said target apparatus (1200).

6. The camera calibration system of embodiment 1, wherein said predetermined location is a location positioned midway between a first side (1226) and a second side (1222) of said target apparatus (1200).

7. The camera calibration system of embodiment 6, wherein said target apparatus is square, has four sides of the same length and wherein said predetermined location is at the center of said square, said back of said camera apparatus including a center portion marker (1202) which can to facilitate camera alignment with said center portion marker (1202).

8. The camera calibration apparatus of embodiment 7, wherein each of the sides of said target apparatus (1200) are at least two feet long.

9. The camera calibration apparatus of embodiment 8, wherein the sides 1220, 1222, 1224, 1226 and back 1228 of said target apparatus are made of a rigid sheet material and arranged perpendicular to each other.

10. The camera calibration system of embodiment 1, wherein each of the markers (1201) is part of a test pattern, each marker (1201) being an intersection of points in a grid formed by a pattern of squares.

11. The camera calibration system of embodiment 1, wherein the camera calibrator (1517) generates first UV map correction information (1598) indicating one or more adjustments to be made to the location of nodes in a UV map (1532) based on the differences between the actual locations of the markers (1201) in said first image and the expected locations of said markers.

12. The camera calibration system of embodiment 1, wherein the expected location of the markers is stored in memory (1533) and known based on properties of at least a lens (1509) included in the first camera (1508).

13. The camera calibration system of embodiment 11, wherein the first UV map correction information (1598) includes information indicating a U offset and a V offset to be applied to a first node in the UV map (1532), said UV map being a map to be used by a playback device (106) to map an image captured by said first camera (1508) to a surface of a mesh model (1534).

14. The camera calibration system of embodiment 13, wherein the calibration apparatus (1514) further includes:
   a network interface (1519) for communicating the UV map, the first UV correction information, and the mesh model to a playback device for use in rendering images captured by the first camera.

15. The camera calibration system of embodiment 14, wherein the camera calibrator (1517) is further configured to:
   compare actual locations of the markers (1201) in a second image captured by a second camera (1508') to be calibrated to the expected locations of said markers and to generate a second set of camera calibration information (1536') based on differences between the actual locations of the markers (1201) in said second image and the expected locations of said markers.

16. The camera calibration system of embodiment 15, wherein the camera calibrator (1517) generates second UV map correction information (1598') indicating one or more adjustments to be made to the location of nodes in the UV map (1532) based on the differences between the actual locations of the markers (1201) in said second image and the expected locations of said markers in the second image.

17. The camera calibration system of embodiment 16, wherein the second UV map correction information (1598') includes information indicating a second U offset and a second V offset to be applied to a second node in the UV map (1532), said second node being the same or a different node from said first node, said UV map further being a map to be used to map an image captured by said second camera (1508') to a surface of the mesh model (1543).

18. The camera calibration system of embodiment 17, wherein the interface is further configured to communicate the second UV correction information to the playback device for use in rendering images captured by the second camera.

19. The camera calibration system of embodiment 11, wherein the camera calibrator (1517) is configured to:
   generate a revised first UV map (1561) by applying the corrections in the first UV map correction information (1598) to the UV map (1532) to generate a first revised UV map (1561); and wherein the network interface (1519) is configured to transmit the revised first UV map (1561) to a playback device for use in rendering images captured by the first camera (1508) using the mesh model (1534).

20. The camera calibration system of embodiment 19, wherein the camera calibrator (1517) is configured to:
   generate a revised second UV map (1562) by applying the corrections in second UV map correction information (1598') to the UV map (1532) to generate a second revised UV map (1562); and
   wherein the network interface (1519) is configured to transmit the revised second UV map (1562) to the playback device for use in rendering images captured by the second camera (1508') using the mesh model (1534).

21. A method comprising:
   operating a first camera (1508) to capture an image of an interior surface of a target apparatus (1200) having a known three dimensional (3D) shape and including markers (1201) on an interior surface of said target apparatus (1200) at known locations;
   operating a camera interface (1591) to receive the image of the interior surface of said target apparatus (1200) from the first camera (1508) being calibrated; and
   operating a camera calibrator (1517) configured to compare actual locations of the markers (1201) in said image to expected locations of said markers (1201) and to generate a first set of camera calibration information (1536) corresponding to the first camera based on differences between the actual locations of the markers (1201) in said image and the expected locations of said markers (1201).

22. The method of embodiment 21, further comprising:
   prior to performing said step of operating the first camera (1508) to capture the image of the interior surface;
   receiving, at a camera interface (1591), images from the first camera (1508) while the first camera (1508) is mounted on a camera mounting platform (1510) positioned in front of the target apparatus (1200);
   processing at least one of the received images to detect a position of the first camera (1508) to thereby determine the position of the first camera (1508) relative to the target apparatus (1200); and
   operating a camera position controller (1516) to adjust the position of the camera mounting platform (1510) to position the first camera (1508) at a predetermined location in front of said target apparatus (1200).

23. The method of embodiment 22, wherein operating the camera position controller (1516) includes:
   operating the camera position controller (1516) to control a position drive motor (1502) based on one or more images captured by the first camera (1508) to move a drive shaft (1504) coupled to the camera mounting platform (1510) and to thereby adjust the position of the first camera (1508) until the first camera (1508) is positioned at a predetermined location in front of said target apparatus (1200).

24. The method of embodiment 21, wherein said first set of camera calibration information (1536) includes first UV map correction information (1598) indicating one or more adjustments to be made to the location of nodes in a UV map (1532) based on the differences between the actual locations of the markers (1201) in said first image and the expected locations of said markers (1201).

25. The method of embodiment 22, wherein generating said first set of camera calibration information (1536) includes generating for a first node in the UV map (1532) a U offset and a V offset to be applied to the position of the first node to adjust the location of the first node to compensate for a camera introduced distortion, said UV map (1532) being a map to be used by a playback device (106) to map an image captured by said first camera (1508) to a surface of a mesh model (1534).

26. The method of embodiment 25, wherein generating said first set of camera calibration information includes generating for each of a plurality of additional individual nodes in the UV map (1532) a corresponding individual U offset and an individual V offset to be applied to the position of the additional individual node, different individual corresponding U offsets and V offsets being generated for different ones of said additional nodes.

27. The method of embodiment 26, further comprising:
   storing said first set of camera calibration information (1536) in memory (1526) along with said UV map (1532) and a mesh model (1534) corresponding to the UV map (1532).

28. The method of embodiment claim 26, wherein said first set of camera calibration information (1536) includes information identifying said first camera.

29. The method of embodiment 28, further comprising:
   operating a network interface (1519) to communicate the UV map (1532), the first UV correction information (1598), and the mesh model (1534) to a playback device (106) for use in rendering images captured by the first camera (1508).

30. The method of embodiment 29, where said UV map (1532), the first UV correction information (1598), and the mesh model (1534) are sent to the playback device in response to a request for content, the method further comprising:
   sending to the playback device (106), in response to said request for content, images captured by the first camera (1508) to playback device (106).

31. The method of embodiment 30 wherein said images captured by the first camera (1508) that are sent to the playback device are left eye images of stereoscopic image pairs.

32. The method of embodiment 28, further comprising:
   operating the camera calibrator (1517) to:
   generate a revised first UV map (1561) by applying the corrections in the first UV map correction information (1598) to the UV map (1532) to generate the first revised UV map (1561); and
   operating the network interface (1519) to transmit, in response to a request for content received from a first playback device, the revised first UV map (1561) to the playback device (106) for use in rendering images captured by the first camera (1508) using the mesh model (1534).

33. The method of embodiment 32, further comprising:
   sending to the playback device (106), in response to said request for content, images captured by the first camera (1508).

34. The method of embodiment 22, further comprising:
   receiving, at a camera interface (1591), images from a second camera (1508') while the second camera (1508') is mounted on the camera mounting platform (1510) positioned in front of the target apparatus (1200);
   processing at least one of the received images from the second camera (1508') to thereby determine the position of the second camera (1508') relative to the target apparatus (1200); and
   operating the camera position controller (1516) to adjust the position of the camera mounting platform (1510) to position the second camera (1508) at a predetermined location in front of said target apparatus (1200).

35. The method of embodiment 34, wherein operating the camera position controller (1516) to position the second camera (1508') includes:
   operating the camera position controller (1516) to control the position drive motor (1502) based on one or more images captured by the second camera (1508') to move the drive shaft (1504) coupled to the camera mounting platform (1510) and to thereby adjust the position of the second camera (1508') until the second camera (1508') is positioned at a predetermined location in front of said target apparatus (1200).

36. The method of embodiment 34, wherein said second set of camera calibration information (1536') includes second UV map correction information (1598') indicating one or more adjustments to be made to the location of nodes in the UV map (1532) based on the differences between the actual locations of the markers (1201) in said first image and the expected locations of said markers (1201).

37. The method of embodiment 35, wherein generating said second set of camera calibration information (1536') includes generating for a second node in the UV map (1532) a U offset and a V offset to be applied to the position of the second node to adjust the location of the second node to compensate for a camera introduced distortion, said UV map (1532) being a map to be used by a playback device (106) to map an image captured by said second camera (1508') to a surface of a mesh model (1534).

38. The method of embodiment 36, wherein generating said second set of camera calibration information (1536') includes generating for each of a plurality of other individual nodes in the UV map (1532) a corresponding individual U offset and an individual V offset to be applied to the position of the corresponding node, different individual corresponding U offset and V offsets being generated for different ones of said other nodes.

39. The method of embodiment 38, further comprising:
   storing said second set of camera calibration information (1536') in memory (1526) along with said UV map (1532) and a mesh model (1523) corresponding to the UV map (1532).

40. The method of embodiment 38, wherein said second set of camera calibration information 1536' includes information identifying said second camera (1508').

41. The method of embodiment 40, further comprising:
   operating a network interface (1519) to communicate the UV map (1532), the second UV correction information (1598'), and the mesh model (1534) to a playback device (106) for use in rendering images captured by the second camera (1508').

42. The method of embodiment 41, where said UV map (1532), the second UV correction information (1598'), and the mesh model (1534) are sent to the playback device (106) in response to a request for content, the method further comprising:
   sending to the playback device (106), in response to said request for content, images captured by the second camera (1508') to playback device (106).

43. The method of embodiment 42 wherein said images captured by the second camera (1508') that are sent to the playback device (106) are right eye images of stereoscopic image pairs.

44. The method of embodiment 40, further comprising:
   operating the camera calibrator (1517) to:
   generate a revised second UV map (1562) by applying the corrections in the second UV map correction information (1598') to the UV map (1532) to generate the second revised UV map (1562); and
   operating the network interface (1519) to transmit, in response to a request for content received from a first playback device (106), the revised second UV map (1562) to the playback device (106) for use in rendering images captured by the second camera (1508') using the mesh model (1534).

45. The method of embodiment 44, further comprising:
   sending to the playback device (106), in response to said request for content, images captured by the second camera (1508').

46. A non-transitory computer storage comprising instructions which, when executed, direct a computer system comprising one or more computing devices to perform the method of embodiment 21.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to be limiting to the precise form disclosed above. While specific embodiments and examples are described above for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data processing system. Various embodiments are also directed to methods, e.g., a method of processing image data. In some embodiments, one or more of the method steps is implemented using a processor. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:

1. A camera calibration system including:
    a target apparatus in the form of a portion of a rectangular box having flat sides which are at right angles to each other, said target apparatus having a known three dimensional (3D) shape and including markers on an interior surface of said target apparatus at known locations, wherein said target apparatus includes four flat sides and a back, each of said flat sides and back including markers, adjacent flat sides contacting each other and extending outward perpendicular from the back while remaining in contact with each other to form a closed corner which extends outward from said back; and a camera calibration apparatus including:
  a camera interface for receiving an image of the interior surface of said target apparatus from a first camera being calibrated; and
  a camera calibrator configured to compare actual locations of the markers in said image to expected locations of said markers and to generate a set of camera calibration information based on differences between the actual locations of the markers in said image and the expected locations of said markers.

2. A camera calibration system including:
a target apparatus in the form of a portion of a rectangular box having flat sides which are at right angles to each other, said target apparatus having a known three dimensional (3D) shape and including markers on an interior surface of said target apparatus at known locations, wherein said target apparatus includes four flat sides and a back, adjacent flat sides contacting each other and extending outward perpendicular from the back while remaining in contact with each other to form a closed corner which extends outward from said back, and wherein said target apparatus is an open box;
a camera mounting platform;
rails for supporting said camera mounting platform; and
a camera calibration apparatus including:
  a camera interface for receiving an image of the interior surface of said target apparatus from a first camera being calibrated; and
  a camera calibrator configured to compare actual locations of the markers in said image to expected locations of said markers and to generate a set of camera calibration information based on differences between the actual locations of the markers in said image and the expected locations of said markers.

3. The camera calibration system of claim 2, further comprising:
a position drive motor;
a drive shaft coupled to said camera mounting platform and to said position drive motor; and
a camera position controller for controlling the position drive motor based on one or more images captured by the first camera while positioned on said camera mounting platform to position the first camera at a predetermined location in front of said target apparatus.

4. The camera calibration system of claim 3, wherein said predetermined location is a location positioned midway between a first side and a second side of said target apparatus.

5. The camera calibration system of claim 4, wherein said back of target apparatus is square, has four sides of the same length and wherein one of said predetermined locations is at the center of said square, said back including a center portion marker which facilitates camera alignment with said center portion marker.

6. The camera calibration apparatus of claim 5, wherein each of the sides of said target apparatus are at least two feet long.

7. The camera calibration apparatus of claim 6, wherein the sides and back of said target apparatus are made of a rigid sheet material and arranged perpendicular to each other.

8. The camera calibration system of claim 1, wherein each of the markers is part of a test pattern, each marker being an intersection of points in a grid formed by a pattern of squares.

9. The camera calibration system of claim 1, wherein the camera calibrator generates first UV map correction information indicating one or more adjustments to be made to the location of nodes in a UV map based on the differences between the actual locations of the markers in said image and the expected locations of said markers.

10. The camera calibration system of claim 1, wherein the expected location of the markers is stored in information in memory and known based on properties of at least a lens included in the first camera.

11. A camera calibration system including:
a target apparatus in the form of a portion of a rectangular box having flat sides which are at right angles to each other, said target apparatus having a known three dimensional (3D) shape and including markers on an interior surface of said target apparatus at known locations;
a camera calibration apparatus including:
  a camera interface for receiving an image of the interior surface of said target apparatus from a first camera being calibrated; and
  a camera calibrator configured to compare actual locations of the markers in said image to expected locations of said markers and to generate a set of camera calibration information based on differences between the actual locations of the markers in said image and the expected locations of said markers, wherein the camera calibrator generates first UV map correction information indicating one or more adjustments to be made to the location of nodes in a UV map based on the differences between the actual locations of the markers in said image and the expected locations of said markers, and wherein the first UV map correction information includes information indicating a U offset and a V offset to be applied to a first node in the UV map, said UV map being a map to be used by a playback device to map an image captured by said first camera to a surface of a mesh model.

12. The camera calibration system of claim 11, wherein the calibration apparatus further includes:
a network interface for communicating the UV map, the first UV correction information, and the mesh model to a playback device for use in rendering images captured by the first camera.

13. A method comprising:
receiving, at a camera interface, images from a first camera while the first camera is mounted on a camera mounting platform positioned in front of a target apparatus, wherein said target apparatus is in the form of a portion of a rectangular box having four flat sides which are at right angles to each other and a back, adjacent flat sides contacting each other and extending outward perpendicular from the back while remaining in contact with each other to form a closed corner which extends outward from said back, said target apparatus having a known three dimensional (3D) shape and including markers on an interior surface of said target apparatus at known locations;
processing at least one of the received images to detect a position of the first camera to thereby determine the position of the first camera relative to the target apparatus;
operating a camera position controller to adjust the position of the camera mounting platform to position the first camera at a predetermined location in front of said target apparatus;
operating the first camera to capture an image of the interior surface of the target apparatus;

operating the camera interface to receive the image of the interior surface of said target apparatus from the first camera being calibrated; and operating a camera calibrator configured to compare actual locations of the markers in said image of the interior surface of the target apparatus to expected locations of said markers and to generate a first set of camera calibration information corresponding to the first camera based on differences between the actual locations of the markers in said image of the interior surface of the target apparatus and the expected locations of said markers.

14. The method of claim 13, wherein operating the camera position controller includes:

operating the camera position controller to control a position drive motor based on one or more images captured by the first camera to move a drive shaft coupled to the camera mounting platform and to thereby adjust the position of the first camera until the first camera is positioned at a predetermined location in front of said target apparatus.

15. The method of claim 14, wherein said first set of camera calibration information includes first UV map correction information indicating one or more adjustments to be made to the location of nodes in a UV map based on the differences between the actual locations of the markers in said image of the interior surface of the target apparatus and the expected locations of said markers.

16. The method of claim 15, wherein generating said first set of camera calibration information includes generating for a first node in the UV map a U offset and a V offset to be applied to the position of the first node to adjust the location of the first node to compensate for a camera introduced distortion, said UV map being a map to be used by a playback device to map an image captured by said first camera to a surface of a mesh model.

17. A non-transitory computer storage comprising instructions which, when executed by a processor, direct a system comprising one or more computing devices to perform the steps of:

receiving, at a camera interface, images from a first camera while the first camera is mounted on a camera mounting platform positioned in front of a target apparatus, wherein said target apparatus is in the form of a portion of a rectangular box having four flat sides which are at right angles to each other and a back, adjacent flat sides contacting each other and extending outward perpendicular from the back while remaining in contact with each other to form a closed corner which extends outward from said back, said target apparatus having a known three dimensional (3D) shape and including markers on an interior surface of said target apparatus at known locations;

processing at least one of the received images to detect a position of the first camera to thereby determine the position of the first camera relative to the target apparatus;

operating a camera position controller to adjust the position of the camera mounting platform to position the first camera at a predetermined location in front of said target apparatus;

operating the first camera to capture an image of the interior surface of the target apparatus;

operating the camera interface to receive the image of the interior surface of said target apparatus from the first camera being calibrated; and operating a camera calibrator configured to compare actual locations of the markers in said image of the interior surface of said target apparatus to expected locations of said markers and to generate a first set of camera calibration information corresponding to the first camera based on differences between the actual locations of the markers in said image of the interior surface of said target apparatus and the expected locations of said markers.

18. The camera calibration system of claim 1, wherein the flat sides and back form an area which is closed on the sides and back.

* * * * *